(12) United States Patent
Chen et al.

(10) Patent No.: US 12,371,025 B2
(45) Date of Patent: Jul. 29, 2025

(54) AUTONOMOUS LANE CHANGE METHOD AND APPARATUS, AND STORAGE MEDIUM

(71) Applicant: Huawei Technologies Co., Ltd., Shenzhen (CN)

(72) Inventors: Chen Chen, Beijing (CN); Jun Qian, Beijing (CN); Wulong Liu, Montreal (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 716 days.

(21) Appl. No.: 17/532,640

(22) Filed: Nov. 22, 2021

(65) Prior Publication Data
US 2022/0080972 A1    Mar. 17, 2022

Related U.S. Application Data

(63) Continuation of application No. PCT/CN2020/090234, filed on May 14, 2020.

(30) Foreign Application Priority Data

May 21, 2019    (CN) .......................... 201910426248.7

(51) Int. Cl.
*B60W 30/18*    (2012.01)
*B60W 30/12*    (2020.01)
(Continued)

(52) U.S. Cl.
CPC ...... *B60W 30/18163* (2013.01); *B60W 30/12* (2013.01); *B60W 30/16* (2013.01);
(Continued)

(58) Field of Classification Search
CPC ........... B60W 30/18163; B60W 30/12; B60W 30/16; B60W 40/04; B60W 60/0011;
(Continued)

(56) References Cited

U.S. PATENT DOCUMENTS 5,521,579 A * 5/1996 Bernhard ........ B60W 30/18163
340/438
9,977,430 B2 * 5/2018 Shalev-Shwartz ... G05D 1/0055
(Continued)

FOREIGN PATENT DOCUMENTS

CN    104391504 A    3/2015
CN    105329238 A    2/2016
(Continued)

OTHER PUBLICATIONS

Wang, Pin, Ching-Yao Chan, and Arnaud de La Fortelle. "A reinforcement learning based approach for automated lane change maneuvers." 2018 IEEE Intelligent Vehicles Symposium (IV). IEEE, 2018. (Year: 2018).*
(Continued)

*Primary Examiner* — Angelina M Shudy
(74) *Attorney, Agent, or Firm* — Leydig, Voit & Mayer, Ltd.

(57) ABSTRACT

An autonomous lane change method includes: calculating a local neighbor feature and a global statistical feature of an autonomous vehicle at a current moment based on travel information of the autonomous vehicle at the current moment and motion information of obstacles in lanes within a sensing range of the autonomous vehicle; obtaining a target action indication based on the local neighbor feature, the global statistical feature, and a current control policy; and executing the target action according to the target action indication. On the basis of the local neighbor feature, the global statistical feature is further introduced into the current control policy to obtain the target action indication. The target action obtained by combining local and global road obstacle information is a globally optimal decision action.

17 Claims, 13 Drawing Sheets

(51) Int. Cl.
  *B60W 30/16* (2020.01)
  *B60W 40/04* (2006.01)
  *B60W 60/00* (2020.01)
  *G06V 20/58* (2022.01)

(52) U.S. Cl.
  CPC ........ *B60W 40/04* (2013.01); *B60W 60/0011* (2020.02); *G06V 20/58* (2022.01); *B60W 2554/80* (2020.02); *B60W 2556/10* (2020.02)

(58) Field of Classification Search
  CPC ......... B60W 2554/80; B60W 2556/10; B60W 2050/0088; B60W 2554/406; G06V 20/58; G06V 20/588; G06V 10/42; G06V 10/44; G05D 1/00
  See application file for complete search history.

(56) References Cited

U.S. PATENT DOCUMENTS

| | | | |
|---|---|---|---|
| 10,671,076 B1* | 6/2020 | Kobilarov | G08G 1/166 |
| 10,703,370 B2* | 7/2020 | Kusari | G05D 1/0223 |
| 10,898,999 B1* | 1/2021 | Cohen | B25J 9/0003 |
| 11,131,992 B2* | 9/2021 | Du | G08G 1/0129 |
| 11,345,340 B2* | 5/2022 | Shalev-Shwartz | B60T 7/18 |
| 11,565,716 B2* | 1/2023 | Fairley | G08G 1/0112 |
| 11,640,562 B1* | 5/2023 | Badithela | G06N 7/01 706/12 |
| 11,810,371 B1* | 11/2023 | Zhou | G06V 10/774 |
| 11,814,072 B2* | 11/2023 | Johnson | B60W 60/0011 |
| 11,891,088 B1* | 2/2024 | Kobilarov | G07C 5/0808 |
| 12,012,123 B2* | 6/2024 | Johnson | G06F 30/20 |
| 12,032,375 B2* | 7/2024 | Vozar | G05D 1/0088 |
| 12,054,176 B2* | 8/2024 | Linscott | B60W 60/00276 |
| 12,094,355 B2* | 9/2024 | Jacobus | G08G 1/096783 |
| 12,141,677 B2* | 11/2024 | Silver | G06N 3/042 |
| 2008/0147249 A1* | 6/2008 | Kuge | B60W 40/09 701/1 |
| 2009/0161981 A1* | 6/2009 | Allen | G06T 7/215 382/103 |
| 2013/0246020 A1* | 9/2013 | Zeng | G06F 30/20 703/2 |
| 2016/0082953 A1 | 3/2016 | Teller et al. | |
| 2017/0177955 A1* | 6/2017 | Yokota | G06V 20/56 |
| 2018/0348343 A1* | 12/2018 | Achour | H01Q 1/364 |
| 2018/0349785 A1* | 12/2018 | Zheng | G06N 7/01 |
| 2019/0113929 A1* | 4/2019 | Mukadam | G08G 1/167 |
| 2019/0113930 A1 | 4/2019 | Mimura et al. | |
| 2019/0129436 A1* | 5/2019 | Sun | G06N 20/00 |
| 2019/0212749 A1* | 7/2019 | Chen | B62D 15/025 |
| 2019/0234751 A1* | 8/2019 | Takhirov | G01C 21/3461 |
| 2019/0266489 A1* | 8/2019 | Hu | B60W 10/20 |
| 2019/0299984 A1* | 10/2019 | Shalev-Shwartz | G01S 17/931 |
| 2019/0333381 A1* | 10/2019 | Shalev-Shwartz | B60W 30/18163 |
| 2020/0017117 A1* | 1/2020 | Milton | G08G 1/0112 |
| 2020/0081436 A1* | 3/2020 | Kizumi | B60W 30/10 |
| 2020/0089232 A1* | 3/2020 | Gdalyahu | G01C 21/3841 |
| 2020/0094824 A1* | 3/2020 | Schulter | B60W 30/0956 |
| 2020/0174432 A1* | 6/2020 | Iwane | G05B 13/0265 |
| 2020/0192359 A1* | 6/2020 | Aragon | G05D 1/0061 |
| 2020/0202723 A1* | 6/2020 | Pierre | G05D 1/0005 |
| 2020/0247402 A1* | 8/2020 | Bouton | B60W 60/00276 |
| 2020/0247429 A1* | 8/2020 | Tram | B60W 30/16 |
| 2020/0346666 A1* | 11/2020 | Wray | G05D 1/0221 |
| 2020/0387158 A1* | 12/2020 | Kobilarov | B60W 60/0011 |
| 2021/0001857 A1* | 1/2021 | Nishitani | G05D 1/0088 |
| 2021/0009133 A1* | 1/2021 | McNew | B60W 40/09 |
| 2021/0041869 A1* | 2/2021 | Meyer | G08G 1/0108 |
| 2021/0049465 A1* | 2/2021 | Bogdan | G06N 3/045 |
| 2021/0070320 A1* | 3/2021 | Nagaraja | B60W 30/0956 |
| 2021/0095990 A1* | 4/2021 | Fowe | G01C 21/3691 |
| 2021/0107487 A1* | 4/2021 | Oh | B60W 30/09 |
| 2021/0150417 A1* | 5/2021 | Fadel Argerich | G06N 20/20 |
| 2021/0188297 A1* | 6/2021 | Wray | B60W 50/0098 |
| 2021/0300412 A1* | 9/2021 | Dingli | B60W 50/0098 |
| 2021/0312725 A1* | 10/2021 | Milton | G07C 5/008 |
| 2021/0370980 A1* | 12/2021 | Ramamoorthy | G06F 18/214 |
| 2022/0017106 A1* | 1/2022 | Ota | B60W 60/001 |
| 2022/0032952 A1* | 2/2022 | Lienke | B60W 60/0011 |
| 2022/0048533 A1* | 2/2022 | Ödblom | G06F 11/3668 |
| 2022/0157161 A1* | 5/2022 | Tan | G06F 18/2415 |
| 2022/0188667 A1* | 6/2022 | Burisch | G08G 1/166 |
| 2022/0326350 A1* | 10/2022 | Peng | G06F 18/23 |
| 2022/0363259 A1* | 11/2022 | Shi | B60W 60/001 |
| 2022/0402485 A1* | 12/2022 | Kobilarov | B60W 30/0956 |
| 2023/0110713 A1* | 4/2023 | Degirmenci | G06N 3/0442 701/24 |
| 2023/0177963 A1* | 6/2023 | Joo | G08G 1/096716 701/301 |
| 2024/0046111 A1* | 2/2024 | Dey | G06N 3/045 |
| 2024/0126265 A1* | 4/2024 | Ebrahimi Afrouzi | A47L 9/0477 |
| 2024/0142586 A1* | 5/2024 | Liu | G01S 7/4911 |
| 2024/0227829 A1* | 7/2024 | Bonasera | B60W 60/0013 |
| 2024/0383486 A1* | 11/2024 | Kolaric | G06N 7/01 |

FOREIGN PATENT DOCUMENTS

| | | |
|---|---|---|
| CN | 106991846 A | 7/2017 |
| CN | 107539313 A | 1/2018 |
| CN | 108227710 A | 6/2018 |
| CN | 108313054 A | 7/2018 |
| CN | 108583578 A | 9/2018 |
| CN | 109085837 A | 12/2018 |
| CN | 109557928 A | 4/2019 |
| CN | 109582022 A | 4/2019 |
| CN | 109737977 A | 5/2019 |
| CN | 109739246 A | 5/2019 |
| CN | 110532846 A | 12/2019 |
| DE | 102016216135 A1 | 3/2018 |

OTHER PUBLICATIONS

Urmson et al., "Autonomous Driving in Urban Environments: Boss and the Urban Challenge," Journal of Field Robotics, vol. 25, No. 8, pp. 425-466, Wiley Periodicals, Inc. (2008).

Bacha et al., "Odin: Team VictorTango's Entry in the DARPA Urban Challenge," Journal of Field Robotics, vol. 25, No. 8, pp. 467-492, Wiley Periodicals, Inc. (2008).

Leonard et al., "A Perception-Driven Autonomous Urban Vehicle," Journal of Field Robotics, vol. 25, No. 10, pp. 727-774, Wiley Periodicals, Inc. (2008).

Ulbrich et al., "Towards Tactical Lane Change Behavior Planning for Automated Vehicles," 2015 IEEE 18th International Conference on Intelligent Transportation Systems, Total 7 pages, Institute of Electrical and Electronics Engineers, New York, New York (Sep. 2015).

Lawitzky et al., "Interactive Scene Prediction for Automotive Applications," 2013 IEEE Intelligent Vehicles Symposium (IV), Total 6 pages, Institute of Electrical and Electronics Engineers, New York, New York (Jun. 2013).

Bahram et al., "A Game-Theoretic Approach to Replanning-Aware Interactive Scene Prediction and Planning," IEEE Transactions on Vehicular Technology, vol. 65, No. 6, pp. 3981-3992, Institute of Electrical and Electronics Engineers, New York, New York (Jun. 2016).

Wolf et al., "Adaptive Behavior Generation for Autonomous Driving using Deep Reinforcement Learning with Compact Semantic States," 2018 IEEE Intelligent Vehicles Symposium (IV), Total 8 pages, Institute of Electrical and Electronics Engineers, New York, New York (Jun. 2018).

Kohlhaas et al., "Semantic State Space for High-level Maneuver Planning in Structured Traffic Scenes," 2014 IEEE 17th International Conference on Intelligent Transportation Systems (ITSC), Qingdao, China, pp. 1060-1065, Institute of Electrical and Electronics Engineers, New York, New York (Oct. 8-11, 2017).

Mukadam et al., "Tactical Decision Making for Lane Changing with Deep Reinforcement Learning," 31st Conference on Neural Infor-

(56) References Cited

OTHER PUBLICATIONS mation Processing Systems (NIPS 2017), Long Beach, CA, USA, pp. 1-7 (2017).

* cited by examiner

AUTONOMOUS LANE CHANGE METHOD AND APPARATUS, AND STORAGE MEDIUM

CROSS-REFERENCE TO RELATED APPLICATIONS

This application is a continuation of International Application No. PCT/CN2020/090234, filed on May 14, 2020, which claims priority to Chinese Patent Application No. 201910426248.7, filed on May 21, 2019. The disclosures of the aforementioned applications are hereby incorporated by reference in their entireties.

FIELD

This application relates to the field of autonomous driving technologies, and in particular, to an autonomous lane change method and apparatus, and a storage medium.

BACKGROUND

Artificial intelligence (AI) is a theory, a method, a technology, or an application system that simulates, extends, and expands human intelligence by using a digital computer or a machine controlled by the digital computer, to perceive an environment, obtain knowledge, and obtain an optimal result based on the knowledge. In other words, artificial intelligence is a branch of computer science, and is intended to understand essence of intelligence and produce a new intelligent machine that can react in a manner similar to human intelligence. Artificial intelligence is to study design principles and implementation methods of various intelligent machines, so that the machines have perceiving, and decision-making and reasoning functions. Researches in the field of artificial intelligence include robots, natural language processing, computer vision, decision-making and reasoning, human-machine interaction, recommendation and search, AI basic theories, and the like.

Autonomous driving is a mainstream application in the field of artificial intelligence. The autonomous driving technology depends on computer vision, a radar, a monitoring apparatus, a global positioning system, and the like to collaborate with each other, to implement autonomous driving of a motor vehicle without human intervention. An autonomous vehicle uses various computing systems to assist in transporting passengers from one location to another location. Some autonomous vehicles may require some initial or continuous input from operators (such as navigators, drivers, or passengers). An autonomous vehicle allows an operator to switch from a manual operation mode to an autonomous driving mode or allows a mode between the manual operation mode and the autonomous driving mode. Because the autonomous driving technology does not require a human to drive a motor vehicle, can theoretically avoid human driving mistakes effectively, reduce traffic accidents, and improve road transportation efficiency, the autonomous driving technology attracts increasing attention. In the field of autonomous driving technologies, a design of intelligent lane change decision of autonomous vehicles also faces great challenges.

In a related technology, an action value function Q corresponding to a current state and action is simulated by using a deep neural network. Input of the action value function Q includes speed and distance information of a neighboring vehicle closest to an autonomous vehicle and some road semantic information (for example, a lane in which the autonomous vehicle is located is an acceleration lane or a left-turn lane), where the autonomous vehicle is used as a local semantic grid, so that an action with a highest value of the action value function Q is selected as a current decision action.

However, in the related technology, only the information about the local neighboring vehicle of the autonomous vehicle is considered, but a global vehicle flow situation is not considered. Consequently, a generated decision action is not a globally optimal decision action.

SUMMARY

Embodiments of this application provide an autonomous lane change method and apparatus, and a storage medium, to resolve a problem that a decision action generated in a related technology is not a globally optimal decision action.

According to a first aspect, an embodiment of this application provides an autonomous lane change method, including:

calculating a local neighbor feature and a global statistical feature of an autonomous vehicle at a current moment based on travel information of the autonomous vehicle at the current moment and motion information of obstacles in lanes within a sensing range of the autonomous vehicle, where the local neighbor feature is used to represent motion status information of a specific neighboring obstacle of the autonomous vehicle relative to the autonomous vehicle, and the global statistical feature is used to represent denseness of the obstacles in the lanes within the sensing range;

obtaining a target action indication based on the local neighbor feature, the global statistical feature, and a current control policy, where the target action indication is used to indicate the autonomous vehicle to execute a target action, and the target action includes at least two types: lane change or keeping straight; and executing the target action according to the target action indication.

In the autonomous lane change method provided in the first aspect, the local neighbor feature and the global statistical feature of the autonomous vehicle at the current moment are calculated based on the travel information of the autonomous vehicle at the current moment and the motion information of the obstacles in the lanes within the sensing range of the autonomous vehicle. Further, the target action indication is obtained based on the local neighbor feature, the global statistical feature, and the current control policy, and the target action is executed according to the target action indication. It can be learned that, on the basis of the local neighbor feature, the global statistical feature is further introduced into the current control policy to obtain the target action indication. Both information about local neighboring obstacles (for example, other vehicles) and a macro situation of the global statistical feature (for example, an overall vehicle flow) are considered. Therefore, the target action obtained by combining local and global road obstacle information is a globally optimal decision action.

In a possible implementation, the method further includes:

obtaining feedback information by executing the target action, where the feedback information is used to update the current control policy; the feedback information includes travel information generated after the autonomous vehicle executes the target action, travel information of the autonomous vehicle at a next moment, and motion information of the obstacles in the lanes within the sensing range of the autonomous vehicle at the next moment; and when the target action is lane change, the feedback information further includes a ratio of a period of time for executing the target action to a historical average period of time, and a denseness change between obstacles in a lane in which the autonomous vehicle is located before lane change and obstacles in a lane in which the autonomous vehicle is located after lane change, where the historical average period of time is an average period of time for which the autonomous vehicle executes a similar action within a preset historical period of time; and updating the current control policy based on the feedback information to obtain a control policy at the next moment.

In this implementation, the feedback information is obtained by executing the target action, and the current control policy is updated based on the feedback information to obtain the control policy at the next moment, so that a target action at the next moment can be accurately determined at the next moment based on the control policy at the next moment. It should be noted that, at a subsequent moment, a control policy at a moment t may be continuously updated based on feedback information at the moment t, to obtain a control policy at a moment t+1, so that the control policy for generating the target action is continuously adaptively updated and optimized. This ensures that there is an optimal control policy corresponding to each moment, and that an accurate target action at each moment is generated.

In a possible implementation, the updating the current control policy based on the feedback information to obtain a control policy at the next moment includes:

calculating, based on the feedback information, a local neighbor feature and a global statistical feature of the autonomous vehicle at the next moment, and a reward corresponding to the target action;

determining four-tuple information at the current moment, where the four-tuple information at the current moment corresponds to a vehicle condition at the current moment, and includes: a feature at the current moment, the target action, the reward corresponding to the target action, and a feature at the next moment, where the feature at the current moment includes the local neighbor feature and the global statistical feature of the autonomous vehicle at the current moment, and the feature at the next moment includes the local neighbor feature and the global statistical feature of the autonomous vehicle at the next moment; and updating the current control policy based on the four-tuple information at the current moment to obtain the control policy at the next moment.

In a possible implementation, when the target action is keeping straight, the updating the current control policy based on the four-tuple information at the current moment to obtain the control policy at the next moment includes:

generating, based on the four-tuple information at the current moment, a target value corresponding to the four-tuple information;

iteratively updating, by using a gradient descent method, a parameter q in a first preset function that includes the target value; and replacing a parameter q in the current control policy with an iteratively updated parameter q, to obtain the control policy at the next moment.

In a possible implementation, when the target action is lane change, the updating the current control policy based on the four-tuple information at the current moment to obtain the control policy at the next moment includes:

obtaining extended four-tuple information at the current moment, where the extended four-tuple information at the current moment corresponds to an extended vehicle condition at the current moment, and the extended vehicle condition at the current moment is obtained by processing the vehicle condition at the current moment according to a symmetry rule and a monotone rule, where the symmetry rule indicates that locations of obstacles in all left lanes and obstacles in all right lanes of the lane in which the autonomous vehicle is located are symmetrically exchanged by using the lane in which the autonomous vehicle is located as an axis, and the monotone rule indicates that a distance increases between front and back neighboring obstacles of the autonomous vehicle in a target lane of lane change executed by the autonomous vehicle, and/or indicates that a change in a distance between front and back neighboring obstacles of the autonomous vehicle in a non-target lane is less than a preset distance range; and updating the current control policy based on the four-tuple information at the current moment and the extended four-tuple information at the current moment to obtain the control policy at the next moment.

In a possible implementation, the updating the current control policy based on the four-tuple information at the current moment and the extended four-tuple information at the current moment to obtain the control policy at the next moment includes:

generating, based on $i^{th}$ four-tuple information in the four-tuple information at the current moment and the extended four-tuple information at the current moment, a target value corresponding to the $i^{th}$ four-tuple information, where i is a positive integer not greater than n, and n is a total quantity of four-tuple information included in the four-tuple information at the current moment and the extended four-tuple information at the current moment;

iteratively updating, by using a gradient descent method, a parameter q in a second preset function that includes the target value corresponding to the $i^{th}$ four-tuple information; and replacing a parameter q in the current control policy with an iteratively updated parameter q, to obtain the control policy at the next moment.

In a possible implementation, when the target action is keeping straight, the updating the current control policy based on the four-tuple information at the current moment to obtain the control policy at the next moment includes:

updating the current control policy based on the four-tuple information at the current moment, four-tuple information at a historical moment, and extended four-tuple information at the historical moment, to obtain the control policy at the next moment.

The four-tuple information at the historical moment corresponds to a vehicle condition at the historical moment, and includes: a feature at the historical moment, a target action at the historical moment, a reward corresponding to the target action at the historical moment, and a feature at a next moment of the historical moment, where the feature at the historical moment includes a local neighbor feature and a global statistical feature of the autonomous vehicle at the historical moment, and the feature at the next moment of the historical moment includes a local neighbor feature and a global statistical feature of the autonomous vehicle at the next moment of the historical moment; and the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

In a possible implementation, the updating the current control policy based on the four-tuple information at the current moment, four-tuple information at a historical moment, and extended four-tuple information at the historical moment, to obtain the control policy at the next moment includes:
  generating, based on $j^{th}$ four-tuple information in the four-tuple information at the current moment, the four-tuple information at the historical moment, and the extended four-tuple information at the historical moment, a target value corresponding to the $j^{th}$ four-tuple information, where j is a positive integer not greater than m, and m is a total quantity of four-tuple information included in the four-tuple information at the current moment, the four-tuple information at the historical moment, and the extended four-tuple information at the historical moment;
  iteratively updating, by using a gradient descent method, a parameter q in a third preset function that includes the target value corresponding to the $j^{th}$ four-tuple information; and
  replacing a parameter q in the current control policy with an iteratively updated parameter q, to obtain the control policy at the next moment.

In a possible implementation, when the target action is lane change, the updating the current control policy based on the four-tuple information at the current moment to obtain the control policy at the next moment includes:
  obtaining extended four-tuple information at the current moment, where the extended four-tuple information at the current moment corresponds to an extended vehicle condition at the current moment, and the extended vehicle condition at the current moment is obtained by processing the vehicle condition at the current moment according to a symmetry rule and a monotone rule; and
  updating the current control policy based on the four-tuple information at the current moment, the extended four-tuple information at the current moment, four-tuple information at a historical moment, and extended four-tuple information at the historical moment to obtain the control policy at the next moment, where the four-tuple information at the historical moment corresponds to a vehicle condition at the historical moment, the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

In a possible implementation, the updating the current control policy based on the four-tuple information at the current moment, the extended four-tuple information at the current moment, four-tuple information at a historical moment, and extended four-tuple information at the historical moment to obtain the control policy at the next moment includes:
  generating, based on $k^{th}$ four-tuple information in the four-tuple information at the current moment, the extended four-tuple information at the current moment, the four-tuple information at the historical moment, and the extended four-tuple information at the historical moment, a target value corresponding to the $k^{th}$ four-tuple information, where k is a positive integer not greater than p, and p is a total quantity of four-tuple information included in the four-tuple information at the current moment, the extended four-tuple information at the current moment, the four-tuple information at the historical moment, and the extended four-tuple information at the historical moment;
  iteratively updating, by using a gradient descent method, a parameter q in a fourth preset function that includes the target value corresponding to the $k^{th}$ four-tuple information; and
  replacing a parameter q in the current control policy with an iteratively updated parameter q, to obtain the control policy at the next moment.

In a possible implementation, when the target action is keeping straight, the calculating, based on the feedback information, a local neighbor feature and a global statistical feature of the autonomous vehicle at the next moment, and a reward corresponding to the target action includes:
  calculating the reward based on travel information generated after the autonomous vehicle executes the target action; and
  calculating the local neighbor feature and the global statistical feature of the autonomous vehicle at the next moment based on the travel information of the autonomous vehicle at the next moment and the motion information of the obstacles in the lanes within the sensing range of the autonomous vehicle at the next moment.

In a possible implementation, when the target action is lane change, the calculating, based on the feedback information, a local neighbor feature and a global statistical feature of the autonomous vehicle at the next moment, and a reward corresponding to the target action includes:
  calculating the reward based on travel information generated after the autonomous vehicle executes the target action, a ratio of a period of time for executing the target action to a historical average period of time, and a denseness change between obstacles in a lane in which the autonomous vehicle is located before lane change and obstacles in a lane in which the autonomous vehicle is located after lane change; and
  calculating the local neighbor feature and the global statistical feature of the autonomous vehicle at the next moment based on the travel information of the autonomous vehicle at the next moment and the motion information of the obstacles in the lanes within the sensing range of the autonomous vehicle at the next moment.

In a possible implementation, the specific neighboring obstacle of the autonomous vehicle includes at least one of the following: front and back neighboring obstacles of the autonomous vehicle in a lane in which the autonomous vehicle is located, front and back neighboring obstacles of the autonomous vehicle in a left lane adjacent to the lane in which the autonomous vehicle is located, and front and back neighboring obstacles of the autonomous vehicle in a right lane adjacent to the lane in which the autonomous vehicle is located.

When the autonomous vehicle is located in a left lane, motion status information, relative to the autonomous vehicle, of the front and back neighboring obstacles of the autonomous vehicle in the left lane adjacent to the lane in which the autonomous vehicle is located is a default value; and/or
  when the autonomous vehicle is located in a right lane, motion status information, relative to the autonomous vehicle, of the front and back neighboring obstacles of the autonomous vehicle in the right lane adjacent to the lane in which the autonomous vehicle is located is a default value.

In a possible implementation, the global vehicle traffic statistical feature of the autonomous vehicle at the current moment includes at least one of the following: an average travel speed and an average gap of all the obstacles in the lanes within the sensing range.

According to a second aspect, an embodiment of this application provides an autonomous lane change apparatus, including:

a calculation module, configured to calculate a local neighbor feature and a global statistical feature of an autonomous vehicle at a current moment based on travel information of the autonomous vehicle at the current moment and motion information of obstacles in lanes within a sensing range of the autonomous vehicle, where the local neighbor feature is used to represent motion status information of a specific neighboring obstacle of the autonomous vehicle relative to the autonomous vehicle, and the global statistical feature is used to represent denseness of the obstacles in the lanes within the sensing range;

an obtaining module, configured to obtain a target action indication based on the local neighbor feature, the global statistical feature, and a current control policy, where the target action indication is used to indicate the autonomous vehicle to execute a target action, and the target action includes at least two types: lane change or keeping straight; and an execution module, configured to execute the target action according to the target action indication.

In a possible implementation, the apparatus further includes:

a feedback module, configured to obtain feedback information by executing the target action, where the feedback information is used to update the current control policy; the feedback information includes travel information generated after the autonomous vehicle executes the target action, travel information of the autonomous vehicle at a next moment, and motion information of the obstacles in the lanes within the sensing range of the autonomous vehicle at the next moment; and when the target action is lane change, the feedback information further includes a ratio of a period of time for executing the target action to a historical average period of time, and a denseness change between obstacles in a lane in which the autonomous vehicle is located before lane change and obstacles in a lane in which the autonomous vehicle is located after lane change, where the historical average period of time is an average period of time for which the autonomous vehicle executes a similar action within a preset historical period of time; and an updating module, configured to update the current control policy based on the feedback information to obtain a control policy at the next moment.

In a possible implementation, the updating module includes:

a calculation unit, configured to calculate, based on the feedback information, a local neighbor feature and a global statistical feature of the autonomous vehicle at the next moment, and a reward corresponding to the target action;

a determining unit, configured to determine four-tuple information at the current moment, where the four-tuple information at the current moment corresponds to a vehicle condition at the current moment, and includes: a feature at the current moment, the target action, the reward corresponding to the target action, and a feature at the next moment, where the feature at the current moment includes the local neighbor feature and the global statistical feature of the autonomous vehicle at the current moment, and the feature at the next moment includes the local neighbor feature and the global statistical feature of the autonomous vehicle at the next moment; and an updating unit, configured to update the current control policy based on the four-tuple information at the current moment to obtain the control policy at the next moment.

In a possible implementation, when the target action is keeping straight, the updating unit is specifically configured to:

generate, based on the four-tuple information at the current moment, a target value corresponding to the four-tuple information;

iteratively update, by using a gradient descent method, a parameter q in a first preset function that includes the target value; and replace a parameter q in the current control policy with an iteratively updated parameter q, to obtain the control policy at the next moment.

In a possible implementation, when the target action is lane change, the updating unit is specifically configured to:

obtain extended four-tuple information at the current moment, where the extended four-tuple information at the current moment corresponds to an extended vehicle condition at the current moment, and the extended vehicle condition at the current moment is obtained by processing the vehicle condition at the current moment according to a symmetry rule and a monotone rule, where the symmetry rule indicates that locations of obstacles in all left lanes and obstacles in all right lanes of the lane in which the autonomous vehicle is located are symmetrically exchanged by using the lane in which the autonomous vehicle is located as an axis, and the monotone rule indicates that a distance increases between front and back neighboring obstacles of the autonomous vehicle in a target lane of lane change executed by the autonomous vehicle, and/or indicates that a change in a distance between front and back neighboring obstacles of the autonomous vehicle in a non-target lane is less than a preset distance range; and update the current control policy based on the four-tuple information at the current moment and the extended four-tuple information at the current moment to obtain the control policy at the next moment.

In a possible implementation, the updating unit is specifically configured to:

generate, based on $i^{th}$ four-tuple information in the four-tuple information at the current moment and the extended four-tuple information at the current moment, a target value corresponding to the $i^{th}$ four-tuple information, where i is a positive integer not greater than n, and n is a total quantity of four-tuple information included in the four-tuple information at the current moment and the extended four-tuple information at the current moment;

iteratively update, by using a gradient descent method, a parameter q in a second preset function that includes the target value corresponding to the $i^{th}$ four-tuple information; and replace a parameter q in the current control policy with an iteratively updated parameter q, to obtain the control policy at the next moment.

In a possible implementation, when the target action is keeping straight, the updating unit is specifically configured to:
update the current control policy based on the four-tuple information at the current moment, four-tuple information at a historical moment, and extended four-tuple information at the historical moment, to obtain the control policy at the next moment.

The four-tuple information at the historical moment corresponds to a vehicle condition at the historical moment, and includes: a feature at the historical moment, a target action at the historical moment, a reward corresponding to the target action at the historical moment, and a feature at a next moment of the historical moment, where the feature at the historical moment includes a local neighbor feature and a global statistical feature of the autonomous vehicle at the historical moment, and the feature at the next moment of the historical moment includes a local neighbor feature and a global statistical feature of the autonomous vehicle at the next moment of the historical moment; and the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

In a possible implementation, the updating unit is specifically configured to:
generate, based on $j^{th}$ four-tuple information in the four-tuple information at the current moment, the four-tuple information at the historical moment, and the extended four-tuple information at the historical moment, a target value corresponding to the $j^{th}$ four-tuple information, where j is a positive integer not greater than m, and m is a total quantity of four-tuple information included in the four-tuple information at the current moment, the four-tuple information at the historical moment, and the extended four-tuple information at the historical moment;
iteratively update, by using a gradient descent method, a parameter q in a third preset function that includes the target value corresponding to the $j^{th}$ four-tuple information; and
replace a parameter q in the current control policy with an iteratively updated parameter q, to obtain the control policy at the next moment.

In a possible implementation, when the target action is lane change, the updating unit is specifically configured to:
obtain extended four-tuple information at the current moment, where the extended four-tuple information at the current moment corresponds to an extended vehicle condition at the current moment, and the extended vehicle condition at the current moment is obtained by processing the vehicle condition at the current moment according to a symmetry rule and a monotone rule; and
update the current control policy based on the four-tuple information at the current moment, the extended four-tuple information at the current moment, four-tuple information at a historical moment, and extended four-tuple information at the historical moment to obtain the control policy at the next moment, where the four-tuple information at the historical moment corresponds to a vehicle condition at the historical moment, the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

In a possible implementation, the updating unit is specifically configured to:
generate, based on $k^{th}$ four-tuple information in the four-tuple information at the current moment, the extended four-tuple information at the current moment, the four-tuple information at the historical moment, and the extended four-tuple information at the historical moment, a target value corresponding to the $k^{th}$ four-tuple information, where k is a positive integer not greater than p, and p is a total quantity of four-tuple information included in the four-tuple information at the current moment, the extended four-tuple information at the current moment, the four-tuple information at the historical moment, and the extended four-tuple information at the historical moment;
iteratively update, by using a gradient descent method, a parameter q in a fourth preset function that includes the target value corresponding to the $k^{th}$ four-tuple information; and
replace a parameter q in the current control policy with an iteratively updated parameter q, to obtain the control policy at the next moment.

In a possible implementation, when the target action is keeping straight, the calculation unit is specifically configured to:
calculate the reward based on travel information generated after the autonomous vehicle executes the target action; and
calculate the local neighbor feature and the global statistical feature of the autonomous vehicle at the next moment based on the travel information of the autonomous vehicle at the next moment and the motion information of the obstacles in the lanes within the sensing range of the autonomous vehicle at the next moment.

In a possible implementation, when the target action is lane change, the calculation unit is specifically configured to:
calculate the reward based on travel information generated after the autonomous vehicle executes the target action, a ratio of a period of time for executing the target action to a historical average period of time, and a denseness change between obstacles in a lane in which the autonomous vehicle is located before lane change and obstacles in a lane in which the autonomous vehicle is located after lane change; and
calculate the local neighbor feature and the global statistical feature of the autonomous vehicle at the next moment based on the travel information of the autonomous vehicle at the next moment and the motion information of the obstacles in the lanes within the sensing range of the autonomous vehicle at the next moment.

In a possible implementation, the specific neighboring obstacle of the autonomous vehicle includes at least one of the following: front and back neighboring obstacles of the autonomous vehicle in a lane in which the autonomous vehicle is located, front and back neighboring obstacles of the autonomous vehicle in a left lane adjacent to the lane in which the autonomous vehicle is located, and front and back neighboring obstacles of the autonomous vehicle in a right lane adjacent to the lane in which the autonomous vehicle is located.

When the autonomous vehicle is located in a left lane, motion status information, relative to the autonomous vehicle, of the front and back neighboring obstacles of the autonomous vehicle in the left lane adjacent to the lane in which the autonomous vehicle is located is a default value; and/or when the autonomous vehicle is located in a right lane, motion status information, relative to the autonomous vehicle, of the front and back neighboring obstacles of the autonomous vehicle in the right lane adjacent to the lane in which the autonomous vehicle is located is a default value.

In a possible implementation, the global vehicle traffic statistical feature of the autonomous vehicle at the current moment includes at least one of the following: an average travel speed and an average gap of all the obstacles in the lanes within the sensing range.

According to a third aspect, an embodiment of this application provides an autonomous lane change apparatus, including a processor and a memory.

The memory is configured to store program instructions.

The processor is configured to invoke and execute the program instructions stored in the memory, and when the processor executes the program instructions stored in the memory, the autonomous lane change apparatus is configured to perform the method according to any one of the implementations of the first aspect.

According to a fourth aspect, an embodiment of this application provides a computer-readable storage medium. The computer-readable storage medium stores instructions. When the instructions are run on a computer, the computer is enabled to perform the method according to any one of the implementations of the first aspect.

According to a fifth aspect, an embodiment of this application provides a program. When executed by a processor, the program is used to perform the method according to any one of the implementations of the first aspect.

According to a sixth aspect, an embodiment of this application provides a computer program product including instructions. When the computer program product runs on a computer, the computer is enabled to perform the method according to any one of the implementations of the first aspect.

According to a seventh aspect, an embodiment of this application provides a control policy training method. The method includes the following steps:

step A: obtaining four-tuple information at a preset quantity of historical moments, where the four-tuple information at the historical moments corresponds to vehicle conditions at the historical moments, and includes: features at the historical moments, target actions of an autonomous vehicle at the historical moments, rewards corresponding to the target actions at the historical moments, and features at next moments of the historical moments, where the features at the historical moments include local neighbor features and global statistical features of the autonomous vehicle at the historical moments, and the features at the next moments of the historical moments include local neighbor features and global statistical features of the autonomous vehicle at the next moments of the historical moments; and step B: updating a current control policy based on four-tuple information at least at one first historical moment, extended four-tuple information at the at least one first historical moment, and four-tuple information at least at one second historical moment, to obtain a control policy at a next moment.

The execution of cyclically performing step A and step B ends until a quantity of execution times reaches a preset quantity of times, or the execution of cyclically performing step A and step B ends until a control policy obtained by cyclically performing step A and step B for a plurality of times satisfies a preset condition. The control policy that is finally obtained by cyclically performing step A and step B for the plurality of times is used to obtain a target action indication by an autonomous lane change apparatus when executing an autonomous lane change method.

The four-tuple information at the at least one first historical moment is four-tuple information at a historical moment at which a target action at the historical moment is lane change in the four-tuple information at the preset quantity of historical moments. The four-tuple information at the at least one second historical moment is four-tuple information at historical moments other than the four-tuple information at the at least one first historical moment in the four-tuple information at the preset quantity of historical moments. Extended four-tuple information at any first historical moment corresponds to an extended vehicle condition at the first historical moment, and the extended vehicle condition at the first historical moment is obtained by processing a vehicle condition at the first historical moment according to a symmetry rule and a monotone rule.

In the control policy training method provided in the seventh aspect, the four-tuple information at the preset quantity of historical moments is obtained. Further, the current control policy is updated based on the four-tuple information at the at least one first historical moment, the extended four-tuple information at the at least one first historical moment, and the four-tuple information at the at least one second historical moment, to obtain the control policy at the next moment. It can be learned that, on the basis of the four-tuple information at the preset quantity of historical moments, the current control policy is further updated based on the extended four-tuple information at the first historical moment in the four-tuple information at the preset quantity of historical moments, so that a more accurate control policy can be obtained, and a corresponding target action can be accurately determined.

In a possible implementation, the updating a current control policy based on four-tuple information at least at one first historical moment, extended four-tuple information at the at least one first historical moment, and four-tuple information at least at one second historical moment, to obtain a control policy at the next moment includes:

generating, based on $1^{th}$ four-tuple information in the four-tuple information at the at least one first historical moment, the extended four-tuple information at the at least one first historical moment, and the four-tuple information at the at least one second historical moment, a target value corresponding to the $1^{th}$ four-tuple information, where 1 is a positive integer not greater than q, and q is a total quantity of four-tuple information included in the four-tuple information at the at least one first historical moment, the extended four-tuple information at the at least one first historical moment, and the four-tuple information at the at least one second historical moment;

iteratively updating, by using a gradient descent method, a parameter q in a preset function that includes the target value corresponding to the $l^{th}$ four-tuple information; and replacing a parameter q in the current control policy with an iteratively updated parameter q, to obtain the control policy at the next moment.

In a possible implementation, before the obtaining four-tuple information at a preset quantity of historical moments includes:

for each historical moment, calculating a local neighbor feature and a global statistical feature of the autonomous vehicle at the historical moment based on travel information of the autonomous vehicle and motion information of obstacles in lanes within a sensing range of the autonomous vehicle;

obtaining a target action indication at the historical moment based on the local neighbor feature and the global statistical feature at the historical moment, and a current control policy at the historical moment, where the target action indication is used to indicate the autonomous vehicle to execute a target action, and the target action includes at least two types: lane change or keeping straight;

obtaining feedback information by executing the target action, where the feedback information includes travel information generated after the autonomous vehicle executes the target action, travel information of the autonomous vehicle at a next moment, and motion information of the obstacles in the lanes within the sensing range of the autonomous vehicle at the next moment; and when the target action is lane change, the feedback information further includes a ratio of a period of time for executing the target action to a historical average period of time, and a denseness change between obstacles in a lane in which the autonomous vehicle is located before lane change and obstacles in a lane in which the autonomous vehicle is located after lane change, where the historical average period of time is an average period of time for which the autonomous vehicle executes a similar action within a preset historical period of time;

calculating, based on the feedback information, a local neighbor feature and a global vehicle traffic statistical feature of the autonomous vehicle at the next moment of the historical moment, and a reward corresponding to the target action; and storing the four-tuple information at the historical moment.

In a possible implementation, when the target action is keeping straight, the calculating, based on the feedback information, a reward corresponding to the target action includes:

calculating the reward based on travel information generated after the autonomous vehicle executes the target action.

In a possible implementation, when the target action is lane change, the calculating, based on the feedback information, a reward corresponding to the target action includes:

calculating the reward based on travel information generated after the autonomous vehicle executes the target action, a ratio of a period of time for executing the target action to a historical average period of time, and a denseness change between obstacles in a lane in which the autonomous vehicle is located before lane change and obstacles in a lane in which the autonomous vehicle is located after lane change.

According to an eighth aspect, an embodiment of this application provides a control policy training apparatus, including:

a first obtaining module, configured to perform step A of obtaining four-tuple information at a preset quantity of historical moments, where the four-tuple information at the historical moments corresponds to vehicle conditions at the historical moments, and includes: features at the historical moments, target actions of an autonomous vehicle at the historical moments, rewards corresponding to the target actions at the historical moments, and features at next moments of the historical moments, where the features at the historical moments include local neighbor features and global statistical features of the autonomous vehicle at the historical moments, and the features at the next moments of the historical moments include local neighbor features and global statistical features of the autonomous vehicle at the next moments of the historical moments; and an updating module, configured to perform step B of updating a current control policy based on four-tuple information at least at one first historical moment, extended four-tuple information at the at least one first historical moment, and four-tuple information at least at one second historical moment, to obtain a control policy at a next moment.

The execution of cyclically performing step A and step B ends until a quantity of execution times reaches a preset quantity of times, or the execution of cyclically performing step A and step B ends until a control policy obtained by cyclically performing step A and step B for a plurality of times satisfies a preset condition. The control policy that is finally obtained by cyclically performing step A and step B for the plurality of times is used to obtain a target action indication by an autonomous lane change apparatus when executing an autonomous lane change method.

The four-tuple information at the at least one first historical moment is four-tuple information at a historical moment at which a target action at the historical moment is lane change in the four-tuple information at the preset quantity of historical moments. The four-tuple information at the at least one second historical moment is four-tuple information at historical moments other than the four-tuple information at the at least one first historical moment in the four-tuple information at the preset quantity of historical moments. Extended four-tuple information at any first historical moment corresponds to an extended vehicle condition at the first historical moment, and the extended vehicle condition at the first historical moment is obtained by processing a vehicle condition at the first historical moment according to a symmetry rule and a monotone rule.

In a possible implementation, the updating module includes:

a generation unit, configured to generate, based on $l^{th}$ four-tuple information in the four-tuple information at the at least one first historical moment, the extended four-tuple information at the at least one first historical moment, and the four-tuple information at the at least one second historical moment, a target value corresponding to the $l^{th}$ four-tuple information, where l is a positive integer not greater than q, and q is a total quantity of four-tuple information included in the four-tuple information at the at least one first historical moment, the extended four-tuple information at the at least one first historical moment, and the four-tuple information at the at least one second historical moment;

an updating unit, configured to iteratively update, by using a gradient descent method, a parameter q in a preset function that includes the target value corresponding to the $1^{th}$ four-tuple information; and a replacing unit, configured to replace a parameter q in the current control policy with an iteratively updated parameter q, to obtain the control policy at the next moment.

In a possible implementation, the apparatus further includes:

a first calculation module, configured to: for each historical moment, calculate a local neighbor feature and a global statistical feature of the autonomous vehicle at the historical moment based on travel information of the autonomous vehicle and motion information of obstacles in lanes within a sensing range of the autonomous vehicle;

a second obtaining module, configured to obtain a target action indication at the historical moment based on the local neighbor feature and the global statistical feature at the historical moment, and a current control policy at the historical moment, where the target action indication is used to indicate the autonomous vehicle to execute a target action, and the target action includes at least two types: lane change or keeping straight; and a feedback module, configured to obtain feedback information by executing the target action, where the feedback information includes travel information generated after the autonomous vehicle executes the target action, travel information of the autonomous vehicle at a next moment, and motion information of the obstacles in the lanes within the sensing range of the autonomous vehicle at the next moment; and when the target action is lane change, the feedback information further includes a ratio of a period of time for executing the target action to a historical average period of time, and a denseness change between obstacles in a lane in which the autonomous vehicle is located before lane change and obstacles in a lane in which the autonomous vehicle is located after lane change, where the historical average period of time is an average period of time for which the autonomous vehicle executes a similar action within a preset historical period of time;

a second calculation module, configured to calculate, based on the feedback information, the local neighbor feature and the global vehicle traffic statistical feature of the autonomous vehicle at the next moment of the historical moment, and the reward corresponding to the target action; and a storage module, configured to store the four-tuple information at the historical moment.

In a possible implementation, when the target action is keeping straight, the second calculation module is specifically configured to:

calculate the reward based on travel information generated after the autonomous vehicle executes the target action.

In a possible implementation, when the target action is lane change, the second calculation module is specifically configured to:

calculate the reward based on travel information generated after the autonomous vehicle executes the target action, a ratio of a period of time for executing the target action to a historical average period of time, and a denseness change between obstacles in a lane in which the autonomous vehicle is located before lane change and obstacles in a lane in which the autonomous vehicle is located after lane change.

According to a ninth aspect, an embodiment of this application provides a control policy training apparatus, including a processor and a memory.

The memory is configured to store program instructions.

The processor is configured to invoke and execute the program instructions stored in the memory. When the processor executes the program instructions stored in the memory, the control policy training apparatus is configured to perform the method according to any one of the implementations of the seventh aspect.

According to a tenth aspect, an embodiment of this application provides a computer-readable storage medium. The computer-readable storage medium stores instructions. When the instructions are run on a computer, the computer is enabled to perform the method according to any one of the implementations of the seventh aspect.

According to an eleventh aspect, an embodiment of this application provides a program. When executed by a processor, the program is used to perform the method according to any one of the implementations of the seventh aspect.

According to a twelfth aspect, an embodiment of this application provides a computer program product including instructions. When the computer program product runs on a computer, the computer is enabled to perform the method according to any one of the implementations of the seventh aspect.

According to a thirteenth aspect, an embodiment of this application provides a chip. The chip includes a processor and a data interface. The processor reads, through the data interface, instructions stored in a memory, to perform the method according to any one of the implementations of the first aspect or any one of the implementations of the seventh aspect.

Optionally, in an implementation, the chip may further include the memory. The memory stores instructions, and the processor is configured to execute the instructions stored in the memory. When the instructions are executed, the processor is configured to perform the method according to any one of the implementations of the first aspect or any one of the implementations of the seventh aspect.

According to a fourteenth aspect, an embodiment of this application provides an electronic device. The electronic device includes the autonomous lane change apparatus according to any one of the implementations of the second aspect or any one of the implementations of the third aspect.

According to a fifteenth aspect, an embodiment of this application provides an electronic device. The electronic device includes the control policy training apparatus according to any one of the implementations of the second aspect or any one of the implementations of the third aspect.

DESCRIPTION OF EMBODIMENTS

Explanations and descriptions about application scenarios and some terms related to embodiments of this application are provided.

An autonomous lane change method and apparatus, and a storage medium provided in the embodiments of this application can be used in a lane change scenario of an autonomous vehicle. For example, the autonomous lane change method and apparatus, and the storage medium provided in the embodiments of this application can be used in a scenario A and a scenario B. The following separately provides brief descriptions about the scenario A and the scenario B.

Scenario A:

In a multi-lane travel process, an autonomous vehicle needs to send a "straight-forward" or "lane-change" command at an appropriate moment to increase a travel speed. For example, as there is a vehicle traveling at a low speed in front of the autonomous vehicle in a lane in which the autonomous vehicle is located, the autonomous vehicle needs to bypass the front vehicle.

Scenario B:

In a multi-lane travel process of the autonomous vehicle, if there is a ramp, an intersection, or other road structures in a lane in which the autonomous vehicle is located, the autonomous vehicle needs to change to a corresponding target lane before reaching the ramp or the intersection, to complete a travel task. For example, if the autonomous vehicle travels in a leftmost lane of a road, and there is an intersection 500 meters ahead, the autonomous vehicle needs to change to a rightmost lane before reaching the intersection, and turn right at the intersection to reach a destination.

Certainly, the autonomous lane change method and apparatus, and the storage medium provided in the embodiments of this application may alternatively be applied to other scenarios. This is not limited in the embodiments of this application.

Figure 1:
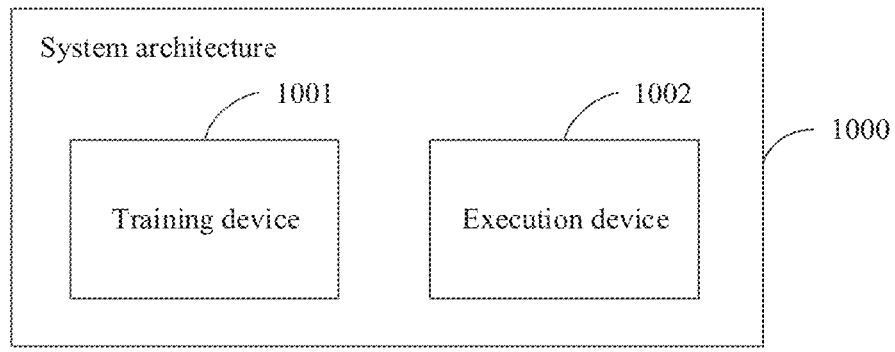
FIG. 1 is a schematic diagram of a system architecture according to an embodiment of this application.

FIG. 1 is a schematic diagram of a system architecture according to an embodiment of this application. As shown in FIG. 1, the system architecture 1000 provided in this embodiment of this application may include a training device 1001 and an execution device 1002. The training device 1001 is configured to train a control policy according to a control policy training method provided in the embodiments of this application. The execution device 1002 is configured to determine, according to the control policy trained by the training device 1001, a target action according to an autonomous lane change method provided in the embodiments of this application. Certainly, the execution device 1002 may alternatively be configured to train the control policy in real time, or train the control policy every preset duration.

In the embodiments of this application, the control policy training method may be performed by the training device 1001, or may be performed by a control policy training apparatus in the training device 1001. For example, the control policy training apparatus provided in the embodiments of this application may be implemented by using software and/or hardware.

In the embodiments of this application, the autonomous lane change method may be performed by the execution device 1002, or may be performed by an autonomous lane change apparatus in the execution device 1002. For example, the autonomous lane change apparatus provided in the embodiments of this application may be implemented by using software and/or hardware.

For example, the training device 1001 provided in this embodiment of this application may include but not be limited to a model training platform device.

For example, the execution device 1002 provided in this embodiment of this application may include but not be limited to an autonomous vehicle or a control device in the autonomous vehicle.

Figure 2:
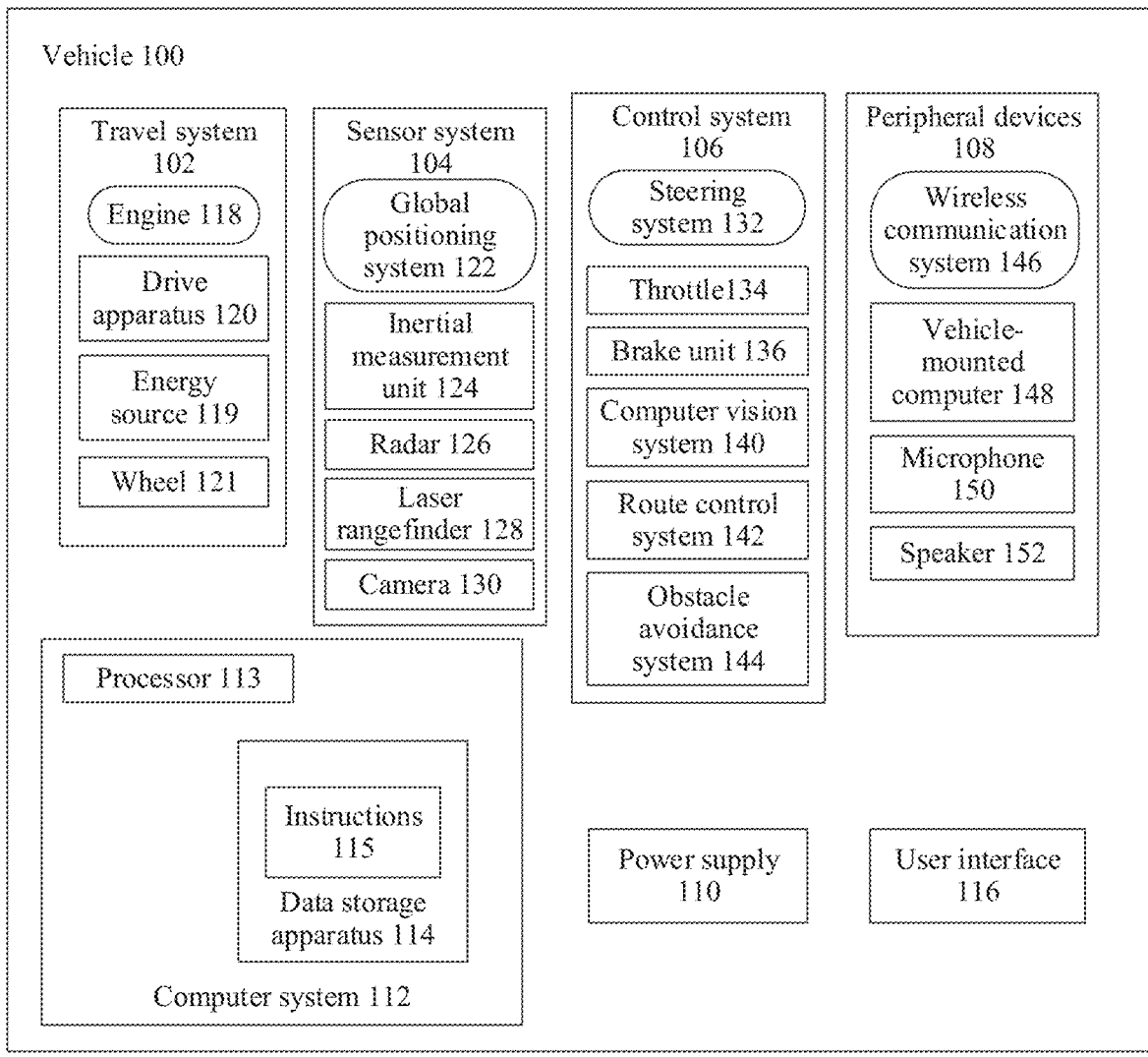
FIG. 2 is a function block diagram of a vehicle 100 according to an embodiment of this application.

FIG. 2 is a function block diagram of a vehicle 100 according to an embodiment of this application. In an embodiment, the vehicle 100 is configured to be in a fully or partially autonomous driving mode. For example, when the vehicle 100 is configured to be in a partially autonomous driving mode, the vehicle 100 may further determine a current situation of the vehicle and its ambient environment based on human operations, determine a possible behavior of at least one vehicle in the ambient environment, determine a confidence level corresponding to the likelihood that the vehicle is going to execute the possible behavior, and control the vehicle 100 based on the determined information. When the vehicle 100 is in the autonomous driving mode, the vehicle 100 may be set to operate without interaction with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include fewer or more subsystems, and each subsystem may include a plurality of elements. In addition, all the subsystems and elements of the vehicle 100 may be wiredly or wirelessly interconnected to each other.

The travel system 102 may include a component that provides power for the vehicle 100 to move. In an embodiment, the travel system 102 may include an engine 118, an energy source 119, a drive apparatus 120, and a wheel/tire 121. The engine 118 may be an internal combustion engine, an electric motor, an air compression engine, or a combination of other types of engines, for example, a hybrid engine formed by a gasoline engine and an electric motor, or a hybrid engine formed by an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, and other power sources. The energy source 119 may also provide energy for another system of the vehicle 100.

The drive apparatus 120 may transmit mechanical power from the engine 118 to the wheel 121. The drive apparatus 120 may include a gearbox, a differential, and a drive shaft. In an embodiment, the drive apparatus 120 may further include another component, for example, a clutch. The drive shaft may include one or more shafts that may be coupled to one or more wheels 121.

The sensor system 104 may include several sensors that sense information about an ambient environment of the vehicle 100. For example, the sensor system 104 may include a positioning system 122 (where the positioning system may be a global positioning system (GPS), a BeiDou system, or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an oil temperature gauge) in an internal system of the monitored vehicle 100. Sensor data from one or more of these sensors can be used to detect an object and corresponding features (a location, a shape, a direction, a speed, and the like) of the object. Such detection and identification are key functions of a safety operation of the autonomous vehicle 100.

The positioning system 122 may be configured to estimate a geographical location of the vehicle 100. The IMU 124 is configured to sense location and orientation changes of the vehicle 100 based on inertial acceleration. In an embodiment, the IMU 124 may be a combination of an accelerometer and a gyroscope.

The radar 126 may sense an object in the ambient environment of the vehicle 100 by using a radio signal. In some embodiments, in addition to sensing the object, the radar 126 may be further configured to sense a speed and/or a moving direction of the object.

The laser rangefinder 128 may sense, by using a laser, an object in an environment in which the vehicle 100 is located. In some embodiments, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 controls operations of the vehicle 100 and the components of the vehicle 100. The control system 106 may include various elements, including a steering system 132, a throttle 134, a brake unit 136, a sensor fusion algorithm 138, a computer vision system 140, a route control system 142, and an obstacle avoidance system 144.

The steering system 132 may operate to adjust a moving direction of the vehicle 100. For example, in an embodiment, the steering system 132 may be a steering wheel system.

The throttle 134 is configured to control an operating speed of the engine 118 and further control a speed of the vehicle 100.

The brake unit 136 is configured to control the vehicle 100 to decelerate. The brake unit 136 may use friction to reduce a rotational speed of the wheel 121. In another embodiment, the brake unit 136 may convert kinetic energy of the wheel 121 into current. The brake unit 136 may alternatively reduce a rotational speed of the wheel 121 by using other methods, to control the speed of the vehicle 100.

The computer vision system 140 may operate to process and analyze images captured by the camera 130 to identify objects and/or features in the ambient environment of the vehicle 100. The objects and/or features may include traffic signals, road boundaries, and obstacles. The computer vision system 140 may use an object recognition algorithm, a structure from motion (SFM) algorithm, video tracking, and other computer vision technologies. In some embodiments, the computer vision system 140 may be configured to: draw a map for an environment, track an object, estimate a speed of the object, and the like.

The route control system 142 is configured to determine a travel route of the vehicle 100. In some embodiments, the route control system 142 may combine data from the sensor 138, a global positioning system (GPS) 122, and one or more predetermined maps to determine the travel route of the vehicle 100.

The obstacle avoidance system 144 is configured to identify, evaluate, and avoid or otherwise bypass a potential obstacle in an environment of the vehicle 100.

Certainly, for example, the control system 106 may add or alternatively include components in addition to those shown and described. Alternatively, the control system 106 may not include some of the foregoing components.

The vehicle 100 interacts with an external sensor, another vehicle, another computer system, or a user by using the peripheral device 108. The peripheral device 108 may include a wireless communication system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive user input. The vehicle-mounted computer 148 may perform operations through a touchscreen. In another case, the peripheral device 108 may provide a means for the vehicle 100 to communicate with another device located in the vehicle. For example, the microphone 150 may receive audio (for example, according to a voice command or based on other audio input) from the user of the vehicle 100. Similarly, the speaker 152 may output audio to the user of the vehicle 100.

The wireless communication system 146 may communicate wirelessly with one or more devices directly or through a communication network. For example, the wireless communication system 146 may use 3G cellular communication such as code division multiple access (CDMA), EVD0 and the global system for mobile communications (GSM)/general packet radio service (GPRS), 4G cellular communication such as LTE, or 5G cellular communication. The wireless communication system 146 may communicate with a wireless local area network (WLAN) using wireless-fidelity (Wi-Fi). In some embodiments, the wireless communication system 146 may communicate directly with a device by using an infrared link, Bluetooth, or a ZigBee protocol. Other wireless protocols, for example, various vehicle communication systems, such as the wireless communication system 146, may include one or more dedicated short-range communications (DSRC) devices, and these devices may include public and/or private data communication between the vehicle and/or roadside stations.

The power supply 110 may supply power to various components of the vehicle 100. In an embodiment, the power supply 110 may be a rechargeable lithium-ion or lead-acid battery. One or more battery packs of such batteries may be configured as the power supply to supply power to the components of the vehicle 100. In some embodiments, the power supply 110 and the energy source 119 may be implemented together, for example, in some pure electric vehicles.

Some or all functions of the vehicle 100 are controlled by the computer system 112. The computer system 112 may include at least one processor 113. The processor 113 executes instructions 115 stored in a non-transitory computer-readable medium such as a data storage apparatus 114. The computer system 112 may alternatively be a plurality of computing devices that control an individual component or a subsystem of the vehicle 100 in a distributed manner.

The processor 113 may be any conventional processor, such as a commercially available central processing unit (CPU). Alternatively, the processor may be an application-specific integrated circuit (ASIC) for specialized applications or other dedicated devices such as a hardware-based processor. Although FIG. 1 functionally illustrates other elements of the processor, the memory, and the computer system 112 in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer. Thus, it is understood that a reference to the processor or the computer includes a reference to a set of processors or computers or memories that may or may not operate in parallel. Different from using a single processor to perform the steps described herein, some components such as a steering component and a deceleration component each may include respective processors. The processor performs only computation related to a component-specific function.

In various aspects described herein, the processor may be located far away from the vehicle and wirelessly communicate with the vehicle. In other aspects, some of the processes described herein are performed on the processor disposed inside the vehicle, while others are performed by a remote processor. The processes include necessary steps for performing a single operation.

In some embodiments, the data storage apparatus 114 may include the instructions 115 (for example, program logic), and the instructions 115 may be executed by the processor 113 to perform various functions of the vehicle 100, including the functions described above. The data storage apparatus 114 may also include additional instructions, for example, instructions for sending data to, receiving data from, interacting with, and/or controlling one or more of the travel system 102, the sensor system 104, the control system 106, and the peripheral device 108.

In addition to the instructions 115, the data storage apparatus 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode.

The user interface 116 is configured to provide information for or receive information from the user of the vehicle 100. Optionally, the user interface 116 may include one or more input/output devices in a set of peripheral devices 108, for example, the wireless communication system 146, the vehicle-mounted computer 148, the microphone 150, and the speaker 152.

The computer system 112 may control functions of the vehicle 100 based on input received from various subsystems (for example, the travel system 102, the sensor system 104, and the control system 106) and from the user interface 116. For example, the computer system 112 may use input from the control system 106 to control the steering unit 132 to avoid an obstacle detected by the sensor system 104 and the obstacle avoidance system 144. In some embodiments, the computer system 112 may operate to provide control on the vehicle 100 and the subsystems of the vehicle 100 in many aspects.

Optionally, one or more of the foregoing components may be installed separately from or associated with the vehicle 100. For example, the data storage apparatus 114 may be partially or totally separated from the vehicle 100. The foregoing components may be communicatively coupled together in a wired and/or wireless manner.

Optionally, the foregoing components are merely examples. In actual application, components in the foregoing modules may be added or deleted depending on actual requirements. FIG. 2 should not be understood as any limitation on the embodiments of this application.

An autonomous vehicle traveling on a road, such as the vehicle 100, may identify objects in the ambient environment of the vehicle 100 to determine to adjust a current speed. The objects may be the other vehicles, traffic control devices, or objects of other types. In some examples, the autonomous vehicle may separately consider each identified obstacle, and determine an adjusted speed of the autonomous vehicle based on characteristics of each identified obstacle such as a current speed, an acceleration, and a distance between the autonomous vehicle (this autonomous vehicle) and other vehicles.

Optionally, the autonomous vehicle 100 or computing devices associated with the autonomous vehicle 100 (the computer system 112, the computer vision system 140, and the data storage apparatus 114 in FIG. 2) may predict a behavior of an identified obstacle based on characteristics of the identified obstacle and statuses of the ambient environment (for example, traffic, rain, or ice on the road). Optionally, each of the identified obstacles depends on a behavior of each other, and therefore a behavior of a single identified obstacle may be predicted by considering all behaviors of the identified obstacles. The vehicle 100 can adjust its speed based on the predicted behavior of the identified object. In other words, the autonomous vehicle can determine adjustment (for example, acceleration, deceleration, or stop) based on the predicted behavior of the object. In this process, another factor may also be considered to determine the speed of the vehicle 100, for example, a horizontal location of the vehicle 100 on a road on which the vehicle travels, a curvature of the road, and proximity between a static object and a dynamic object.

In addition to providing an instruction for adjusting the speed of the autonomous vehicle, the computing device may further provide an instruction for modifying a steering angle of the vehicle 100, so that the autonomous vehicle can follow a given track and/or maintain safe horizontal and vertical distances from an obstacle (for example, a car in a neighboring lane of the road) near the autonomous vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in the embodiments of the present disclosure.

Figure 3:
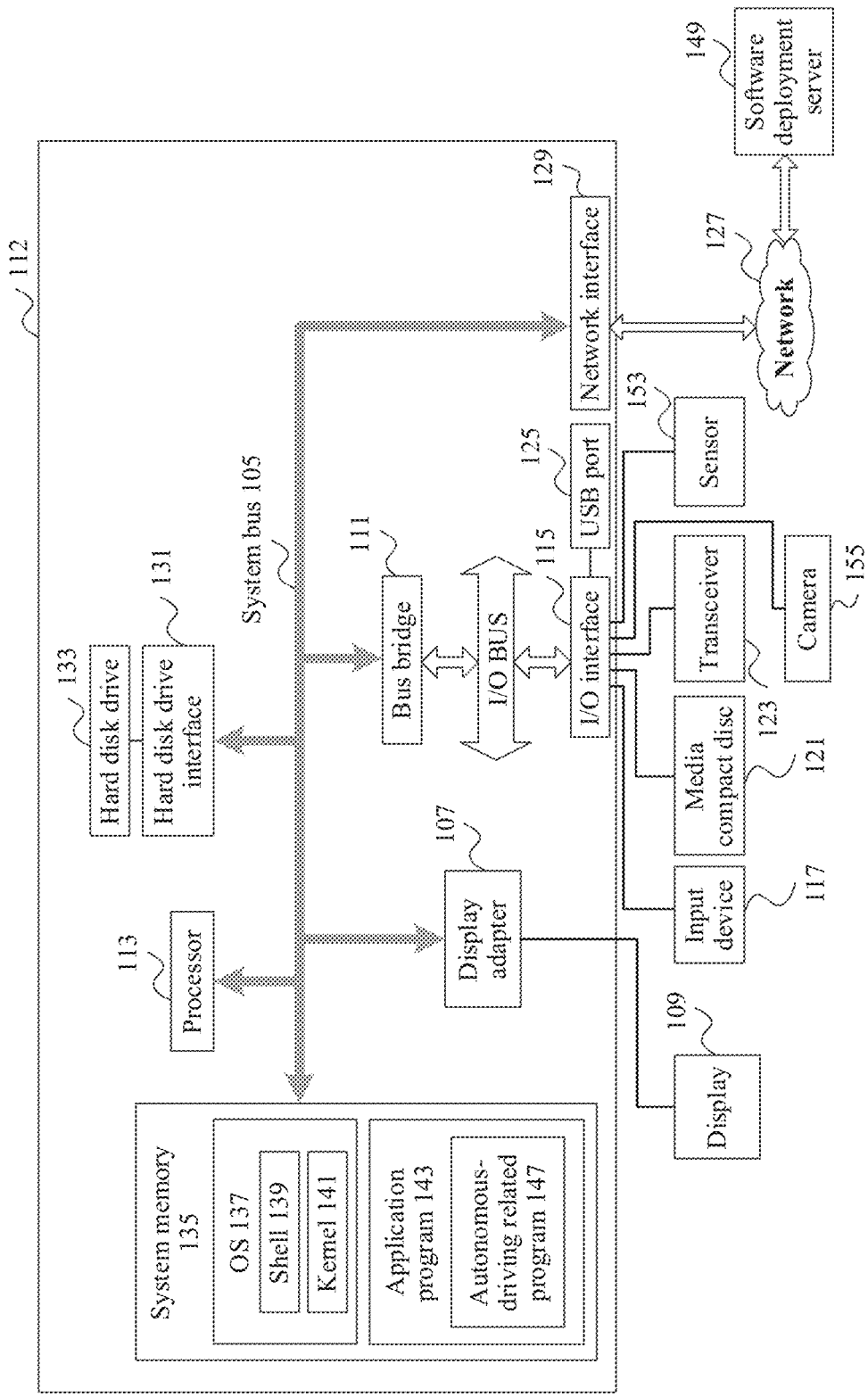
FIG. 3 is a schematic structural diagram of the computer system in FIG. 2.

FIG. 3 is a schematic structural diagram of the computer system 112 in FIG. 2. As shown in FIG. 3, the computer system 112 includes a processor 113, and the processor 113 is coupled to a system bus 105. The processor 113 may be one or more processors, and each processor may include one or more processor cores. A display adapter (video adapter) 107 may drive a display 109, and the display 109 is coupled to the system bus 105. The system bus 105 is coupled to an input/output (I/O) bus through a bus bridge 111. An I/O interface 115 is coupled to the I/O bus. The I/O interface 115 communicates with a plurality of I/O devices, such as an input device 117 (such as a keyboard, a mouse, or a touchscreen), and a multimedia compact disc (media tray) 121 (such as a CD-ROM or a multimedia interface). The computer system 112 further includes a transceiver 123 (which can send and/or receive a radio communication signal), a camera 155 (which can capture static and dynamic digital video images), and an external USB interface 125. Optionally, an interface connected to the I/O interface 115 may be a universal serial bus (USB) interface.

The processor 113 may be any conventional processor, including a reduced instruction set computing (RISC) processor, a complex instruction set computing (CISC) processor, or a combination thereof. Optionally, the processor may be a dedicated apparatus such as an application-specific integrated circuit (ASIC). Optionally, the processor 113 may be a neural-network processor or a combination of the neural-network processor and the foregoing conventional processor.

Optionally, in various embodiments of this application, the computer system may be far away from the autonomous vehicle and can wirelessly communicate with the autonomous vehicle. In other aspects, some of the processes described in this specification are performed by a processor disposed inside the autonomous vehicle, and others are performed by a remote processor, including actions required to perform a single operation.

The computer system 112 may communicate with a software deployment server 149 through a network interface 129. The network interface 129 is a hardware network interface, for example, a network interface card. A network 127 may be an external network such as the Internet, or an internal network such as the Ethernet or a virtual private network (VPN). Optionally, the network 127 may alternatively be a wireless network such as a Wi-Fi network or a cellular network.

A hard disk drive interface 131 is coupled to the system bus 105. The hard disk drive interface 131 is connected to a hard disk drive 133. A system memory 135 is coupled to the system bus 105. Software running in the system memory 135 may include an operating system (OS) 137 and an application program 143 of the computer system 112.

The operating system includes a shell 139 and a kernel 141. The shell 139 is an interface between a user and the kernel of the operating system. The shell is an outermost layer of the operating system. The shell manages interaction between the user and the operating system: waiting for input of the user, interpreting the input of the user for the operating system, and processing various output of the operating system.

The kernel 141 includes components of the operating system that are configured to manage a memory, a file, a peripheral, and system resources. The kernel directly interacts with hardware. The kernel 141 of the operating system usually runs processes, provides inter-process communication, and provides CPU time slice management, interruption, memory management, I/O management, and the like.

The application program 141 includes related programs for controlling vehicle's autonomous driving, for example, a program for managing interaction between the autonomous vehicle and an obstacle on a road, a program for controlling a route or a speed of the autonomous vehicle, or a program for controlling interaction between the autonomous vehicle and another autonomous vehicle on the road. The application program 141 may be on a system of the software deployment server (deploying server) 149. In one embodiment, when the application program 141 needs to be executed, the computer system may download the application program 143 from the deploying server 149.

A sensor 153 is associated with the computer system. The sensor 153 is configured to detect an ambient environment of the computer system 112. For example, the sensor 153 can detect animals, automobiles, obstacles, pedestrian crosswalks, and the like. Further, the sensor can detect ambient environments of the animals, the automobiles, the obstacles, or the pedestrian crosswalks. For example, the sensor can detect the ambient environment of animals such as other animals in the ambient environment, a weather condition, and brightness of the ambient environment. Optionally, if the computer system 112 is located on the autonomous vehicle, the sensor may be a camera, an infrared sensor, a chemical detector, a microphone, or the like.

Figure 4:
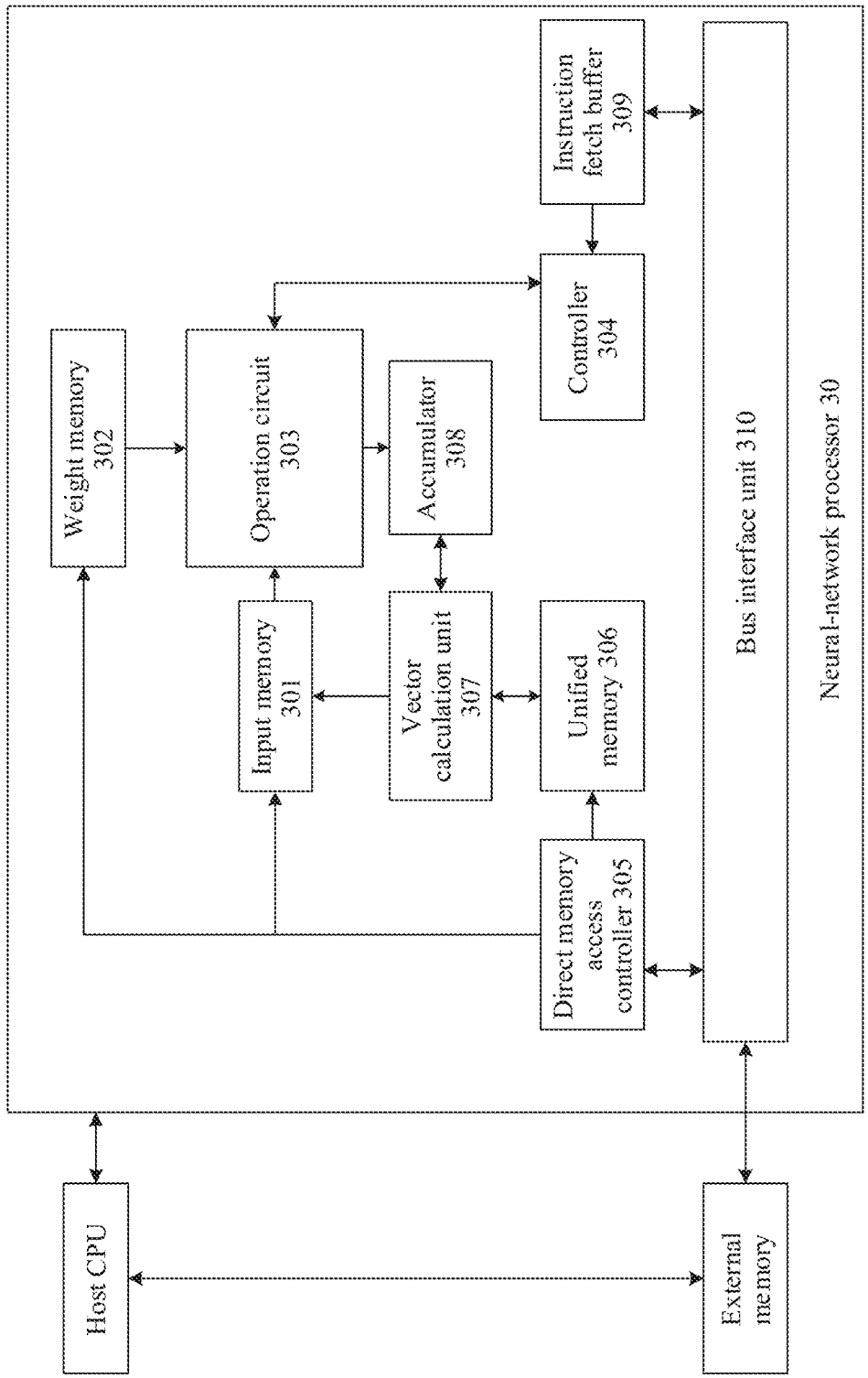
FIG. 4 is a schematic diagram of a hardware structure of a chip according to an embodiment of this application.

FIG. 4 is a schematic diagram of a hardware structure of a chip according to an embodiment of this application. As shown in FIG. 4, the chip may include a neural-network processor 30. The chip may be disposed on the execution device 1002 shown in FIG. 1, to complete the autonomous lane change method provided in the embodiments of this application. Alternatively, the chip may be disposed on the training device 1001 shown in FIG. 1, to complete the control policy training method provided in the embodiments of this application.

The neural-network processor 30 may be any processor, such as a neural processing unit (NPU), a tensor processing unit (TPU), or a graphics processing unit (GPU), suitable for large-scale exclusive OR operation processing. The NPU is used as an example. The NPU may be mounted, as a coprocessor, onto a host CPU, and the host CPU allocates a task to the NPU. A core part of the NPU is an operation circuit 303. The operation circuit 303 is controlled by a controller 304 to extract matrix data from memories (301 and 302) and perform multiplication and addition.

In some implementations, the operation circuit 303 internally includes a plurality of processing units (PEs). In some implementations, the operation circuit 303 is a two-dimensional systolic array. The operation circuit 303 may alternatively be a one-dimensional systolic array or another electronic circuit that can perform mathematical operations such as multiplication and addition. In some implementations, the operation circuit 303 is a general-purpose matrix processor.

For example, it is assumed that there are an input matrix A, a weight matrix B, and an output matrix C. The operation circuit 303 obtains weight data of the matrix B from the weight memory 302, and buffers the weight data on each PE in the operation circuit 303. The operation circuit 303 obtains input data of the matrix A from the input memory 301, performs a matrix operation based on the input data of the matrix A and the weight data of the matrix B, to obtain a partial result or a final result of the matrix, and stores the partial result or the final result into an accumulator 308.

A unified memory 306 is configured to store input data and output data. The weight data is directly transferred to the weight memory 302 by using a direct memory access controller (DMAC) 305. The input data is also transferred to the unified memory 306 by using the DMAC.

A bus interface unit (BIU) 310 is used for interaction between the DMAC and an instruction fetch buffer 309. The bus interface unit 301 is further used by the instruction fetch buffer 309 to obtain an instruction from an external memory. The bus interface unit 301 is further used by the storage unit access controller 305 to obtain original data of the input matrix A or the weight matrix B from the external memory.

The DMAC is mainly configured to transfer input data in an external memory DDR to the unified memory 306, or transfer the weight data to the weight memory 302, or transfer the input data to the input memory 301.

A vector calculation unit 307 includes a plurality of operation processing units, and if required, performs further processing such as vector multiplication, vector addition, an exponential operation, a logarithmic operation, or value comparison on an output of the operation circuit 303. The vector calculation unit 307 is mainly configured for calculation at a non-convolutional layer or a fully connected (FC) layer of a neural network, and may specifically perform pooling, normalization, and other calculation. For example, the vector calculation unit 307 may apply a non-linear function to the output of the operation circuit 303. For example, the non-linear function is applied to a vector of an accumulated value to generate an activation value. In some implementations, the vector calculation unit 307 generates a normalized value, a combined value, or both.

In some implementations, the vector calculation unit 307 stores a processed vector into the unified memory 306. In some implementations, a vector processed by the vector calculation unit 307 can be used as an activated input of the operation circuit 303.

The instruction fetch buffer 309 connected to the controller 304 is configured to store an instruction used by the controller 304.

The unified memory 306, the input memory 301, the weight memory 302, and the instruction fetch buffer 309 all are on-chip memories. The external memory is independent of the hardware architecture of the NPU.

Figure 5:
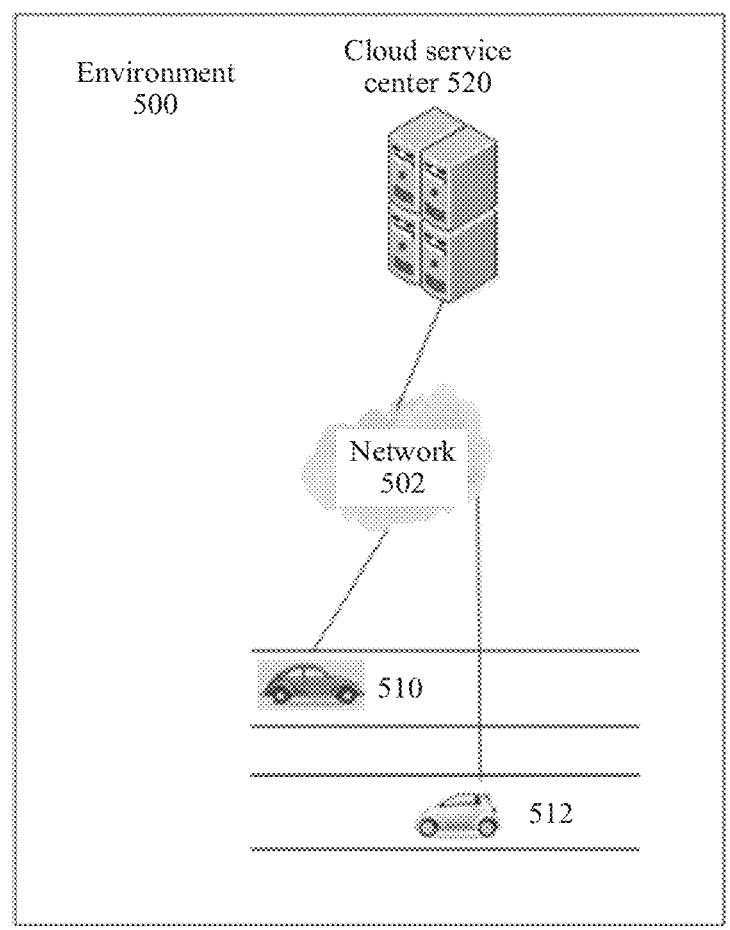
FIG. 5 is a schematic diagram of an operating environment according to an embodiment of this application.

FIG. 5 is a schematic diagram of an operating environment according to an embodiment of this application. As shown in FIG. 5, a cloud service center may receive information (for example, data collected by vehicle sensors or other information) from autonomous vehicles 510 and 512 in an operating environment 500 of the cloud service center via a network 502 (for example, a wireless communication network).

For example, the cloud service center 520 may receive travel information (for example, a travel speed and/or a travel location) of the autonomous vehicle 510 at any moment from the autonomous vehicle 510 via the network 502 (for example, a wireless communication network) and travel information of another vehicle within a sensing range of the autonomous vehicle 510, and the like.

The cloud service center 520 may run, based on the received information, a related program that is for controlling vehicle's autonomous driving and that is stored in the cloud service center 520, to control the autonomous vehicles 510 and 512. The related program for controlling vehicle's autonomous driving may be a program for managing interaction between the autonomous vehicle and an obstacle on a road, a program for controlling a route or a speed of the autonomous vehicle, or a program for controlling interaction between the autonomous vehicle and another autonomous vehicle on the road.

The network 502 provides a map to the autonomous vehicles 510 and 512.

For example, a plurality of cloud service centers may receive, validate, combine, and/or send information reports. In some examples, information reports and/or sensor data may also be sent between autonomous vehicles.

In some examples, the cloud service center 520 may send, to the autonomous vehicle (or an autonomous car), a suggested solution (for example, prompt for an obstacle ahead and a solution about how to bypass the obstacle to the autonomous vehicle) that is made based on possible driving conditions within the environment. For example, the cloud service center 520 may assist the vehicle in determining how to travel when there is a specific obstacle ahead in the environment. The cloud service center 520 may send, to the autonomous vehicle, a response indicating how the vehicle should travel in a given scenario. For example, the cloud service center may determine, based on collected sensor data, that there is a temporary stop sign in the road ahead; and further determine, based on a "lane closed" sign and sensor data from a construction vehicle, that the lane is closed due to construction. Accordingly, the cloud service center 520 may send a suggested operation mode to the autonomous vehicle to bypass the obstacle (for example, indicating the vehicle to change to another lane). When the cloud service center 520 observes a video stream within its operating environment and has confirmed that the autonomous vehicle can safely and successfully bypass the obstacle, the operation steps used by the autonomous vehicle may be added to the driving information map. Accordingly, this information may be sent to other vehicles in the area that may encounter the same obstacle, to assist the other vehicles in identifying the closed lane and knowing how to bypass the obstacle.

It should be noted that, the autonomous vehicle 510 and/or 512 in a running process may autonomously control traveling, without being controlled by the cloud service center 520.

A local neighbor feature at any moment in the embodiments of this application is used to indicate motion status information (for example, a relative distance and a relative speed) of a specific neighboring obstacle of the autonomous vehicle relative to the autonomous vehicle.

For example, the specific neighboring obstacle may include but not be limited to at least one of the following: front and back neighboring obstacles of the autonomous vehicle in a lane in which the autonomous vehicle is located, front and back neighboring obstacles of the autonomous vehicle in a left lane adjacent to the lane in which the autonomous vehicle is located, and front and back neighboring obstacles of the autonomous vehicle in a right lane adjacent to the lane in which the autonomous vehicle is located.

For example, when the autonomous vehicle is located in a left lane, motion status information, relative to the autonomous vehicle, of the front and back neighboring obstacles of the autonomous vehicle in the left lane adjacent to the lane in which the autonomous vehicle is located is a default value; and/or when the autonomous vehicle is located in a right lane, motion status information, relative to the autonomous vehicle, of the front and back neighboring obstacles of the autonomous vehicle in the right lane adjacent to the lane in which the autonomous vehicle is located is a default value.

The obstacle in the embodiments of this application may be a dynamically moving obstacle, or may be a static obstacle. For example, the obstacle may include but not be limited to at least one of the following: an autonomous vehicle, a non-autonomous motor vehicle, a person, or an object. For example, when the specific neighboring obstacle is a static obstacle, the relative distance of the specific neighboring obstacle relative to the autonomous vehicle may be a distance between the neighboring obstacle and the autonomous vehicle, and the relative speed of the specific neighboring obstacle relative to the autonomous vehicle may be a moving speed of the autonomous vehicle.

For example, the local neighbor feature of the autonomous vehicle at any moment may include but not be limited to: a relative speed $V_M^f/V_{ego}$ and a relative distance $dist_M^f/V_{ego}$ of a front neighboring obstacle of the autonomous vehicle in the lane in which the autonomous vehicle is located relative to the autonomous vehicle, a relative speed $V_M^b/V_{ego}$ and a relative distance $dist_M^b/V_{ego}$ of a back neighboring obstacle of the autonomous vehicle in the lane in which the autonomous vehicle is located relative to the autonomous vehicle, a relative speed $V_L^f/V_{ego}$ and a relative distance $dist_L^f/V_{ego}$ of a front neighboring obstacle of the autonomous vehicle in the left lane adjacent to the lane in which the autonomous vehicle is located relative to the autonomous vehicle, a relative speed $V_L^b/V_{ego}$ and a relative distance $dist_L^b/V_{ego}$ of a back neighboring obstacle of the autonomous vehicle in the left lane adjacent to the lane in which the autonomous vehicle is located relative to the autonomous vehicle, a relative speed $V_R^f/V_{ego}$ and a relative distance $dist_R^f/V_{ego}$ of a front neighboring obstacle of the autonomous vehicle in the right lane adjacent to the lane in which the autonomous vehicle is located relative to the autonomous vehicle, and a relative speed $V_R^b/V_{ego}$ and a relative distance $dist_R^b/V_{ego}$ of aback neighboring obstacle of the autonomous vehicle in the right lane adjacent to the lane in which the autonomous vehicle is located relative to the autonomous vehicle.

Optionally, the local neighbor feature of the autonomous vehicle at any moment may further include location information flag between a navigated target lane and the lane in which the autonomous vehicle is located, and a distance dist2goal between the autonomous vehicle and a next intersection in a travel direction. flag∈{0,−1,1} where flag equal to 0 indicates that the autonomous vehicle is in the navigated target lane, flag equal to −1 indicates that the navigated target lane is on the left side of the lane in which the autonomous vehicle is located, and flag equal to 1 indicates that the navigated target lane is on the right side of the lane in which the autonomous vehicle is located.

A global statistical feature at any moment in the embodiments of this application is used to indicate denseness of obstacles in lanes within a sensing range (namely, a range that can be detected by sensors of the autonomous vehicle, for example, a range in which a distance between the obstacle and the autonomous vehicle is within a preset gap).

For example, the global statistical feature at any moment may include but not be limited to at least one of the following: an average travel speed and an average gap of all the obstacles in the lanes within the sensing range. For example, if the average gap of all the obstacles in the lane is less than a preset gap, it indicates that the obstacles in the lane are relatively dense. If the average gap of all the obstacles in the lane is greater than or equal to the preset gap, it indicates that the obstacles in the lane are relatively sparse. For example, the global statistical feature at any moment may include but not be limited to: an average gap $gap_L$ between front and back neighboring obstacles in all lanes on the left side of the lane in which the autonomous vehicle is located, an average $gap_M$ between front and back neighboring obstacles in the lane in which the autonomous vehicle is located, an average gap $gap_R$ between front and back neighboring obstacles in all lanes on the right side of the lane in which the autonomous vehicle is located, an average travel speed $V_L$ of obstacles in all the lanes on the left side of the lane in which the autonomous vehicle is located, an average travel speed $V_M$ of obstacles in the lane in which the autonomous vehicle is located, and an average travel speed $V_R$ of obstacles in all the lanes on the right side of the lane in which the autonomous vehicle is located.

Optionally, the local neighbor feature and the global statistical feature of the autonomous vehicle at any moment in the embodiments of this application may be features obtained through discretization processing, and can satisfy that a discrete granularity is small in a low-speed dense scenario and a discrete granularity is large in a high-speed sparse scenario. For example, details are as follows.

(1) When a vehicle speed of the autonomous vehicle is $V_{ego} \leq V_{threshold}$ (for example, 20 km/h), a precision of a local relative distance feature is 0.01, and a precision of a local relative speed feature is 0.05. For example, if a local relative distance feature is 0.1123, the precision of the local relative distance feature is 0.11 after discretization. If a local relative speed feature is 0.276, the precision of the local relative speed feature is 0.25 after discretization.

(2) When a vehicle speed of the autonomous vehicle is $V_{ego} > V_{threshold}$, the precision of the local relative distance feature is 0.05, and the precision of the local relative speed feature is 0.1.

(3) A precision of an average gap feature is uniformly 0.01, and a precision of an average speed feature is uniformly 0.01.

A target action indication in the embodiments of this application is used to indicate the autonomous vehicle to execute a target action. For example, the target action may include but not be limited to at least the following two types: lane change or keeping straight. Lane change may include changing to a left adjacent lane or changing to a right adjacent lane.

Four-tuple information (s,a,r,s') at any moment in the embodiments of this application corresponds to a vehicle condition at the moment, and may include: a feature s at the moment, a target action a of the autonomous vehicle at the moment, a reward r corresponding to the target action at the moment, and a feature s' at a next moment of the moment. The feature s at the moment may include a local neighbor feature $S_l$ and a global statistical feature $S_g$ of the autonomous vehicle at the moment. The feature at the next moment of the moment may include a local neighbor feature $S_l'$ and a global statistical feature $s_g'$ of the autonomous vehicle at the next moment.

Figure 6:
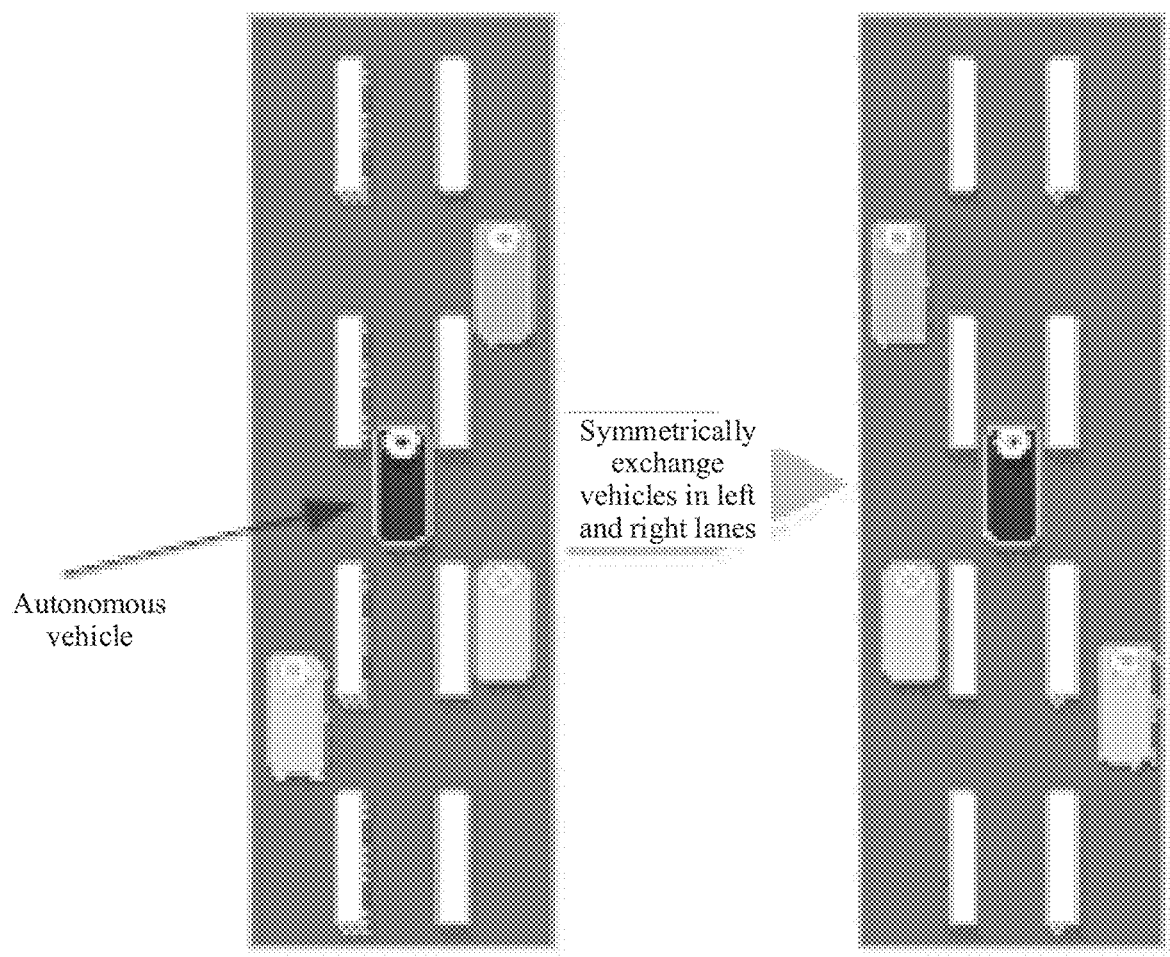
FIG. 6 is a schematic diagram 1 of a symmetry rule according to an embodiment of this application.
Figure 7:
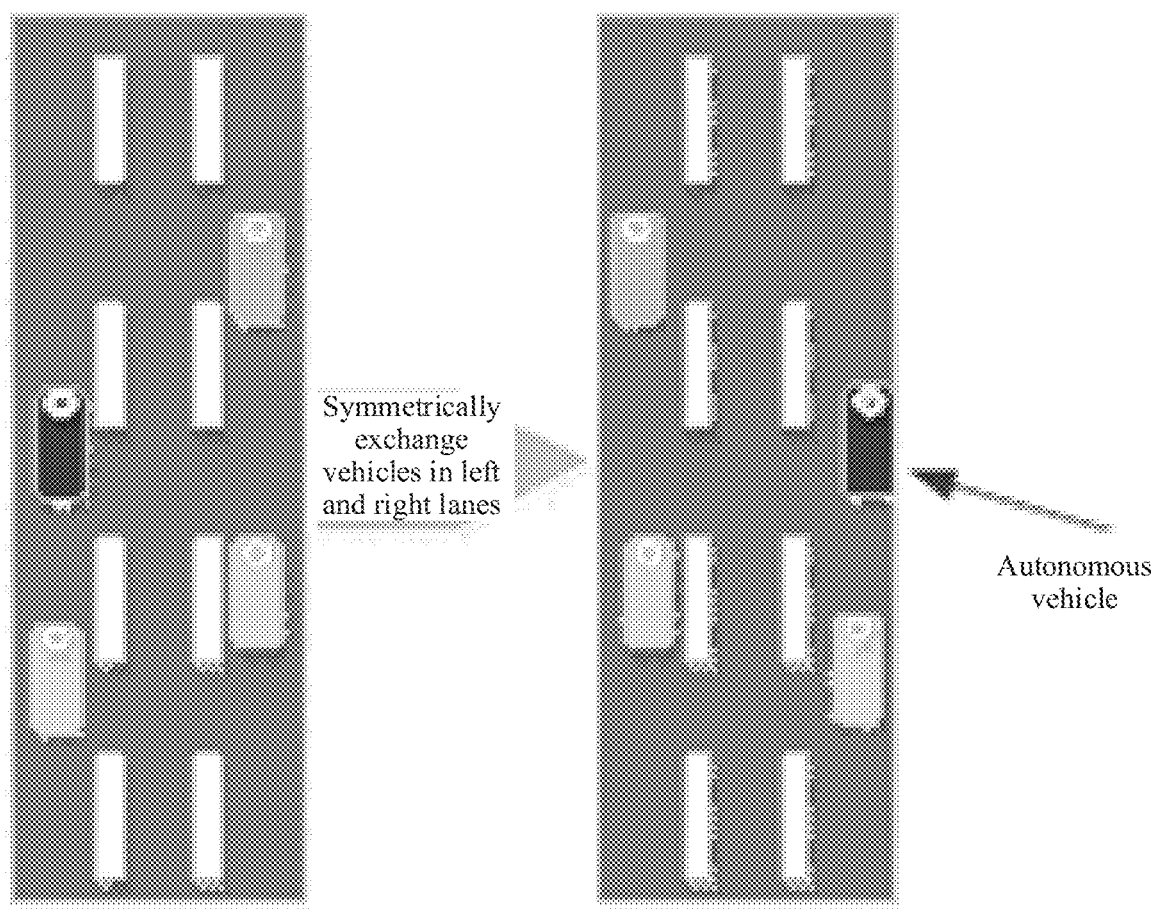
FIG. 7 is a schematic diagram 2 of a symmetry rule according to an embodiment of this application.

FIG. 6 is a schematic diagram 1 of a symmetry rule according to an embodiment of this application. FIG. 7 is a schematic diagram 2 of a symmetry rule according to an embodiment of this application. As shown in FIG. 6 and FIG. 7, the symmetry rule in the embodiments of this application indicates that locations of obstacles in all left lanes and obstacles in all right lanes of the lane in which the autonomous vehicle is located are symmetrically exchanged by using the lane in which the autonomous vehicle is located as an axis.

Figure 8:
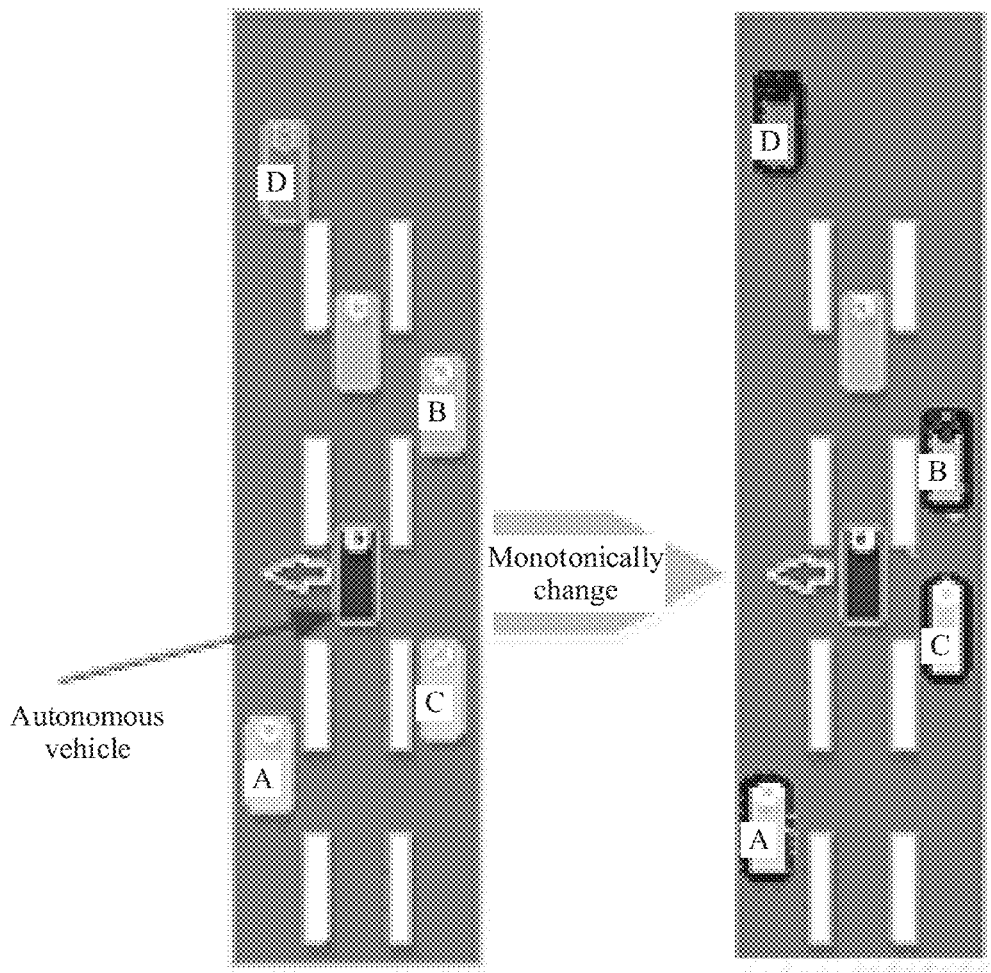
FIG. 8 is a schematic diagram of a monotone rule according to an embodiment of this application.

FIG. 8 is a schematic diagram of a monotone rule according to an embodiment of this application. As shown in FIG. 8, the monotone rule in the embodiments of this application indicates that a distance increases between front and back neighboring obstacles of the autonomous vehicle in a target lane of lane change executed by the autonomous vehicle, and/or indicates that a change in a distance between front and back neighboring obstacles of the autonomous vehicle in a non-target lane is less than a preset distance range. For example, assuming that a back neighboring vehicle in the target lane of lane change executed by the autonomous vehicle is A, a front neighboring vehicle in the target lane is D, a front neighboring vehicle in the non-target lane is B, and a back neighboring vehicle in the non-target lane is C, the monotone rule may include but not be limited to the following operations.

Operation 1: The vehicle A moves backward by a preset distance 1 or decreases a speed by a preset value 1.

Operation 2: The vehicle D moves forward by a preset distance 2 or increases a speed by a preset value 2.

Operation 3: The vehicle B moves forward or backward by a preset distance 3, or increases or decreases a speed by a preset value 3.

Operation 4: The vehicle C moves forward or backward by a preset distance 4, or increases or decreases a speed by a preset value 4.

Extended four-tuple information at any moment in the embodiments of this application corresponds to an extended vehicle condition at the moment, and the extended vehicle condition at the moment is obtained by processing the vehicle condition at the moment according to a symmetry rule and a monotone rule.

For example, the extended four-tuple information at any moment may include symmetric four-tuple information ($s_e$, $a_e$,r,$s_e'$) and monotonic four-tuple information ($s_m$,$a_m$,r,$s_m'$) at the moment. The symmetric four-tuple information ($s_e$,$a_e$,r, $s_e'$) at the moment is obtained by constructing four-tuple information (s,a,r,s') at the moment according to the symmetry rule. $s^e$ represents a symmetric feature of s, $a_e$ represents a symmetric action of a, and $s_e'$ represents a symmetric feature of s'. The monotonic four-tuple information ($s_m$,$a_m$, r,$s_m'$) at the moment is obtained by constructing the four-tuple information (s,a,r,s') at the moment according to the monotone rule. $S^m$ represents a monotonic feature of s, $a_m$ represents a monotonic action of a (for example, $a_m$ may be equal to a), and $s_m'$ represents a monotonic feature of s'.

The following parts in the embodiments of this application separately describe a manner of constructing the symmetric four-tuple information ($s_e$,$a_e$,r,$s_e'$) and the monotonic four-tuple information ($s_m$,$a_m$,r,$s_m'$) at any moment.

(1) Assuming that $s_l$ in the four-tuple information (s,a,r,s') at any moment is as follows:

$$s_l = (V_{ego}, \text{dist}_L^f/V_{ego}, \text{dist}_M^f/V_{ego}, \text{dist}_R^f/V_{ego}, \text{dist}_L^b/V_{ego}, \text{dist}_M^b/V_{ego}, \text{dist}_R^b/V_{ego}, V_L^f/V_{ego}, V_M^f/V_{ego}, V_R^f/V_{ego}, V_L^b/V_{ego}, V_M^b/V_{ego}, V_R^b/V_{ego})$$

$s_{el}$ in the symmetric four-tuple information ($s_e$,$a_e$,r,$s_e'$) at the moment is determined as follows according to the symmetry rule:

$$s_{el} = (V_{ego}, \text{dist}_R^f/V_{ego}, \text{dist}_M^f/V_{ego}, \text{dist}_L^f/V_{ego}, \text{dist}_R^b/V_{ego}, \text{dist}_M^b/V_{ego}, \text{dist}_L^b/V_{ego}, V_R^f/V_{ego}, V_M^f/V_{ego}, V_L^f/V_{ego}, V_R^b/V_{ego}, V_M^b/V_{ego}, V_L^b/V_{ego})$$

(2) Assuming that s in the four-tuple information (s,a,r,s') at any moment is as follows:

$$s_g = (\text{gap}_L, \text{gap}_R, V_L, V_M, V_R),$$

$s_{eg}$ in the symmetric four-tuple information ($s_e$,$a_e$,r,$s_e'$) at the moment is determined as follows according to the symmetry rule:

$$s_{eg} = (\text{gap}_R, \text{gap}_M, \text{gap}_V, V_R, V_M, V_L),$$

Therefore, $s_e$ is constructed based on $s_{el}$ and $s_{eg}$.

(3) $a_e$ in the symmetric four-tuple information ($S_e$,$a_e$,r,$s_e'$) at the moment is determined as follows according to the symmetry rule:

$$a_e = \begin{cases} 0, & a = 0 \\ 1, & a = 2, \\ 2, & a = 1 \end{cases}$$

a equal to 0 indicates to keep straight, a equal to 1 indicates to change to a left adjacent lane, and a equal to 2 indicates to change to a right adjacent lane.

It should be noted that a construction manner of $s_e'$ in the symmetric four-tuple information ($s_e$,$a_e$,r, $s_e'$) at the moment is similar to the construction manner of $s_e$. Details are not described herein again.

For example, assuming that relative distance features, obtained through normalization, of vehicles A, B, C, and D are $d_A, d_B, d_C, d_D$, relative speed features obtained through normalization are $v_A, v_B, v_C, v_D$, $\Delta_d$ represents a relative distance precision corresponding to a current speed, and $\Delta_v$ represents a relative speed precision corresponding to a current vehicle speed, a value of $(d_A,v_A,d_B,v_B,d_C,v_C,d_D,v_D)$ is changed, according to the monotone rule, to a value in a set including 2*2*3*3*3*3*2*2 elements:

$$s_{ml} \in \{d_A - \Delta_d, d_A\} \times \{v_A - \Delta_v, v_A\} \times \{d_B - \Delta_d, d_B, d_B + \Delta_d\} \times \{v_B - \Delta_v, v_B + \Delta_v\} \times \{d_C - \Delta_d, d_C, d_C + \Delta_d\} \times \{v_C - \Delta_v, v_C, v_C + \Delta_v\} \times \{d_D - \Delta_d, d_D\} \times \{v_D - \Delta_v, v_D\}$$

Therefore, a preset quantity (for example, 10) groups are randomly selected from the foregoing set, to constitute $s_{ml}$ in the monotonic four-tuple information ($s_m$,$a_m$,r,$s_m'$) at the moment.

Optionally, assuming that $s_g$ in the four-tuple information (s,a,r,s') at any moment is equal to $s_{mg}$ in the monotonic four-tuple information ($s_m$ $a_m$,r,$s_m'$) at the moment, and $s_m$ is constructed based on $s_{ml}$ and $s_{mg}$.

It should be noted that a construction manner $s_m'$ of the monotonic four-tuple information ($s_m$,$a_m$,r,$s_m'$) at the moment is similar to the construction manner of $s_m$. Details are not described herein again.

It should be noted that, when the training device 1001 performs the control policy training method provided in the embodiments of this application, related information such as an autonomous vehicle, an obstacle, and a lane may be simulated road information on the training device 1001 or historical data generated on actual roads. When the execution device 1002 performs the autonomous lane change method provided in the embodiments of this application, related information such as an autonomous vehicle, an obstacle, and a lane is actual real-time road information.

The following describes the method provided in this application from a control policy (or a control policy model) training side and a control policy application side.

The control policy training method provided in the embodiments of this application relates to computer processing, and may be specifically applied to data processing methods such as data training, machine learning, and deep learning. The control policy training method may be used to perform symbolic and formal intelligence information modeling on, extract, pre-process, and train training data (for example, four-tuple information at a preset quantity of historical moments in the embodiments of this application), to obtain a trained control policy. In addition, in the autonomous lane change method provided in the embodiments of this application, the foregoing trained control policy may be used. Data (for example, a local neighbor feature and a global statistical feature in the embodiment of this application) is input into the trained control policy, to obtain output data (for example, a target action indication in the embodiments of this application). Certainly, in the autonomous lane change method, the control policy may be updated in real time, or the control policy may be updated every preset duration. It should be noted that the control policy training method and the control policy application method provided in the embodiments of this application are generated based on a same concept, and may alternatively be understood as two parts in a system or two phases of an overall process, for example, a control policy training phase and a control policy application phase.

The following several specific embodiments may be combined with each other, and same or similar concepts or processes may not be described repeatedly in some embodiments.

The following specifically describes the control policy training method provided in the embodiments of this application.

Figure 9:
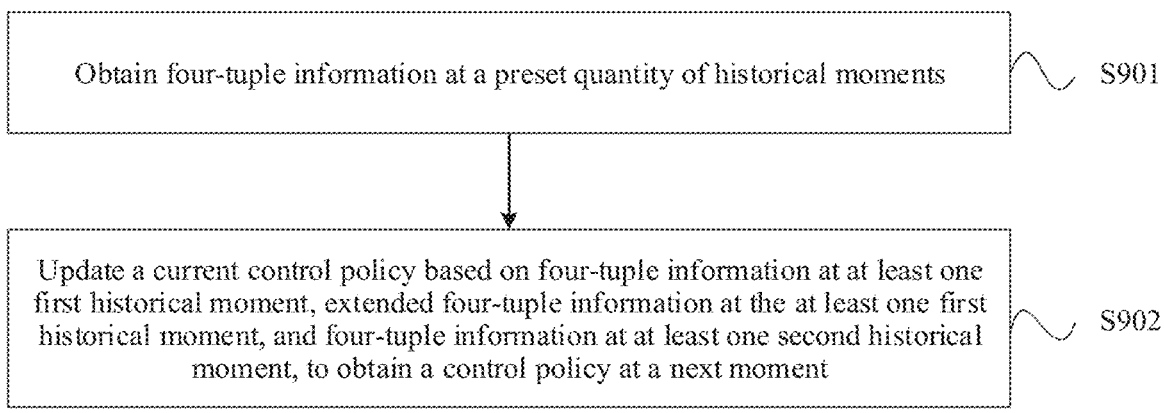
FIG. 9 is a schematic flowchart of a control policy training method according to an embodiment of this application.

FIG. 9 is a schematic flowchart of a control policy training method according to an embodiment of this application. The method in this embodiment may be specifically performed by the training device 1001 shown in FIG. 1. As shown in FIG. 9, the method provided in this embodiment of this application may include the following steps.

At Step S901, obtain four-tuple information at a preset quantity of historical moments.

In this step, the four-tuple information at the preset quantity of historical moments is obtained from a database. Four-tuple information at any historical moment corresponds to a vehicle condition at the historical moment, and may include but not be limited to: a feature at the historical moment, a target action of an autonomous vehicle at the historical moment (namely, a target action determined according to a corresponding control policy at the historical moment), a reward corresponding to the target action at the historical moment, and a feature at a next moment of the historical moment.

For example, the feature at the historical moment may include but not be limited to a local neighbor feature and a global statistical feature of the autonomous vehicle at the historical moment.

For example, the feature at the next moment of the historical moment may include but not be limited to a local neighbor feature and a global statistical feature of the autonomous vehicle at the next moment.

A local neighbor feature of the autonomous vehicle at any moment in this embodiment of this application is used to indicate motion status information (for example, a relative distance and a relative speed) of a specific neighboring obstacle of the autonomous vehicle relative to the autonomous vehicle at the moment.

For example, the specific neighboring obstacle may include but not be limited to: front and back neighboring obstacles of the autonomous vehicle in a lane in which the autonomous vehicle is located at the moment, front and back neighboring obstacles of the autonomous vehicle in a left lane adjacent to the lane in which the autonomous vehicle is located at the moment, and front and back neighboring obstacles of the autonomous vehicle in a right lane adjacent to the lane in which the autonomous vehicle is located at the moment.

A global statistical feature of the autonomous vehicle at any moment in this embodiment of this application is used to represent denseness of obstacles in lanes within a sensing range of the autonomous vehicle at the moment, for example, an average travel speed and an average gap of all the obstacles in the lanes at the moment.

For example, the global statistical feature at any moment may include but not be limited to: an average gap between front and back neighboring obstacles in all lanes on the left side of the lane in which the autonomous vehicle is located at the moment, an average gap between front and back neighboring obstacles in the lane in which the autonomous vehicle is located at the moment, an average gap between front and back neighboring obstacles in all lanes on the right side of the lane in which the autonomous vehicle is located at the moment, an average travel speed of obstacles in all the lanes on the left side of the lane in which the autonomous vehicle is located at the moment, an average travel speed of obstacles in the lane in which the autonomous vehicle is located at the moment, and an average travel speed of obstacles in all the lanes on the right side of the lane in which the autonomous vehicle is located at the moment.

At Step S902, update a current control policy based on four-tuple information at least at one first historical moment, extended four-tuple information at the at least one first historical moment, and four-tuple information at least at one second historical moment, to obtain a control policy at a next moment.

For example, the four-tuple information at the at least one first historical moment is four-tuple information corresponding to a historical moment at which a target action of the autonomous vehicle at the historical moment is lane change in the four-tuple information at the preset quantity of historical moments.

For example, the four-tuple information at the at least one second historical moment is four-tuple information at historical moments other than the four-tuple information at the at least one first historical moment in the four-tuple information at the preset quantity of historical moments, that is, four-tuple information at a historical moment at which the target action of the autonomous vehicle at the historical moment is keeping straight in the four-tuple information at the preset quantity of historical moments.

For example, it is assumed that the four-tuple information at the preset quantity of historical moments may include: four-tuple information at a historical moment (1) (a target action of the autonomous vehicle at the historical moment (1) is lane change), four-tuple information at a historical moment (2) (a target action of the autonomous vehicle at the historical moment (2) is keeping straight), four-tuple information at a historical moment (3) (a target action of the autonomous vehicle at the historical moment (3) is lane change), and four-tuple information at a historical moment (4) (a target action of the autonomous vehicle at the historical moment (4) is keeping straight), the four-tuple information at the at least one first historical moment may include the four-tuple information at the historical moment (1) and the four-tuple information at the historical moment (3), and the four-tuple information at the at least one second historical moment may include the four-tuple information at the historical moment (2) and the four-tuple information at the historical moment (4).

Extended four-tuple information at any first historical moment in this embodiment of this application corresponds to an extended vehicle condition at the first historical moment, and is obtained by processing a vehicle condition at the first historical moment according to a symmetry rule and a monotone rule.

The symmetry rule in this embodiment of this application indicates that locations of obstacles in all left lanes and obstacles in all right lanes of the lane in which the autonomous vehicle is located are symmetrically exchanged by using the lane in which the autonomous vehicle is located as an axis.

The monotone rule in this embodiment of this application indicates that a distance increases between front and back neighboring obstacles of the autonomous vehicle in a target lane of lane change executed by the autonomous vehicle, and/or indicates that a change in a distance between front and back neighboring obstacles of the autonomous vehicle in a non-target lane is less than a preset distance range.

For example, the extended four-tuple information at any first historical moment may include symmetric four-tuple information and monotone four-tuple information at the first historical moment. For example, the symmetric four-tuple information at the first historical moment may be obtained by processing the four-tuple information at the first historical moment according to the symmetry rule, and the monotonic four-tuple information at the first historical moment may be obtained by processing the four-tuple information at the first historical moment according to the monotone rule.

Specifically, for a manner of constructing the symmetric four-tuple information and the monotonic four-tuple information at the first historical moment, refer to the foregoing manner of constructing "the symmetric four-tuple information and the monotonic four-tuple information at any moment" in this application. Details are not described herein again.

In this step, a parameter in the current control policy is updated based on the four-tuple information at the at least one first historical moment, the extended four-tuple information at the at least one first historical moment, and the four-tuple information at the at least one second historical moment, to obtain the control policy at the next moment (used to determine the target action at the next moment).

For example, a target value corresponding to $l^{th}$ four-tuple information is generated based on the $l^{th}$ four-tuple information in the four-tuple information at the at least one first historical moment, the extended four-tuple information at the at least one first historical moment, and the four-tuple information at the at least one second historical moment. Further, a parameter q in a preset function that includes the target value corresponding to the $l^{th}$ four-tuple information is iteratively updated by using a gradient descent method. Further, a parameter q in the current control policy is replaced with an iteratively updated parameter q, to obtain the control policy at the next moment.

In this embodiment, the target value $y_l$ corresponding to the $l^{th}$ four-tuple information may be generated based on the $l^{th}$ four-tuple information $(s_l, a_l, r, s_l')$ in the four-tuple information at the at least one first historical moment, the extended four-tuple information at the at least one first historical moment, and the four-tuple information at the at least one second historical moment according to the following formula. 1 is a positive integer not greater than q, and q is a total quantity of four-tuple information included in the four-tuple information at the at least one first historical moment, the extended four-tuple information at the at least one first historical moment, and the four-tuple information at the at least one second historical moment.

For example, $$y_l = \begin{cases} r_l, s_l' : \text{End state} \\ r_l + g\max_{a_l} Q(s_l', a_l, q), s_l' : \text{Not end state} \end{cases}$$

The end state indicates that the autonomous vehicle autonomously completes a journey with a preset maximum distance or that traveling of the autonomous vehicle is interfered with manual intervention. g represents a preset forgetting factor, where $g \in (0,1)$. $Q(s_l', a_l, q)$ represents an action value function.

$$\max_{a_l} Q(s_l', a_l, q)$$

indicates that a maximum value of $Q(s_l', a_l, q)$ is used by traversing $a_l$. $s_l'$ represents a feature at a later moment in the $l^{th}$ four-tuple information.

Certainly, the target value corresponding to the $l^{th}$ four-tuple information may be generated according to a variation formula or an equivalent formula of the foregoing formula based on $l^{th}$ four-tuple information in the four-tuple information at the at least one first historical moment, the extended four-tuple information at the at least one first historical moment, and the four-tuple information at the at least one second historical moment. This is not limited in this embodiment of this application.

Further, a parameter q in a preset function $$\sum_{l=1}^{q} (y_l - Q(s_l, a_l, q))^2$$

that includes the target value $y_l$ corresponding to the $l^{th}$ four-tuple information is iteratively updated by using a gradient descent method. $Q(s_l, a_l, q)$ represents an action value function corresponding to the $l^{th}$ four-tuple information, where $s_l$ represents a feature at a previous moment in the $l^{th}$ four-tuple information, and $a_l$ represents a target action at the previous moment in the $l^{th}$ four-tuple information.

Further, a parameter q in the current control policy is replaced with an iteratively updated parameter q, to obtain the control policy at the next moment, so that the control policy at the next moment is used to determine the target action at the next moment.

Certainly, the parameter in the current control policy may be updated in another manner based on the four-tuple information at the at least one first historical moment, the extended four-tuple information at the at least one first historical moment, and the four-tuple information at the at least one second historical moment, to obtain the control policy at the next moment. This is not limited in this embodiment of this application.

In this embodiment of this application, the training device 1001 may cyclically perform step S901 and step S902 for a preset quantity of times, or the execution of cyclically performing step S901 to step S902 for the plurality of times ends until an updated control policy satisfies a preset condition. The control policy finally obtained by the training device 1001 may be used when the execution device 1002 performs the autonomous lane change method.

For example, when the training device 1001 performs step S902 for the first time, the current control policy in this embodiment of this application may be a preset initial control policy. When the training device 1001 performs step S902 not for the first time, the current control policy in this embodiment of this application may be a control policy obtained by performing step S902 previously by the training device 1001.

In this embodiment of this application, the four-tuple information at the preset quantity of historical moments is obtained. Further, the current control policy is updated based on the four-tuple information at the at least one first historical moment, the extended four-tuple information at the at least one first historical moment, and the four-tuple information at the at least one second historical moment, to obtain the control policy at the next moment. It can be learned that, on the basis of the four-tuple information at the preset quantity of historical moments, the current control policy is further updated based on the extended four-tuple information at the first historical moment in the four-tuple information at the preset quantity of historical moments, so that a more accurate control policy can be obtained, and a corresponding target action can be accurately determined.

Figure 10:
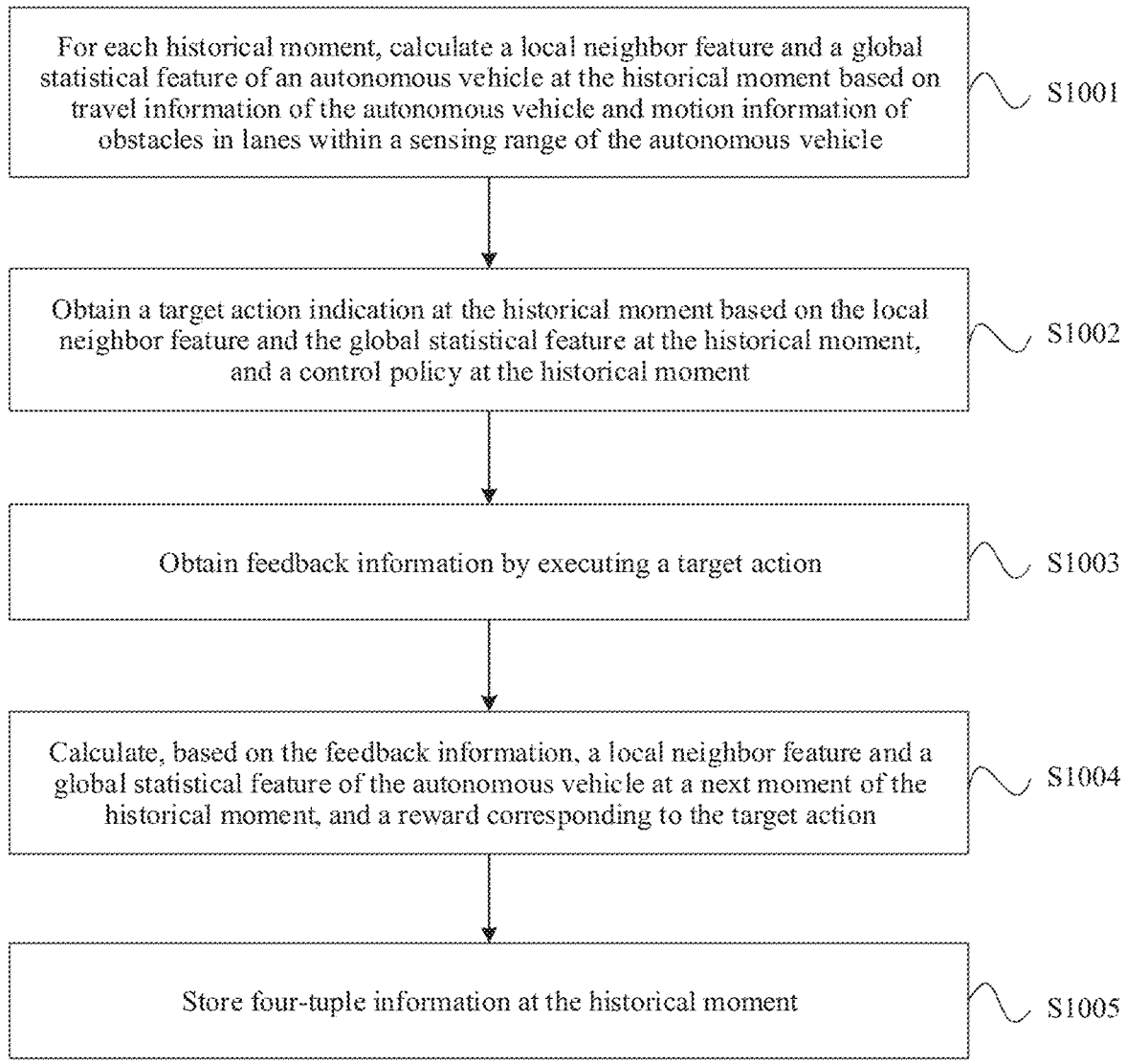
FIG. 10 is a schematic flowchart of a control policy training method according to another embodiment of this application.

FIG. 10 is a schematic flowchart of a control policy training method according to another embodiment of this application. Based on the foregoing embodiment, a manner of generating "four-tuple information at a historical moment" is described in this embodiment of this application. As shown in FIG. 10, before step S901, the method further includes the following steps.

At S1001, for each historical moment, calculate a local neighbor feature and a global statistical feature of an autonomous vehicle at the historical moment based on travel information of the autonomous vehicle and motion information of obstacles in lanes within a sensing range of the autonomous vehicle.

It should be noted that, motion information of an obstacle is travel information when the obstacle is a vehicle or another mobile terminal, and that the motion information of the obstacle may include related information such as a motion speed and a motion location when the obstacle is a person, an animal, or a static object.

In this step, for each historical moment, the local neighbor feature and the global statistical feature of the autonomous vehicle at the historical moment are calculated based on the travel information (information such as a travel speed and/or a travel location) of the autonomous vehicle and the motion information (information such as a travel speed and/or a travel location of a vehicle, a motion speed and/or a motion location of a person, an animal, or a static object, and the like) of the obstacles in the lanes within the sensing range (namely, a range that can be detected by a sensor on the autonomous vehicle, for example, a range in which a distance between the obstacle and the autonomous vehicle is within a preset gap) of the autonomous vehicle.

The local neighbor feature of the autonomous vehicle at any historical moment in this embodiment of this application is used to represent motion status information (for example, a relative distance and a relative speed) of a specific neighboring vehicles (for example, a front/back neighboring obstacle of the autonomous vehicle in a lane in which the autonomous vehicle is located, a front/back neighboring obstacle of the autonomous vehicle in a left lane adjacent to the lane in which the autonomous vehicle is located, and a front/back neighboring obstacle of the autonomous vehicle in a right lane adjacent to the lane in which the autonomous vehicle is located) of the autonomous vehicle at the historical moment relative to the autonomous vehicle.

For example, the local neighbor feature $S_1$ of the autonomous vehicle at any moment may include but not be limited to: a relative speed $V_M^f/V_{ego}$ and a relative distance $dist_M^f/V_{ego}$ of a front neighboring obstacle of the autonomous vehicle in the lane in which the autonomous vehicle is located relative to the autonomous vehicle, a relative speed $V_M^b/V_{ego}$ and a relative distance $dist_M^b/V_{ego}$ of a back neighboring obstacle of the autonomous vehicle in the lane in which the autonomous vehicle is located relative to the autonomous vehicle, a relative speed $V_L^f/V_{ego}$ and a relative distance $distV_L^f/V_{ego}$ of a front neighboring obstacle of the autonomous vehicle in the left lane adjacent to the lane in which the autonomous vehicle is located relative to the autonomous vehicle, a relative speed $V_L^b/V_{ego}$ and a relative distance $dist_L^b/V_{ego}$ of a back neighboring obstacle of the autonomous vehicle in the left lane adjacent to the lane in which the autonomous vehicle is located relative to the autonomous vehicle, a relative speed $V_R^f/V_{ego}$ and a relative distance $dist_R^f/V_{ego}$ of a front neighboring obstacle of the autonomous vehicle in the right lane adjacent to the lane in which the autonomous vehicle is located relative to the autonomous vehicle, and a relative speed $V_R^b/V_{ego}$ and a relative distance $dist_R^b/V_{ego}$ of a back neighboring obstacle of the autonomous vehicle in the right lane adjacent to the lane in which the autonomous vehicle is located relative to the autonomous vehicle.

The global statistical feature of the autonomous vehicle at any historical moment in this embodiment of this application is used to represent denseness of obstacles in the lanes within the sensing range of the autonomous vehicle, for example, an average travel speed and an average gap of all the obstacles in the lanes at the historical moment.

For example, a global vehicle traffic statistical feature $s_g$ of the autonomous vehicle at any moment may include but not be limited to: an average $gap_L$ between front and back obstacles in all lanes on the left side of the lane in which the autonomous vehicle is located, an average $gap_M$ between front and back obstacles in the lane in which the autonomous vehicle is located, an average gap $gap_R$ between front and back neighboring obstacles in all lanes on the right side of the lane in which the autonomous vehicle is located, an average travel speed $V_L$ of obstacles in all the lanes on the left side of the lane in which the autonomous vehicle is located, an average travel speed $V_M$ of obstacles in the lane in which the autonomous vehicle is located, and an average travel speed $V_R$ of obstacles in all the lanes on the right side of the lane in which the autonomous vehicle is located.

At S1002, obtain a target action indication at the historical moment based on the local neighbor feature and the global statistical feature at the historical moment, and a control policy at the historical moment.

In this step, the local neighbor feature and the global statistical feature at the historical moment are input into the control policy at the historical moment, so that the target action indication (used to indicate the autonomous vehicle to execute a target action) at the historical moment may be obtained.

For example, a control policy at any moment (for example, the control policy at the historical moment) may be represented as:

$$A(s, q) = \left\{a : Q(s, a, q) = \max_{a'} Q(s, a', q)\right\},$$

s represents a local neighbor feature and a global statistical feature at the moment; $a' \in (0,1,2)$, where a' equal to 0 indicates to keep straight, a' equal to 1 indicates to change to a left adjacent lane, and a' equal to 2 indicates to change to a right adjacent lane.

In this embodiment, for the local neighbor feature and the global statistical feature at any historical moment, an action a' for making an action value function Q(s,a', q) to be a maximum value is selected as the target action a at the historical moment.

Certainly, the control policy at the historical moment may alternatively be determined according to a variation formula or an equivalent formula of the foregoing formula. This is not limited in this embodiment of this application.

For example, the target action includes at least two types: lane change or keeping straight. Lane change may include changing to a left adjacent lane or changing to a right adjacent lane.

At S1003, obtain feedback information by executing the target action.

For example, the feedback information may include but not limited to: travel information (for example, a travel speed or a travel location) generated after the autonomous vehicle executes the target action, travel information of the autonomous vehicle at a next moment, and motion information of obstacles in lanes within a sensing range of the autonomous vehicle at the next moment. When the target action is lane change, the feedback information may further include a ratio of a period of time for executing the target action to a historical average period of time, and a denseness change between obstacles in a lane in which the autonomous vehicle is located before lane change and obstacles in a lane in which the autonomous vehicle is located after lane change. The historical average period of time is an average period of time for which the autonomous vehicle executes a similar action (for example, a lane change action) within a preset historical period of time (for example, 500 time windows).

For example, the denseness change between the obstacles in the lane in which the autonomous vehicle is located after lane change and the obstacles in the lane in which the autonomous vehicle is located before lane change may be determined based on travel information of the autonomous vehicle and other obstacles within a sensing range of the autonomous vehicle before and after lane change (for example, an average $gap_{cur}$ between front and back neighboring obstacles in the lane in which the autonomous vehicle is located before lane change, an average travel speed $V_{cur}$ of the obstacles in the lane in which the autonomous vehicle is located before lane change, an average gap $gap_{goal}$ between front and back neighboring obstacles in the lane in which the autonomous vehicle is located after lane change, an average travel speed $V_{goal}$ of the obstacles in the lane in which the autonomous vehicle is located after lane change), and a preset global classification model $F_0$ of the autonomous vehicle.

At S1004, calculate, based on the feedback information, a local neighbor feature and a global statistical feature of the autonomous vehicle at the next moment of the historical moment, and a reward corresponding to the target action.

In this step, the local neighbor feature and the global statistical feature of the autonomous vehicle at the next moment of the historical moment may be calculated based on the travel information of the autonomous vehicle at the next moment and the motion information of the obstacles in the lanes within a sensing range of the autonomous vehicle at the next moment that are included in the feedback information. For a specific calculation manner, refer to the manner of obtaining the local neighbor feature and the global statistical feature of the autonomous vehicle at the historical moment in step S401. Details are not described again in this embodiment of this application.

The following part in this embodiment of this application describes an implementation of "calculating, based on the feedback information, a reward corresponding to the target action".

In a possible implementation, when the target action is keeping straight, the reward is calculated based on the travel information generated after the autonomous vehicle executes the target action.

For example, the reward is calculated based on a preset function R(s") and the travel information s" (for example, the travel speed or the travel location) generated after the autonomous vehicle executes the target action. For example, the preset function $R(s")=V_{ego}'$, where $V_{ego}'$ represents the travel speed generated after the autonomous vehicle executes the target action. Certainly, the preset function R(s") may alternatively be equal to another function that includes the travel information generated after the autonomous vehicle executes the target action. This is not limited in this embodiment of this application.

In another possible implementation, when the target action is lane change, the reward is calculated based on the travel information generated after the autonomous vehicle executes the target action, the ratio of the period of time for executing the target action to the historical average period of time, and the denseness change between the obstacles in the lane in which the autonomous vehicle is located before lane change and the obstacles in the lane in which the autonomous vehicle is located after lane change.

In this implementation, a local reward coefficient $K_l$ is determined based on the ratio of the period of time T for executing the target action to the historical average period of time $T_e$. Further, a global reward coefficient $K_g$ is determined based on the denseness change between the obstacles in the lane in which the autonomous vehicle is located before lane change and the obstacles in the lane in which the autonomous vehicle is located after lane change. When the obstacles in the lane in which the autonomous vehicle is located after lane change are denser than the obstacles in the lane in which the autonomous vehicle is located before lane change, $K_g>1$. When the obstacles in the lane in which the autonomous vehicle is located after lane change are sparser than the obstacles in the lane in which the autonomous vehicle is located before lane change, $K_g<1$. Further, the reward is calculated based on the travel information generated after the autonomous vehicle executes the target action, the local reward coefficient $K_l$, and the global reward coefficient $K_g$.

For example, the reward is calculated according to the formula $c*K_l*K_g*R(s')$, where c represents a preset discount factor (for example, 0.3), and $R(s')$ represents the preset function including the travel information generated after the autonomous vehicle executes the target action. Certainly, the reward may alternatively be calculated according to an equivalent formula or variant formula of the foregoing formula. This is not limited in this embodiment of this application.

If the local neighbor feature of the autonomous vehicle at the historical moment may further include location information flag between a navigated target lane and the lane in which the autonomous vehicle is located, and a distance dist2goal between the autonomous vehicle and a next intersection in a travel direction, the local reward coefficient $K_l$ is determined based on the ratio of the period of time T for executing the target action to the historical average period of time $T_e$. flag$\in\{0,-1,1\}$, where flag equal to 0 indicates that the autonomous vehicle is in the navigated target lane, flag equal to $-1$ indicates that the navigated target lane is on the left side of the lane in which the autonomous vehicle is located, and flag equal to 1 indicates that the navigated target lane is on the right side of the lane in which the autonomous vehicle is located. Further, a first global reward coefficient $K_g^1$ is determined based on the denseness change between the obstacles in the lane in which the autonomous vehicle is located before lane change and the obstacles in the lane in which the autonomous vehicle is located after lane change.

Further, a second global reward coefficient $K_g^2$ is determined based on the target action and the location information flag between the navigated target lane and the lane in which the autonomous vehicle is located. For example, the second global reward coefficient $K_g^2$ is determined according to the following formula:

$$K_g^2 = \begin{cases} \max(gap_{cur}/gap_{goal}, 1/2), & \text{if (flag} = -1 \text{ and } \alpha = 1) \text{ or (flag} = 1 \text{ or } \alpha = 2) \\ 1/2, & \text{if (flag} = -1 \text{ and } \alpha = 2) \text{ or (flag} = 1 \text{ and } \alpha = 1) \end{cases},$$

where
  $gap_{cur}$ represents the average gap between front and back neighboring obstacles in the lane in which the autonomous vehicle is located before lane change, $gap_{goal}$ represents the average gap between front and back neighboring obstacles in the lane in which the autonomous vehicle is located after lane change, and $\alpha$ represents the target action.

Certainly, the second global reward coefficient $K_g^2$ may alternatively be calculated according to an equivalent formula or variant formula of the foregoing formula. This is not limited in this embodiment of this application.

Further, the reward is calculated based on the travel information generated after the autonomous vehicle executes the target action, the local reward coefficient $K_l$, the first global reward coefficient $K_g^1$, and the second global reward coefficient $K_g^2$.

For example, the reward is calculated according to the formula $c*K_l*K_g^1*K_g^2*R(s')$, where C represents the preset discount factor (for example, 0.3), and $R(s')$ represents the preset function that includes the travel information generated after the autonomous vehicle executes the target action.

For example, the preset function is $$R(s'') = V'_{ego} - |flag'| \cdot \frac{100}{dist2goal' + 1},$$

where $V_{ego}'$ represents the travel speed generated after the autonomous vehicle executes the target action. flag' represents location information between a navigated target lane and a lane in which the autonomous vehicle is located after executing the target action, where flag' equal to 0 indicates that the autonomous vehicle is in the navigated target lane after executing the target action, flag' equal to $-1$ indicates that the navigated target lane is on the left side of the lane in which the autonomous vehicle is located after executing the target action, and flag' equal to 1 indicates that the navigated target lane is on the right side of the lane in which the autonomous vehicle is located after executing the target action. dist2goal' represents a distance between a next intersection in a travel direction generated after the autonomous vehicle executes the target action. Certainly, the preset function $R(s')$ may alternatively be another function that includes the travel information generated after the autonomous vehicle executes the target action. This is not limited in this embodiment of this application.

Certainly, the reward may alternatively be calculated according to an equivalent formula or variant formula of the foregoing formula. This is not limited in this embodiment of this application.

Certainly, the reward corresponding to the target action may be calculated in another manner based on the feedback information. This is not limited in this embodiment of this application.

At S1005, store the four-tuple information at the historical moment.

In this step, the four-tuple information at the historical moment may be stored in a database, for subsequent control policy training. For example, the four-tuple information at the historical moment corresponds to a vehicle condition at the historical moment, and may include: a feature at the historical moment, the target action of the autonomous vehicle at the historical moment, the reward corresponding to the target action at the historical moment, and a feature at the next moment of the historical moment. The feature at the historical moment includes the local neighbor feature and the global statistical feature of the autonomous vehicle at the historical moment. The feature at the next moment of the historical moment includes a local neighbor feature and a global statistical feature of the autonomous vehicle at the next moment of the historical moment.

In this embodiment of this application, for each historical moment, the target action indication at the historical moment is obtained based on the local neighbor feature and the global statistical feature of autonomous vehicle at the historical moment, and the control policy at the historical moment. Further, the feedback information is obtained by executing the target action, the reward corresponding to the target action and the local neighbor feature and the global statistical feature of the autonomous vehicle at the next moment of the historical moment are calculated based on the feedback information, and the four-tuple information at the historical moment is stored. It can be learned that, on the basis of the local neighbor feature, the information such as the global statistical feature and the reward corresponding to the target action are further introduced, so that training data for control policy training is more complete and a more accurate control policy can be obtained through training.

Further, on the basis of the foregoing embodiment, a manner of generating the "preset global classification model $F_0$" is described in this embodiment of this application.

For example, features of the global classification model are obtained. The features of the global classification model may include but not be limited to: motion information (for example, an average $gap_{cur}$ between front and back neighboring obstacles in a lane in which the autonomous vehicle is located before each lane change, an average travel speed $V_{cur}$ of obstacles in the lane in which the autonomous vehicle is located before each lane change, an average gap $gap_{goal}$ between front and back neighboring obstacles in a lane in which the autonomous vehicle is located after each lane change, and an average travel speed $V_{goal}$ of obstacles in the lane in which the autonomous vehicle is located after each lane change) of the autonomous vehicle and obstacles in lanes within a sensing range of the autonomous vehicle before and after each lane change within a preset period of time (for example, 2000000 time windows). Further, the preset global classification model $F_0$ is generated based on the features of the global classification model by using a logistic regression algorithm.

In this embodiment of this application, it may first be preset, on a simulator, that there are road scenarios with different denseness and different speeds. For example, it is constructed that a map in which there are three lanes with a preset length (for example, 4 km) is used as a training map; it is arranged that motor vehicles (vehicles other than the autonomous vehicle) are involved in the following scenarios: a vehicle-free scenario, a sparse medium-speed scenario, a sparse high-speed scenario, a sparse low-speed scenario, an evenly-distributed medium-speed scenario, an evenly-distributed high-speed scenario, an evenly-distributed low-speed scenario, a dense medium-speed scenario, a dense high-speed scenario, a dense low-speed scenario, and a dense ultra-low-speed scenario (where vehicle densities are 15 vehicles/4000 m, 40 vehicles/4000 m, and 100 vehicles/4000 m in a sparse scenario, an evenly-distributed scenario, and a dense scenario respectively; and an average speed of the motor vehicles is 5 km/h, 10 km/h, 20 km/h, 30 km/h, 40 km/h, 50 km/h, 60 km/h, and the like).

Then, a training map is randomly loaded into the simulator, so that the autonomous vehicle travels in the simulated environment according to a random policy. The random policy indicates that the autonomous vehicle randomly selects a target action from a decision space A (for example, 0, 1, and 2) to execute the target action. It is assumed that the autonomous vehicle randomly switches to a new training map and a new motor vehicle arrangement scenario each time the autonomous vehicle travels at an end point of the training map, and stops after a preset period of time (for example, 2000000 time windows).

In the simulation process, features of the global classification model are obtained. The features of the global classification model may include but not be limited to: travel information (for example, an average gap $gap_{cur}$ between front and back neighboring vehicles in a lane in which the autonomous vehicle is located before each lane change, an average travel speed $V_{cur}$ of vehicles in the lane in which the autonomous vehicle is located before each lane change, an average gap $gap_{goal}$ between front and back neighboring vehicles in a lane in which the autonomous vehicle is located after each lane change, an average travel speed $V_{goal}$ of the vehicles in the lane in which the autonomous vehicle is located after each lane change) of the autonomous vehicle and other vehicles in lanes within a sensing range of the autonomous vehicle before and after each lane change in a preset period of time (for example, 2000000 time windows).

Further, if $gap_{cur} < gap_{goal}$ in travel information obtained before and after any lane change, a label corresponding to the travel information before and after lane change is 1 (indicating that obstacles in a lane in which the autonomous vehicle is located after lane change are sparser than obstacles in a lane in which the autonomous vehicle is located before lane change). Otherwise, the label corresponding to the travel information before and after lane change is 0 (indicating that obstacles in the lane in which the autonomous vehicle is located after lane change are denser than obstacles in the lane in which the autonomous vehicle is located before lane change).

Further, the travel information generated before and after each lane change and the corresponding label are added to a training set D as sample data, and the preset global classification model $F_0$ is generated through learning based on the sample data in the training set D and the logistic regression algorithm (an output result of the model is a probability that obstacles in the lane in which the autonomous vehicle is located after lane change are sparser).

Certainly, the preset global classification model $F_0$ may alternatively be generated in another manner. This is not limited in this embodiment of this application.

The following specifically describes autonomous lane change methods provided in the embodiments of this application.

Figure 11:
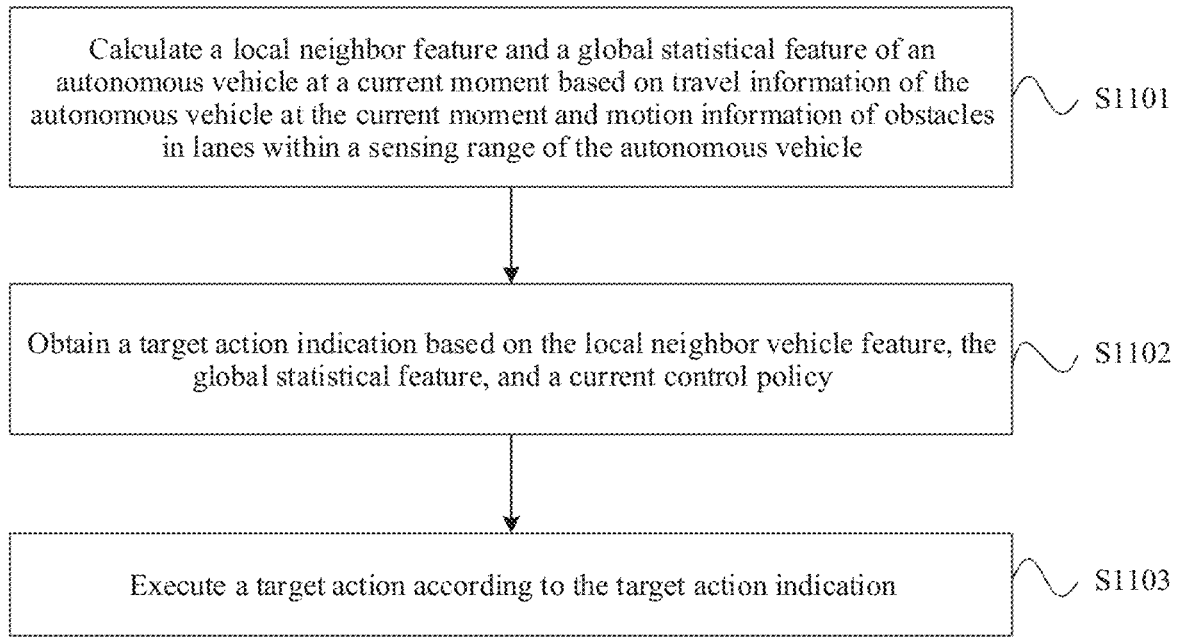
FIG. 11 is a schematic flowchart of an autonomous lane change method according to an embodiment of this application.

FIG. 11 is a schematic flowchart of an autonomous lane change method according to an embodiment of this application. The method in this embodiment may be specifically performed by the execution device 1002 shown in FIG. 1. As shown in FIG. 11, the method in this embodiment of this application may include the following steps.

At S1101, calculate a local neighbor feature and a global statistical feature of an autonomous vehicle at a current moment based on travel information of the autonomous vehicle at the current moment and motion information of obstacles in lanes within a sensing range of the autonomous vehicle.

It should be noted that, the motion information is travel information when an obstacle is a vehicle or another mobile terminal, and that the motion information may include related information such as a motion speed when an obstacle is a person, an animal, or a static object.

In this step, the local neighbor feature and the global statistical feature of the autonomous vehicle at the current moment are calculated based on the travel information (information such as a travel speed and/or a travel location) of the autonomous vehicle at the current moment and the motion information (information such as a travel speed and/or a travel location of a vehicle, a motion speed and/or a motion location of a person, an animal, or a static object, and the like) of the obstacles in the lanes within the sensing range (namely, a range that can be detected by a sensor on the autonomous vehicle, for example, a range in which a distance between the obstacle and the autonomous vehicle is within a preset gap) of the autonomous vehicle.

The local neighbor feature of the autonomous vehicle at the current moment in this embodiment of this application is used to represent motion status information (for example, a relative distance and a relative speed) of a specific neighboring obstacle (for example, a front/back neighboring obstacle of the autonomous vehicle in a lane in which the autonomous vehicle is located at the current moment, a front/back neighboring obstacle of the autonomous vehicle in a left lane adjacent to the lane in which the autonomous vehicle is located at the current moment, and a front/back neighboring obstacle of the autonomous vehicle in a right lane adjacent to the lane in which the autonomous vehicle is located at the current moment) of the autonomous vehicle relative to the autonomous vehicle at the current moment.

For example, a local neighbor feature $S_l$ of the autonomous vehicle at any moment may include but not be limited to: a relative speed $V_M^f/V_{ego}$ and a relative distance $dist_M^f/V_{ego}$ of a front neighboring obstacle of the autonomous vehicle in a lane in which the autonomous vehicle is located at the moment relative to the autonomous vehicle, a relative speed $V_M^b/V_{ego}$ and a relative distance $dist_M^b/V_{ego}$ of a back neighboring obstacle of the autonomous vehicle in the lane in which the autonomous vehicle is located at the moment relative to the autonomous vehicle, a relative speed $V_L^f/V_{ego}$ and a relative distance $dist_L^f/V_{ego}$ of a front neighboring obstacle of the autonomous vehicle in a left lane adjacent to the lane in which the autonomous vehicle is located at the moment relative to the autonomous vehicle, a relative speed $V_L^b/V_{ego}$ and a relative distance $dist_L^b/V_{ego}$ of a back neighboring obstacle of the autonomous vehicle in the left lane adjacent to the lane in which the autonomous vehicle is located at the moment relative to the autonomous vehicle, a relative speed $V_R^f/V_{ego}$ and a relative distance $dist_R^f/V_{ego}$ of a front neighboring obstacle of the autonomous vehicle in the right lane adjacent to the lane in which the autonomous vehicle is located at the moment relative to the autonomous vehicle, and a relative speed $V_R^b/V_{ego}$ and a relative distance $dist_{RR}^b/V_{ego}$ of a back neighboring obstacle of the autonomous vehicle in the right lane adjacent to the lane in which the autonomous vehicle is located at the moment relative to the autonomous vehicle.

The global statistical feature of the autonomous vehicle at the current moment in this embodiment of this application is used to represent denseness of the obstacles in the lanes within the sensing range of the autonomous vehicle at the current moment, for example, an average travel speed and an average gap of all the obstacles in the lanes at the current moment.

For example, a global statistical feature $s_g$ of the autonomous vehicle at any moment may include but not be limited to: an average $gap_L$ between front and back neighboring obstacles in all lanes on the left side of the lane in which the autonomous vehicle is located at the moment, an average $gap_M$ between front and back neighboring obstacles in the lane in which the autonomous vehicle is located at the moment, an average $gap_R$ between front and back neighboring obstacles in all lanes on the right side of the lane in which the autonomous vehicle is located at the moment, an average travel speed $V_L$ of obstacles in all the lanes on the left side of the lane in which the autonomous vehicle is located at the moment, an average travel speed $V_M$ of obstacles in the lane in which the autonomous vehicle is located at the moment, and an average travel speed $V_R$ of obstacles in all the lanes on the right side of the lane in which the autonomous vehicle is located at the moment.

At S1102, obtain a target action indication based on the local neighbor vehicle feature, the global statistical feature, and a current control policy.

For example, when the execution device 1002 performs steps S1101 and S1102 for the first time, the current control policy in this embodiment of this application may be a preset control policy, for example, a control policy finally obtained by the training device 1001 by executing the control policy training method. When the execution device 1002 performs steps S1101 and S1102 not for the first time, the current control policy in this embodiment of this application may be a control policy updated by the execution device 1002 at a previous moment.

In this step, the local neighbor feature and the global statistical feature of the autonomous vehicle at the current moment are input into the current control policy (namely, a control policy at the current moment), so that the target action indication (used to indicate the autonomous vehicle to execute the target action) at the current moment may be obtained.

For example, a control policy at any moment (for example, the current control policy) may be represented as:

$$A(s, q) = \{a : Q(s, a, q) = \max_{a'} Q(s, a', q)\},$$

where
s represents a local neighbor feature and a global statistical feature of the autonomous vehicle at the moment; a'∈(0,1,2), where a' equal to 0 indicates to keep straight, a' equal to 1 indicates to change to a left adjacent lane, and a' equal to 2 indicates to change to a right adjacent lane.

In this embodiment, for the local neighbor feature and the global statistical feature of the autonomous vehicle at any current moment, an action a' for making Q (s,a',q) to be a maximum value is selected as the target action a at the current moment.

For example, the target action includes at least two types: lane change or keeping straight. Lane change includes changing to a left adjacent lane or changing to a right adjacent lane.

Certainly, the control policy at the current moment may alternatively be determined according to a variation formula or an equivalent formula of the foregoing formula. This is not limited in this embodiment of this application.

At S1103, execute the target action according to the target action indication.

For example, if the target action indication is lane change, the autonomous vehicle executes the action of lane change. If the target action indication is keeping straight, the autonomous vehicle executes the action of keeping straight.

Specifically, for a manner of executing the target action according to the target action indication, refer to content in a related technology. This is not limited in this embodiment of this application.

In this embodiment of this application, the local neighbor feature and the global statistical feature of the autonomous vehicle at the current moment are calculated based on the travel information of the autonomous vehicle at the current moment and the motion information of the obstacles in the lanes within the sensing range of the autonomous vehicle. Further, the target action indication is obtained based on the local neighbor feature, the global statistical feature, and the current control policy, and the target action is executed according to the target action indication. It can be learned that, on the basis of the local neighbor feature, the global statistical feature is further introduced into the current control policy to obtain the target action indication. Both information about local neighboring obstacles (for example, other vehicles) and a macro situation of the global statistical feature (for example, an overall vehicle flow) are considered. Therefore, the target action obtained by combining local and global road obstacle information is a globally optimal decision action.

Further, based on the foregoing embodiment, in this embodiment of this application, feedback information may be further obtained by executing the target action, and the current control policy is updated based on the feedback information to obtain a control policy at a next moment, so that a target action at the next moment can be accurately determined at the next moment based on the control policy at the next moment.

It should be noted that, at each moment t, a control policy at the moment t may be updated based on feedback information at the moment t, to obtain a control policy at a moment t+1, so that the control policy for generating the target action is continuously adaptively updated and optimized. This ensures that there is an optimal control policy corresponding to each moment, and that an accurate target action at each moment is generated.

In this embodiment, the feedback information (used to update the current control policy) is obtained by executing the target action, to determine a local neighbor feature and a global statistical feature of the autonomous vehicle at the next moment, and a reward corresponding to the target action, to update the current control policy.

For example, the feedback information may include but not be limited to travel information (for example, a travel speed or a travel location) generated after the autonomous vehicle executes the target action, travel information of the autonomous vehicle at the next moment, and motion information of obstacles in lanes within a sensing range of the autonomous vehicle at the next moment. When the target action is lane change, the feedback information may further include a ratio of a period of time for executing the target action to a historical average period of time, and a denseness change between obstacles in a lane in which the autonomous vehicle is located before lane change and obstacles in a lane in which the autonomous vehicle is located after lane change. The historical average period of time is an average period of time for which the autonomous vehicle executes a similar action (for example, the action of lane change) within a preset historical period of time (for example, 500 time windows).

For example, the denseness change between the obstacles in the lane in which the autonomous vehicle is located after lane change and the obstacles in the lane in which the autonomous vehicle is located before lane change may be determined based on motion information of the autonomous vehicle and obstacles in lanes within a sensing range of the autonomous vehicle before and after lane change (for example, an average gap $gap_{cur}$ between front and back neighboring obstacles in the lane in which the autonomous vehicle is located before lane change, an average travel speed $V_{cur}$ of the obstacles in the lane in which the autonomous vehicle is located before lane change, an average gap $gap_{goal}$ between front and back neighboring obstacles in the lane in which the autonomous vehicle is located after lane change, an average travel speed $V_{goal}$ of the obstacles in the lane in which the autonomous vehicle is located after lane change), and a preset global classification model $F_0$.

Figure 12:
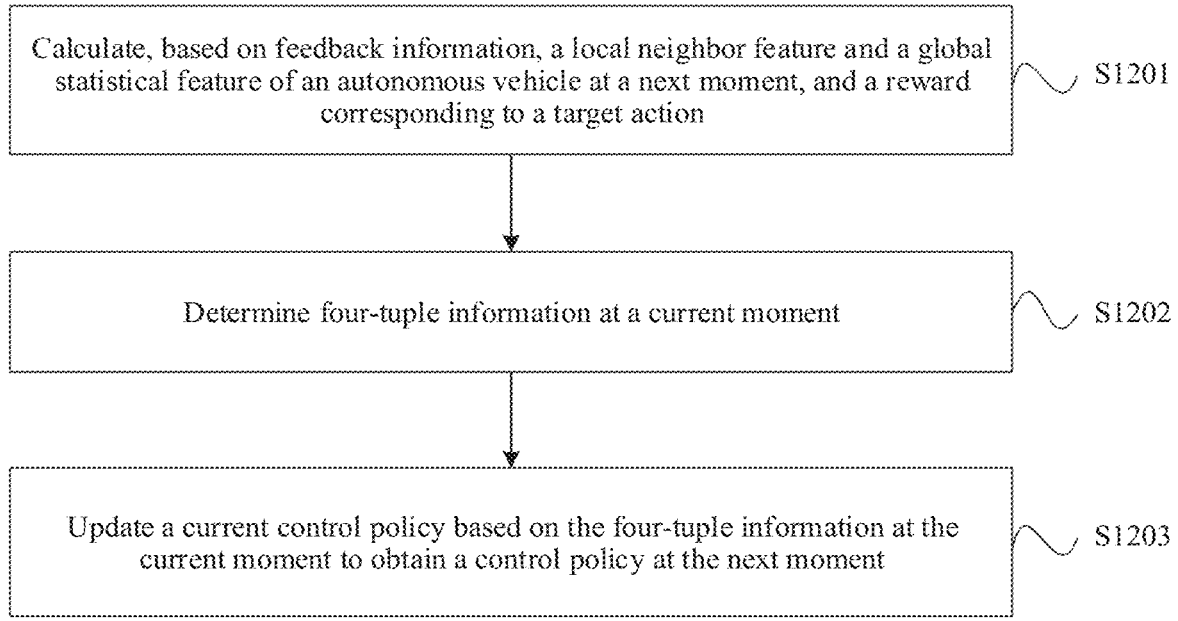
FIG. 12 is a schematic flowchart of an autonomous lane change method according to another embodiment of this application.

FIG. 12 is a schematic flowchart of an autonomous lane change method according to another embodiment of this application. Based on the foregoing embodiment, an implementation of "updating the current control policy based on the feedback information to obtain a control policy at a next moment" is described in this embodiment of this application. As shown in FIG. 12, the method in this embodiment of this application may include the following steps.

At S1201, calculate, based on the feedback information, a local neighbor feature and a global statistical feature of an autonomous vehicle at the next moment, and a reward corresponding to a target action.

In this step, the local neighbor feature and the global statistical feature of the autonomous vehicle at the next moment of a current moment are calculated based on travel information of the autonomous vehicle at the next moment and motion information of obstacles in lanes within a sensing range of the autonomous vehicle at the next moment that are included in the feedback information. For a specific calculation manner, refer to the manner of obtaining the local neighbor feature and the global statistical feature of the autonomous vehicle at the historical moment in step S1001. Details are not described in this embodiment of this application.

The following part in this embodiment of this application describes an implementation of "calculating, based on the feedback information, a reward corresponding to a target action".

In a possible implementation, when the target action is keeping straight, the reward is calculated based on travel information generated after the autonomous vehicle executes the target action.

For example, the reward is calculated based on a preset function R(s") and the travel information s" (for example, a travel speed or a travel distance) generated after the autonomous vehicle executes the target action. For example, the preset function R(s")=$V_{ego}'$ where $V_{ego}'$ represents the travel speed generated after the autonomous vehicle executes the target action. Certainly, the preset function R(s") may alternatively be another function that includes the travel information generated after the autonomous vehicle executes the target action. This is not limited in this embodiment of this application.

In another possible implementation, when the target action is lane change, the reward is calculated based on the travel information generated after the autonomous vehicle executes the target action, a ratio of a period of time for executing the target action to a historical average period of time, and a denseness change between obstacles in a lane in which the autonomous vehicle is located before lane change and obstacles in a lane in which the autonomous vehicle is located after lane change.

In this implementation, a local reward coefficient $K_l$ is determined based on the ratio of the period of time T for executing the target action to the historical average period of time $T_e$. Further, a global reward coefficient $K_g$ is determined based on the denseness change between the obstacles in the lane in which the autonomous vehicle is located before lane change and the obstacles in the lane in which the autonomous vehicle is located after lane change. When the obstacles in the lane in which the autonomous vehicle is located after lane change are denser than the obstacles in the lane in which the autonomous vehicle is located before lane change, $K_g>1$. When the obstacles in the lane in which the autonomous vehicle is located after lane change are sparser than the obstacles in the lane in which the autonomous vehicle is located before lane change, $K_g<1$. Further, the reward is calculated based on the travel information generated after the autonomous vehicle executes the target action, the local reward coefficient $K_l$, and the global reward coefficient $K_g$.

For example, the reward is calculated according to the formula $c*K_l*K_g*K_g*R(s')$, where c represents a preset discount factor (for example, 0.3), and R(s') represents the preset function including the travel information generated after the autonomous vehicle executes the target action. Certainly, the reward may alternatively be calculated according to an equivalent formula or variant formula of the foregoing formula. This is not limited in this embodiment of this application.

If a local neighbor feature of the autonomous vehicle at the current moment may further include location information flag between a navigated target lane and a lane in which the autonomous vehicle is located, and a distance dist2goal between the autonomous vehicle and a next intersection in a travel direction, the local reward coefficient $K_l$ is determined based on the ratio of the period of time T for executing the target action to the historical average period of time $T_e$. flag$\in\{0,-1,1\}$, where flag equal to 0 indicates that the autonomous vehicle is in the navigated target lane, flag equal to $-1$ indicates that the navigated target lane is on the left side of the lane in which the autonomous vehicle is located, and flag equal to 1 indicates that the navigated target lane is on the right side of the lane in which the autonomous vehicle is located. Further, a first global reward coefficient $K_g^1$ is determined based on the denseness change between the obstacles in the lane in which the autonomous vehicle is located before lane change and the obstacles in the lane in which the autonomous vehicle is located after lane change.

Further, a second global reward coefficient $K_g^2$ is determined based on the target action and the location information flag between the navigated target lane and the lane in which the autonomous vehicle is located. For example, the second global reward coefficient $K_g^2$ is determined according to the following formula:

$$K_g^2 = \begin{cases} \max(gap_{cur}/gap_{goal}, 1/2), & \text{if (flag} = -1 \text{ and } \alpha = 1) \text{ or (flag} = 1 \text{ or } \alpha = 2) \\ 1/2, & \text{if (flag} = -1 \text{ and } \alpha = 2) \text{ or (flag} = 1 \text{ and } \alpha = 1) \end{cases},$$

where
$gap_{cur}$ represents an average gap between front and back neighboring obstacles in the lane in which the autonomous vehicle is located before lane change, $gap_{goal}$ represents an average gap between front and back neighboring obstacles in the lane in which the autonomous vehicle is located after lane change, and $\alpha$ represents the target action.

Certainly, the second global reward coefficient $K_g^2$ may alternatively be calculated according to an equivalent formula or variant formula of the foregoing formula. This is not limited in this embodiment of this application.

Further, the reward is calculated based on the travel information generated after the autonomous vehicle executes the target action, the local reward coefficient $K_l$, the first global reward coefficient $K_g^1$, and the second global reward coefficient $K_g^2$.

For example, the reward is calculated according to the formula $c*K_l*K_g^1*K_g^2*R(s')$, where C represents the preset discount factor (for example, 0.3), and R(s') represents the preset function that includes the travel information generated after the autonomous vehicle executes the target action.

For example, the preset function is $$R(s'') = V'_{ego} - |\text{flag}'| \cdot \frac{100}{dist2goal' + 1},$$

where $V_{ego}$' represents the travel speed generated after the autonomous vehicle executes the target action. flag' represents location information between a navigated target lane and a lane in which the autonomous vehicle is located after executing the target action, where flag equal to 0 indicates that the autonomous vehicle is in the navigated target lane after executing the target action, flag' equal to $-1$ indicates that the navigated target lane is on the left side of the lane in which the autonomous vehicle is located after executing the target action, and flag' equal to 1 indicates that the navigated target lane is on the right side of the lane in which the autonomous vehicle is located after executing the target action. dist2goal' represents a distance between a next intersection in a travel direction after the autonomous vehicle executes the target action. Certainly, the preset function R(s') may alternatively be another function that includes the travel information generated after the autonomous vehicle executes the target action. This is not limited in this embodiment of this application.

Certainly, the reward may alternatively be calculated according to an equivalent formula or variant formula of the foregoing formula. This is not limited in this embodiment of this application.

Certainly, the reward corresponding to the target action may be calculated in another manner based on the feedback information. This is not limited in this embodiment of this application.

At Step S1202, determine four-tuple information at the current moment.

In this step, the four-tuple information at the current moment is determined based on the local neighbor feature and the global statistical feature of the autonomous vehicle at the current moment, the target action at the current moment, the reward corresponding to the target action calculated in step S1201, and the local neighbor feature and the global statistical feature of the autonomous vehicle at the next moment.

For example, a vehicle condition at the current moment corresponding to the four-tuple information at the current moment may include: a feature at the current moment, the target action of the autonomous vehicle at the current moment, the reward corresponding to the target action, and a feature at the next moment of the current moment. The feature at the current moment includes the local neighbor feature and the global statistical feature of the autonomous vehicle at the current moment. The feature at the next moment of the current moment includes the local neighbor feature and the global statistical feature of the autonomous vehicle at the next moment.

At S1203, update a current control policy based on the four-tuple information at the current moment to obtain a control policy at the next moment.

In a possible implementation, when the target action is keeping straight, a target value corresponding to the four-tuple information is generated based on the four-tuple information at the current moment. Further, a parameter q in a first preset function that includes the target value is iteratively updated by using a gradient descent method. Further, a parameter q in the current control policy is replaced with an iteratively updated parameter q, to obtain the control policy at the next moment of the current moment.

In this implementation, when the target action is keeping straight, the target value Y corresponding to the four-tuple information may be generated based on the four-tuple information at the current moment according to the following formula.

For example, $$y = \begin{cases} r, s' : \text{End state} \\ r + g\max_{a} Q(s', a, q), s' : \text{Not end state} \end{cases},$$

where g represents a preset forgetting factor, where g∈(0,1); Q(s',a,q) represents an action value function;

$$\max_{a} Q(s', a, q)$$

indicates that a maximum value of Q(s',a,q) is used by traversing a; s' represents the feature at the next moment of the current moment.

Certainly, the target value corresponding to the four-tuple information may alternatively be generated based on the four-tuple information at the current moment according to a variant formula or an equivalent formula of the foregoing formula. This is not limited in this embodiment of this application.

Further, the parameter q in the first preset function (y−Q(s,a,q))² that includes the target value Y is iteratively updated by using a gradient descent method. Q(s,a,q) represents the action value function corresponding to the four-tuple information at the current moment, where s represents the local neighbor feature and the global feature at the current moment in the four-tuple information at the current moment, and a represents the target action at the current moment in the four-tuple information at the current moment.

Further, a parameter q in the current control policy is replaced with an iteratively updated parameter q, to obtain the control policy at the next moment of the current moment, so that the control policy at the next moment is used to determine the target action at the next moment.

In another possible implementation, when the target action is lane change, extended four-tuple information at the current moment is obtained. Further, the current control policy is updated based on the four-tuple information at the current moment and the extended four-tuple information at the current moment, to obtain the control policy at the next moment at the current moment.

The extended four-tuple information at the current moment in this embodiment of this application corresponds to an extended vehicle condition at the current moment, and is obtained by processing the vehicle condition at the current moment according to a symmetry rule and a monotone rule.

The symmetry rule in this embodiment of this application indicates that locations of obstacles in all left lanes and obstacles in all right lanes of the lane in which the autonomous vehicle is located are symmetrically exchanged by using the lane in which the autonomous vehicle is located as an axis.

The monotone rule in this embodiment of this application indicates that a distance increases between front and back neighboring obstacles of the autonomous vehicle in a target lane of lane change executed by the autonomous vehicle, and/or indicates that a change in a distance between front and back neighboring obstacles of the autonomous vehicle in a non-target lane is less than a preset distance range.

For example, the extended four-tuple information at the current moment may include symmetric four-tuple information and monotonic four-tuple information at the current moment. For example, the symmetric four-tuple information at the current moment may be obtained by processing the four-tuple information at the current moment according to the symmetry rule, and the monotonic four-tuple information at the current moment may be obtained by processing the four-tuple information at the current moment according to the monotone rule.

Specifically, for a manner of constructing the symmetric four-tuple information and the monotonic four-tuple information at the current moment, refer to the foregoing manner of constructing "the symmetric four-tuple information and the monotonic four-tuple information at any moment" in this application. Details are not described herein again.

In this implementation, when the target action is lane change, the extended four-tuple information at the current moment is obtained, and a target value $y_i$ corresponding to $i^{th}$ four-tuple information may be generated based on the $i^{th}$ four-tuple information $(s_i, a_i, r_i, s_i')$ in the four-tuple information at the current moment and the extended four-tuple information at the current moment according to the following formula. i is a positive integer not greater than n, and n is a total quantity of four-tuple information included in the four-tuple information at the current moment and the extended four-tuple information at the current moment.

For example, $$y_i = \begin{cases} r_i, s_i' : \text{End state} \\ r_i + g\max_{a_i} Q(s_i', a_i, q), s_i' : \text{Not end state} \end{cases},$$

where g represents a preset forgetting factor, where g∈(0,1); Q(s_i',a_i,q) represents an action value function;

$$\max_{a_i} Q(s_i', a_i, q)$$

indicates that a maximum value of Q(s_i',a_i,q) is used by traversing $a_i$; $s_i'$ represents a feature at a later moment in the $i^{th}$ four-tuple information.

Certainly, the target value corresponding to the $i^{th}$ four-tuple information may alternatively be generated based on $i^{th}$ four-tuple information in the four-tuple information at the current moment and the extended four-tuple information at the current moment according to a variant formula or an equivalent formula of the foregoing formula. This is not limited in this embodiment of this application.

Further, a parameter q in a second preset function $$\sum_{i=1}^{n} (y_i - Q(s_i, a_i, q))^2$$

that includes the target value $y_i$ corresponding to the $i^{th}$ four-tuple information is iteratively updated by using a gradient descent method. Q(s_i,a_i,q) represents an action value function corresponding to the $i^{th}$ four-tuple information, where $s_i$ represents a feature at a previous moment in the i$^{th}$ four-tuple information, and a$_i$ represents a target action at the previous moment in the i$^{th}$ four-tuple information.

Further, a parameter q in the current control policy is replaced with an iteratively updated parameter q, to obtain the control policy at the next moment of the current moment, so that the control policy at the next moment is used to determine the target action at the next moment.

In another possible implementation, when the target action is keeping straight, the current control policy is updated based on the four-tuple information at the current moment, four-tuple information at a historical moment, and extended four-tuple information at the historical moment, to obtain the control policy at the next moment of the current moment.

In this embodiment of this application, the four-tuple information at the historical moment corresponds to a vehicle condition at the historical moment, and may include but not be limited to: a feature at the historical moment, a target action of the autonomous vehicle at the historical moment (namely, a target action determined according to a corresponding control policy at the historical moment), a reward corresponding to the target action at the historical moment, and a feature at a next moment of the historical moment.

For example, the feature at the historical moment may include but not be limited to a local neighbor feature and a global statistical feature of the autonomous vehicle at the historical moment.

For example, the feature at the next moment of the historical moment may include but not be limited to a local neighbor feature and a global statistical feature of the autonomous vehicle at the next moment.

The extended four-tuple information at the historical moment in this embodiment of this application corresponds to an extended vehicle condition at the historical moment, and is obtained by processing the vehicle condition at the historical moment according to a symmetry rule and a monotone rule.

The symmetry rule in this embodiment of this application indicates that locations of obstacles in all left lanes and obstacles in all right lanes of the lane in which the autonomous vehicle is located are symmetrically exchanged by using the lane in which the autonomous vehicle is located as an axis.

The monotone rule in this embodiment of this application indicates that a distance increases between front and back neighboring obstacles of the autonomous vehicle in a target lane of lane change executed by the autonomous vehicle, and/or indicates that a change in a distance between front and back neighboring obstacles of the autonomous vehicle in a non-target lane is less than a preset distance range.

For example, the extended four-tuple information at the historical moment may include symmetric four-tuple information and monotonic four-tuple information at the historical moment. For example, the symmetric four-tuple information at the historical moment may be obtained by processing four-tuple information at the historical moment according to the symmetry rule, and the monotonic four-tuple information at the historical moment may be obtained by processing the four-tuple information at the historical moment according to the monotone rule.

Specifically, for a manner of constructing the symmetric four-tuple information and the monotonic four-tuple information at the historical moment, refer to the foregoing manner of constructing "the symmetric four-tuple information and the monotonic four-tuple information at any moment" in this application. Details are not described herein again.

In this implementation, when the target action is keeping straight, a target value $y_j$ corresponding to j$^{th}$ four-tuple information is generated based on the j$^{th}$ four-tuple information $(s_j, a_j, r_j, s_j')$ in the four-tuple information at the current moment, the four-tuple information at the historical moment, and the extended four-tuple information at the historical moment according to the following formula. j is a positive integer not greater than m, and m is a total quantity of four-tuple information included in the four-tuple information at the current moment, the four-tuple information at the historical moment, and the extended four-tuple information at the historical moment;

For example, $$y_j = \begin{cases} r_j, s_j' : \text{End state} \\ r_j + g\max_{a_j} Q(s_j', a_j, q), s_j' : \text{Not end state} \end{cases},$$

where
g represents a preset forgetting factor, where g∈(0,1); $Q(s_j', a_j, q)$ represents an action value function;

$$\max_{a_j} Q(s_j', a_j, q)$$

indicates that a maximum value of $Q(s_j', a_j, q)$ is used by traversing $a_j$; $s_j'$ represents a feature at a later moment in the j$^{th}$ four-tuple information.

Certainly, the target value corresponding to the j$^{th}$ four-tuple information may be generated based on the j$^{th}$ four-tuple information in the four-tuple information at the current moment, the extended four-tuple information at the historical moment, and the extended four-tuple information at the historical moment according to a variant formula or an equivalent formula of the foregoing formula. This is not limited in this embodiment of this application.

Further, a parameter q in a third preset function $$\sum_{j=1}^{m}(y_j - Q(s_j, a_j, q))^2$$

that includes the target value $y_j$ corresponding to the j$^{th}$ four-tuple information is iteratively updated by using a gradient descent method. $Q(s_j, a_j, q)$ represents an action value function corresponding to the j$^{th}$ four-tuple information, where $s_j$ represents a feature at a previous moment in the j$^{th}$ four-tuple information, and $a_j$ represents a target action at the previous moment in the j$^{th}$ four-tuple information.

Further, a parameter q in the current control policy is replaced with an iteratively updated parameter q, to obtain the control policy at the next moment, so that the control policy at the next moment is used to determine the target action at the next moment.

In another possible implementation, when the target action is lane change, the extended four-tuple information at the current moment is obtained. Further, the current control policy is updated based on the four-tuple information at the current moment, the extended four-tuple information at the current moment, the four-tuple information at the historical moment, and the extended four-tuple information at the historical moment, to obtain the control policy at the next moment at the current moment.

The extended four-tuple information at the current moment in this embodiment of this application corresponds to an extended vehicle condition at the current moment, and is obtained by processing the vehicle condition at the current moment according to a symmetry rule and a monotone rule.

The symmetry rule in this embodiment of this application indicates that locations of obstacles in all left lanes and obstacles in all right lanes of the lane in which the autonomous vehicle is located are symmetrically exchanged by using the lane in which the autonomous vehicle is located as an axis.

The monotone rule in this embodiment of this application indicates that a distance increases between front and back neighboring obstacles of the autonomous vehicle in a target lane of lane change executed by the autonomous vehicle, and/or indicates that a change in a distance between front and back neighboring obstacles of the autonomous vehicle in a non-target lane is less than a preset distance range.

For example, the extended four-tuple information at the current moment may include symmetric four-tuple information and monotonic four-tuple information at the current moment. For example, the symmetric four-tuple information at the current moment may be obtained by processing the four-tuple information at the current moment according to the symmetry rule, and the monotonic four-tuple information at the current moment may be obtained by processing the four-tuple information at the current moment according to the monotone rule.

Specifically, for a manner of constructing the symmetric four-tuple information and the monotonic four-tuple information at the current moment, refer to the foregoing manner of constructing "the symmetric four-tuple information and the monotonic four-tuple information at any moment" in this application. Details are not described herein again.

In this embodiment of this application, the four-tuple information at the historical moment corresponds to a vehicle condition at the historical moment, and may include but not be limited to: a feature at the historical moment, a target action of the autonomous vehicle at the historical moment (namely, a target action determined according to a corresponding control policy at the historical moment), a reward corresponding to the target action at the historical moment, and a feature at the next moment of the historical moment.

For example, the feature at the historical moment may include but not be limited to a local neighbor feature and a global statistical feature of the autonomous vehicle at the historical moment.

For example, the feature at the next moment of the historical moment may include but not be limited to a local neighbor feature and a global statistical feature of the autonomous vehicle at the next moment.

The extended four-tuple information at the historical moment in this embodiment of this application corresponds to an extended vehicle condition at the historical moment, and is obtained by processing the vehicle condition at the historical moment according to the symmetry rule and the monotone rule.

For example, the extended four-tuple information at the historical moment may include symmetric four-tuple information and monotonic four-tuple information at the historical moment. For example, the symmetric four-tuple information at the historical moment may be obtained by processing the four-tuple information at the historical moment according to the symmetry rule, and the monotonic four-tuple information at the historical moment may be obtained by processing the four-tuple information at the historical moment according to the monotone rule.

Specifically, for a manner of constructing the symmetric four-tuple information and the monotonic four-tuple information at the historical moment, refer to the foregoing manner of constructing "the symmetric four-tuple information and the monotonic four-tuple information at any moment" in this application. Details are not described herein again.

In this implementation, when the target action is lane change, the extended four-tuple information at the current moment is obtained, and a target value $y_k$ corresponding to $k^{th}$ four-tuple information may be generated based on the $k^{th}$ four-tuple information in the four-tuple information at the current moment, the extended four-tuple information at the current moment, the four-tuple information at the historical moment, and the extended four-tuple information at the historical moment according to the following formula. k is a positive integer not greater than p, and p is a total quantity of four-tuple information included in the four-tuple information at the current moment, the extended four-tuple information at the current moment, the four-tuple information at the historical moment, and the extended four-tuple information at the historical moment.

For example, $$y_k = \begin{cases} r_k, s_k' : \text{End state} \\ r_k + g\max_{a_k} Q(s_k', a_k, q), s_k' : \text{Not end state} \end{cases},$$

where
  g represents a preset forgetting factor, where $g \in (0,1)$;
  $Q(s_k', a_k, q)$ represents an action value function;

$$\max_{a_k} Q(s_k', a_k, q)$$

indicates that a maximum value of $Q(s_k', a_k, q)$ is used by traversing $a_k$; $S_k'$ represents a feature at a later moment in the $k^{th}$ four-tuple information.

Certainly, the target value corresponding to the $k^{th}$ four-tuple information may be generated based on the $k^{th}$ four-tuple information in the four-tuple information at the current moment, the extended four-tuple information at the current moment, the four-tuple information at the historical moment, and the extended four-tuple information at the historical moment according to a variant formula or an equivalent formula of the foregoing formula. This is not limited in this embodiment of this application.

Further, a parameter q in a fourth preset function $$\sum_{k=1}^{p} (y_k - Q(s_k, a_k, q))^2$$

that includes the target value $y_k$ corresponding to the $k^{th}$ four-tuple information is iteratively updated by using a gradient descent method. $Q(S_k, a_k, q)$ represents an action value function corresponding to the $k^{th}$ four-tuple information, where $S_k$ represents a feature at a previous moment in the $k^{th}$ four-tuple information, and $a_k$ represents a target action at the previous moment in the $k^{th}$ four-tuple information.

Further, a parameter q in the current control policy is replaced with an iteratively updated parameter q, to obtain the control policy at the next moment of the current moment, so that the control policy at the next moment is used to determine the target action at the next moment.

Certainly, the current control policy may be updated in another manner based on the four-tuple information at the current moment to obtain the control policy at the next moment. This is not limited in this embodiment of this application.

Figure 13:
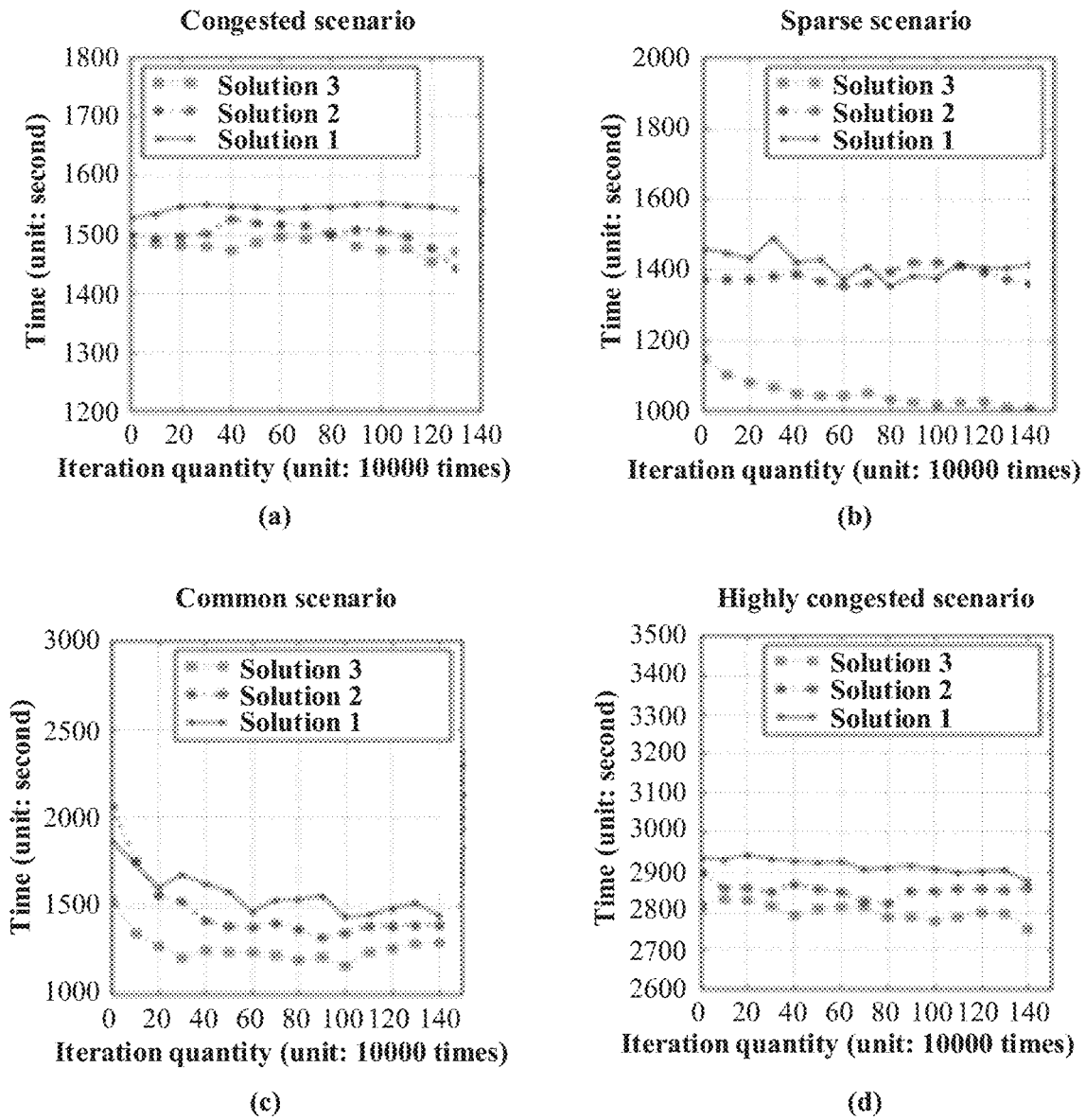
FIG. 13 is a schematic diagram of training data according to an embodiment of this application.

FIG. 13 is a schematic diagram of training data according to an embodiment of this application. FIG. 13 shows trend performance of control policies at different phases obtained in a training process by using a control policy training method provided in this embodiment of this application in four different vehicle traffic scenarios (for example, a sparse scenario, a common scenario, a congested scenario, and a highly congested scenario). In FIG. 13, the horizontal coordinate represents a quantity of iterations (unit: 10000 times) of the entire training process, and the vertical coordinate represents a period of time (unit: second) for which an autonomous vehicle completes a journey on a lane with a fixed length. A red curve represents a convergence trend of training by using only a local neighbor feature as input (solution 1). A blue curve represents a trend of training by using a global statistical feature as input as well as local neighbor features (solution 2). A green curve represents a convergence trend of training in which a reward is calculated by introducing a local reward coefficient and a global reward coefficient (solution 3). It can be seen that, performance improves by using the control policy in which the global statistical feature is added, and convergence accelerates and performance enhances by using the control policy in which the reward is calculated by introducing the local reward coefficient and the global reward coefficient.

Table 1 schematically lists training data provided in this embodiment of this application. As listed in Table 1, comparisons are made between this solution and a related solution in the sparse scenario, the common scenario, the congested scenario, and the highly congested scenario. It can be seen that this solution is superior to the related solution in terms of an average speed and an average lane change times. In addition, according to statistics, there are some lane change behaviors which seem to be partially unreasonable but actually reasonable in the long run. Such behaviors are referred to as "soft lane changing". It can be seen from Table 1 that soft lane changing occurs sometimes in this solution, indicating the model in this solution is more intelligent in the long run.

TABLE 1

Training data provided in the embodiments of this application

|  | Highly congested scenario | | Congested scenario | | Common scenario | | Sparse scenario | |
| --- | --- | --- | --- | --- | --- | --- | --- | --- |
|  | Related solution | This solution | Related solution | This solution | Related solution | This solution | Related solution | This solution |
| Average speed (km/h) | 6.46 | 6.44 | 11.8 | 12.02 | 51 | 49.6 | 58 | 67 |
| Average lane change times | 473 | 14.4 | 61.8 | 12 | 12 | 18.6 | 4.8 | 6.2 |
| Soft lane change ratio (%) | 0 | 15 | 0 | 0 | 0 | 9 | 0 | 30 |

Figure 14:
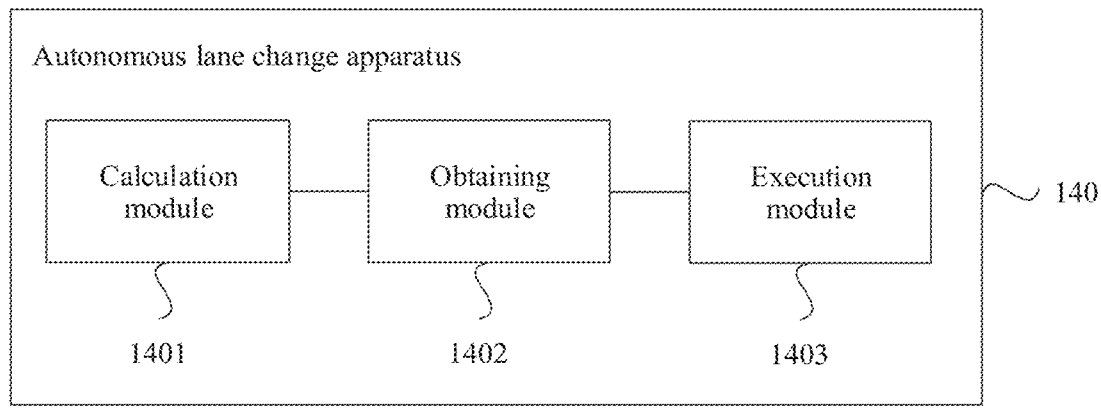
FIG. 14 is a schematic structural diagram of an autonomous lane change apparatus according to an embodiment of this application.

FIG. 14 is a schematic structural diagram of an autonomous lane change apparatus according to an embodiment of this application. As shown in FIG. 14, the autonomous lane change apparatus 140 provided in this embodiment may include a calculation module 1401, an obtaining module 1402, and an execution module 1403.

The calculation module 1401 is configured to calculate a local neighbor feature and a global statistical feature of an autonomous vehicle at a current moment based on travel information of the autonomous vehicle at the current moment and motion information of obstacles in lanes within a sensing range of the autonomous vehicle, where the local neighbor feature is used to represent motion status information of a specific neighboring obstacle of the autonomous vehicle relative to the autonomous vehicle, and the global statistical feature is used to represent denseness of the obstacles in the lanes within the sensing range.

The obtaining module 1402 is configured to obtain a target action indication based on the local neighbor feature, the global statistical feature, and a current control policy, where the target action indication is used to indicate the autonomous vehicle to execute a target action, and the target action includes at least two types: lane change or keeping straight.

The execution module 1403 is configured to execute the target action according to the target action indication.

In a possible implementation, the apparatus further includes:

a feedback module, configured to obtain feedback information by executing the target action, where the feedback information is used to update the current control policy; the feedback information includes travel information generated after the autonomous vehicle executes the target action, travel information of the autonomous vehicle at a next moment, and motion information of the obstacles in the lanes within the sensing range of the autonomous vehicle at the next moment; and when the target action is lane change, the feedback information further includes a ratio of a period of time for executing the target action to a historical average period of time, and a denseness change between obstacles in a lane in which the autonomous vehicle is located before lane change and obstacles in a lane in which the autonomous vehicle is located after lane change, where the historical average period of time is an average period of time for which the autonomous vehicle executes a similar action within a preset historical period of time; and
an updating module, configured to update the current control policy based on the feedback information to obtain a control policy at the next moment.

In a possible implementation, the updating module includes:
a calculation unit, configured to calculate, based on the feedback information, a local neighbor feature and a global statistical feature of the autonomous vehicle at the next moment, and a reward corresponding to the target action;
a determining unit, configured to determine four-tuple information at the current moment, where the four-tuple information at the current moment corresponds to a vehicle condition at the current moment, and includes: a feature at the current moment, the target action, the reward corresponding to the target action, and a feature at the next moment, where the feature at the current moment includes the local neighbor feature and the global statistical feature of the autonomous vehicle at the current moment, and the feature at the next moment includes the local neighbor feature and the global statistical feature of the autonomous vehicle at the next moment; and
an updating unit, configured to update the current control policy based on the four-tuple information at the current moment to obtain the control policy at the next moment.

In a possible implementation, when the target action is keeping straight, the updating unit is specifically configured to:
generate, based on the four-tuple information at the current moment, a target value corresponding to the four-tuple information;
iteratively update, by using a gradient descent method, a parameter q in a first preset function that includes the target value; and
replace a parameter q in the current control policy with an iteratively updated parameter q, to obtain the control policy at the next moment.

In a possible implementation, when the target action is lane change, the updating unit is specifically configured to:
obtain extended four-tuple information at the current moment, where the extended four-tuple information at the current moment corresponds to an extended vehicle condition at the current moment, and the extended vehicle condition at the current moment is obtained by processing the vehicle condition at the current moment according to a symmetry rule and a monotone rule, where the symmetry rule indicates that locations of obstacles in all left lanes and obstacles in all right lanes of the lane in which the autonomous vehicle is located are symmetrically exchanged by using the lane in which the autonomous vehicle is located as an axis, and the monotone rule indicates that a distance increases between front and back neighboring obstacles of the autonomous vehicle in a target lane of lane change executed by the autonomous vehicle, and/or indicates that a change in a distance between front and back neighboring obstacles of the autonomous vehicle in a non-target lane is less than a preset distance range; and
update the current control policy based on the four-tuple information at the current moment and the extended four-tuple information at the current moment to obtain the control policy at the next moment.

In a possible implementation, the updating unit is specifically configured to:
generate, based on $i^{th}$ four-tuple information in the four-tuple information at the current moment and the extended four-tuple information at the current moment, a target value corresponding to the $i^{th}$ four-tuple information, where i is a positive integer not greater than n, and n is a total quantity of four-tuple information included in the four-tuple information at the current moment and the extended four-tuple information at the current moment;
iteratively update, by using a gradient descent method, a parameter q in a second preset function that includes the target value corresponding to the $i^{th}$ four-tuple information; and
replace a parameter q in the current control policy with an iteratively updated parameter q, to obtain the control policy at the next moment.

In a possible implementation, when the target action is keeping straight, the updating unit is specifically configured to:
update the current control policy based on the four-tuple information at the current moment, four-tuple information at a historical moment, and extended four-tuple information at the historical moment, to obtain the control policy at the next moment.

The four-tuple information at the historical moment corresponds to a vehicle condition at the historical moment, and includes: a feature at the historical moment, a target action at the historical moment, a reward corresponding to the target action at the historical moment, and a feature at a next moment of the historical moment, where the feature at the historical moment includes a local neighbor feature and a global statistical feature of the autonomous vehicle at the historical moment, and the feature at the next moment of the historical moment includes a local neighbor feature and a global statistical feature of the autonomous vehicle at the next moment of the historical moment; and the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

In a possible implementation, the updating unit is specifically configured to:
generate, based on $j^{th}$ four-tuple information in the four-tuple information at the current moment, the four-tuple information at the historical moment, and the extended four-tuple information at the historical moment, a target value corresponding to the $j^{th}$ four-tuple information, where j is a positive integer not greater than m, and m is a total quantity of four-tuple information included in the four-tuple information at the current moment, the four-tuple information at the historical moment, and the extended four-tuple information at the historical moment;
iteratively update, by using a gradient descent method, a parameter q in a third preset function that includes the target value corresponding to the $j^{th}$ four-tuple information; and
replace a parameter q in the current control policy with an iteratively updated parameter q, to obtain the control policy at the next moment.

In a possible implementation, when the target action is lane change, the updating unit is specifically configured to:

obtain extended four-tuple information at the current moment, where the extended four-tuple information at the current moment corresponds to an extended vehicle condition at the current moment, and the extended vehicle condition at the current moment is obtained by processing the vehicle condition at the current moment according to a symmetry rule and a monotone rule; and update the current control policy based on the four-tuple information at the current moment, the extended four-tuple information at the current moment, four-tuple information at a historical moment, and extended four-tuple information at the historical moment to obtain the control policy at the next moment, where the four-tuple information at the historical moment corresponds to a vehicle condition at the historical moment, the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

In a possible implementation, the updating unit is specifically configured to:

generate, based on $k^{th}$ four-tuple information in the four-tuple information at the current moment, the extended four-tuple information at the current moment, the four-tuple information at the historical moment, and the extended four-tuple information at the historical moment, a target value corresponding to the $k^{th}$ four-tuple information, where k is a positive integer not greater than p, and p is a total quantity of four-tuple information included in the four-tuple information at the current moment, the extended four-tuple information at the current moment, the four-tuple information at the historical moment, and the extended four-tuple information at the historical moment;

iteratively update, by using a gradient descent method, a parameter q in a fourth preset function that includes the target value corresponding to the $k^{th}$ four-tuple information; and replace a parameter q in the current control policy with an iteratively updated parameter q, to obtain the control policy at the next moment.

In a possible implementation, when the target action is keeping straight, the calculation unit is specifically configured to:

calculate the reward based on travel information generated after the autonomous vehicle executes the target action; and calculate the local neighbor feature and the global statistical feature of the autonomous vehicle at the next moment based on the travel information of the autonomous vehicle at the next moment and the motion information of the obstacles in the lanes within the sensing range of the autonomous vehicle at the next moment.

In a possible implementation, when the target action is lane change, the calculation unit is specifically configured to:

calculate the reward based on travel information generated after the autonomous vehicle executes the target action, a ratio of a period of time for executing the target action to a historical average period of time, and a denseness change between obstacles in a lane in which the autonomous vehicle is located before lane change and obstacles in a lane in which the autonomous vehicle is located after lane change; and calculate the local neighbor feature and the global statistical feature of the autonomous vehicle at the next moment based on the travel information of the autonomous vehicle at the next moment and the motion information of the obstacles in the lanes within the sensing range of the autonomous vehicle at the next moment.

In a possible implementation, the specific neighboring obstacle of the autonomous vehicle includes at least one of the following: front and back neighboring obstacles of the autonomous vehicle in a lane in which the autonomous vehicle is located, front and back neighboring obstacles of the autonomous vehicle in a left lane adjacent to the lane in which the autonomous vehicle is located, and front and back neighboring obstacles of the autonomous vehicle in a right lane adjacent to the lane in which the autonomous vehicle is located.

When the autonomous vehicle is located in a left lane, motion status information, relative to the autonomous vehicle, of the front and back neighboring obstacles of the autonomous vehicle in the left lane adjacent to the lane in which the autonomous vehicle is located is a default value; and/or when the autonomous vehicle is located in a right lane, motion status information, relative to the autonomous vehicle, of the front and back neighboring obstacles of the autonomous vehicle in the right lane adjacent to the lane in which the autonomous vehicle is located is a default value.

In a possible implementation, the global vehicle traffic statistical feature of the autonomous vehicle at the current moment includes at least one of the following: an average travel speed and an average gap of all the obstacles in the lanes within the sensing range.

The autonomous lane change apparatus 140 provided in this embodiment of this application can be configured to perform the technical solutions in the foregoing autonomous lane change method embodiments of this application. Implementation principles and technical effects thereof are similar, and details are not described herein again.

Figure 15:
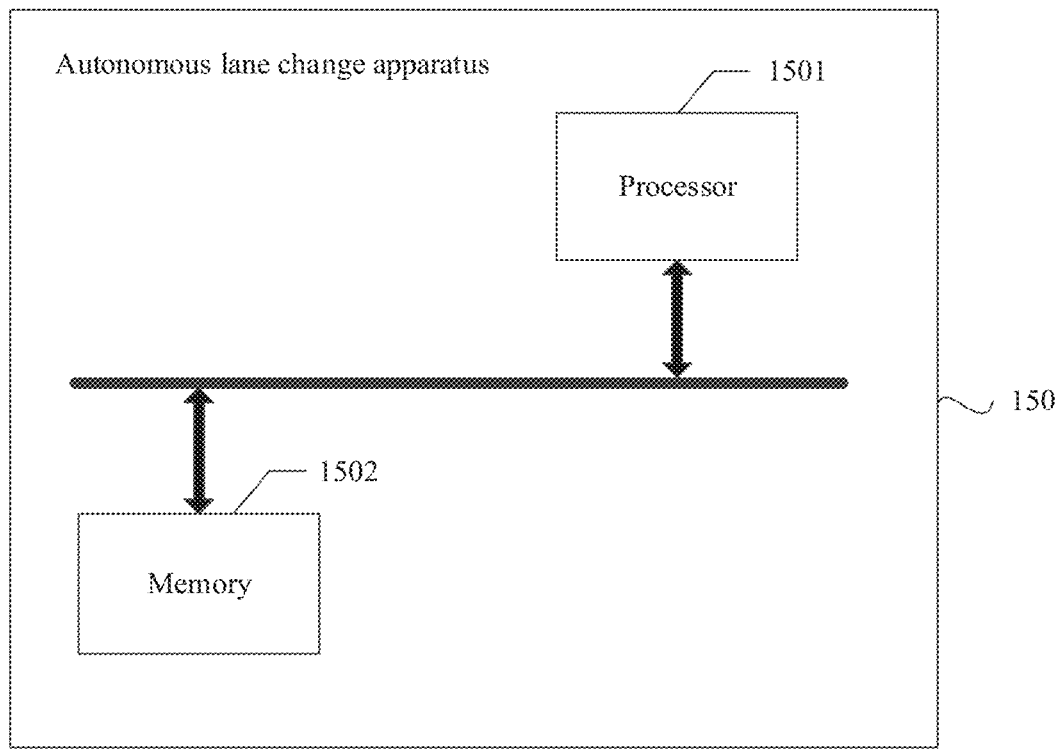
FIG. 15 is a schematic structural diagram of an autonomous lane change apparatus according to another embodiment of this application.

FIG. 15 is a schematic structural diagram of an autonomous lane change apparatus according to another embodiment of this application. As shown in FIG. 15, the autonomous lane change apparatus 150 provided in this embodiment may include a processor 1501 and a memory 1502.

The memory 1502 is configured to store program instructions.

The processor 1501 is configured to invoke and execute the program instructions stored in the memory 1502. When the processor 1501 executes the program instructions stored in the memory 1502, the autonomous lane change apparatus is configured to perform the technical solutions in the foregoing autonomous lane change method embodiments of this application. Implementation principles and technical effects thereof are similar, and details are not described herein again.

It can be understood that FIG. 15 shows only a simplified design of the autonomous lane change apparatus. In another implementation, the autonomous lane change apparatus may further include processors, memories and/or communication units of any quantity, and the like. This is not limited in this embodiment of this application.

An embodiment of this application further provides a computer-readable storage medium. The computer-readable storage medium stores instructions. When the instructions are run on a computer, the computer is enabled to perform the foregoing technical solutions in the autonomous lane change method embodiments of this application. Implementation principles and technical effects thereof are similar, and details are not described herein again.

An embodiment of this application further provides a program. When the program is executed by a processor, the program is used to perform the technical solutions in the autonomous lane change method embodiments of this application. Implementation principles and technical effects thereof are similar, and details are not described herein again.

An embodiment of this application further provides a computer program product including instructions. When the computer program product runs on a computer, the computer is enabled to perform the technical solutions in the foregoing autonomous lane change method embodiments of this application. Implementation principles and technical effects thereof are similar, and details are not described herein again.

Figure 16:
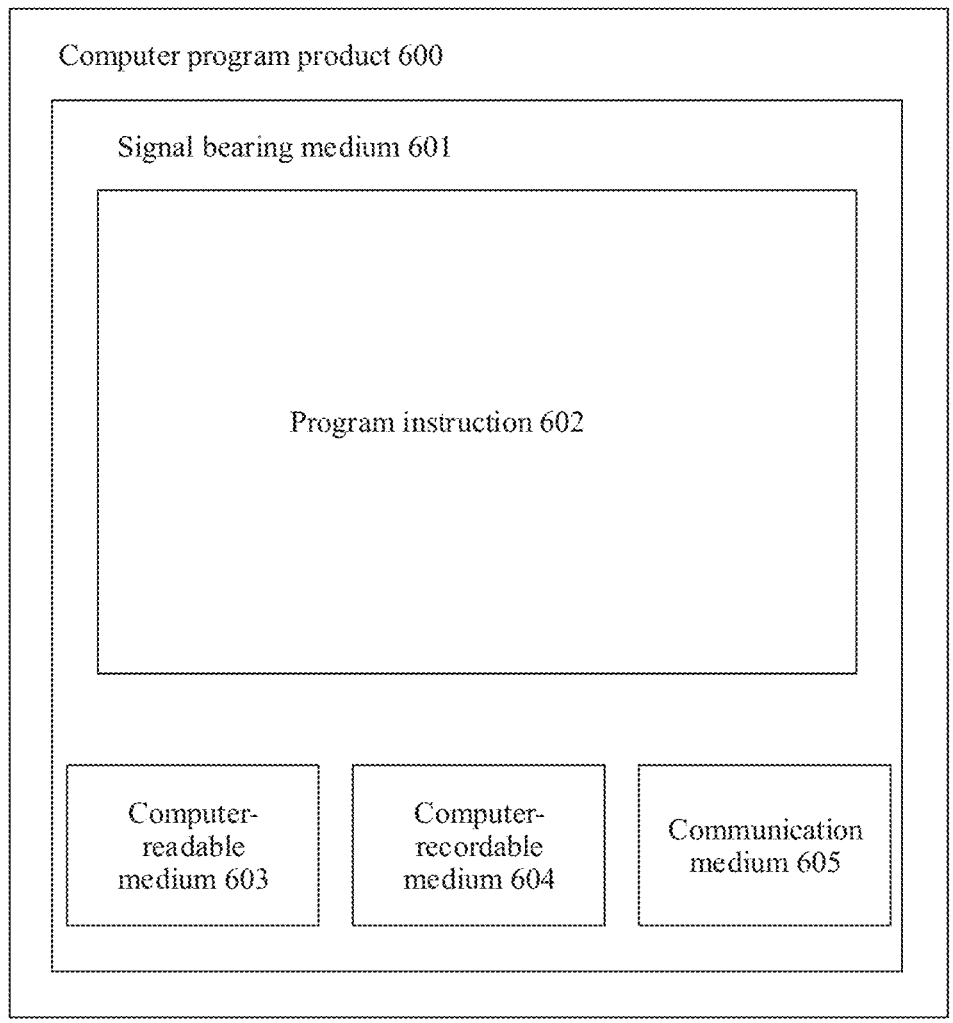
FIG. 16 is a conceptual partial view of a computer program product according to an embodiment of this application.

In some embodiments, the disclosed method may be implemented as a computer program instruction encoded in a machine-readable format on a computer-readable storage medium or encoded on another non-transitory medium or product. FIG. 16 is a conceptual partial view of a computer program product according to an embodiment of this application. FIG. 16 schematically illustrates a conceptual partial view of an example computer program product arranged based on at least some of the embodiments. The example computer program product includes a computer program for executing a computer process on a computing device. In an embodiment, the example computer program product 600 is provided by using a signal bearing medium 601. The signal bearing medium 601 may include one or more program instructions 602. When the program instructions 602 are run by one or more processors, the technical solutions in the foregoing autonomous lane change method embodiments of this application can be implemented. Implementation principles and technical effects thereof are similar, and details are not described herein again.

In some examples, the signal bearing medium 601 may include a computer-readable medium 603, including but not limited to, a hard disk drive, a compact disk (CD), a digital video disc (DVD), a digital magnetic tape, a memory, a read-only memory (ROM), a random access memory (RAM), or the like. In some implementations, the signal bearing medium 601 may include a computer-recordable medium 604, including but not limited to, a memory, a read/write (R/W) CD, an R/W DVD, and the like. In some implementations, the signal bearing medium 601 may include a communication medium 605, including but not limited to a digital and/or analog communication medium (for example, an optical fiber cable, a waveguide, a wired communication link, or a wireless communication link). Therefore, for example, the signal bearing medium 601 may be conveyed by a wireless communication medium 605 (for example, a wireless communication medium that complies with the IEEE 802.11 standard or another transmission protocol). The one or more program instructions 602 may be, for example, one or more computer-executable instructions or logic implementation instructions. In some examples, a computing device may be configured to provide various operations, functions, or actions in response to the program instructions 602 transferred to the computing device through one or more of the computer-readable medium 603, the computer-recordable medium 604, and/or the communication medium 605. It should be understood that the arrangement described herein is merely an example. Therefore, a person skilled in the art understands that the arrangement can be replaced with other arrangement and other elements (for example, machines, interfaces, functions, sequences, and a group of functions), and some elements may not be included depending on a desired result. In addition, many of the described elements are functional entities that can be implemented as discrete or distributed components, or implemented in any suitable combination at any suitable location in combination with another component.

Figure 17:
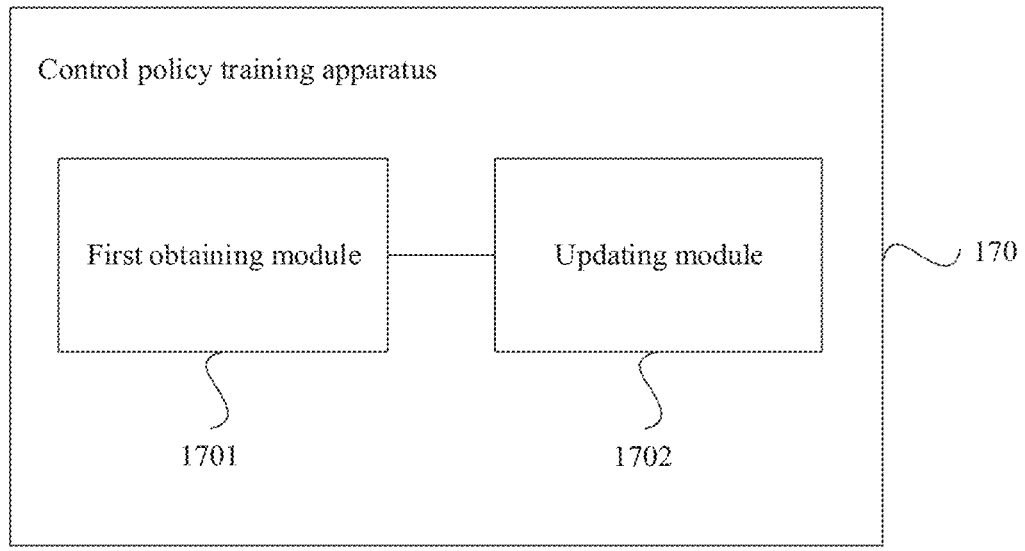
FIG. 17 is a schematic structural diagram of a control policy training apparatus according to an embodiment of this application.

FIG. 17 is a schematic structural diagram of a control policy training apparatus according to an embodiment of this application. As shown in FIG. 17, the control policy training apparatus 170 provided in this embodiment may include a first obtaining module 1701 and an updating module 1702.

The first obtaining module 1701 is configured to perform step A of obtaining four-tuple information at a preset quantity of historical moments, where the four-tuple information at the historical moments corresponds to vehicle conditions at the historical moments, and includes: features at the historical moments, target actions of an autonomous vehicle at the historical moments, rewards corresponding to the target actions at the historical moments, and features at next moments of the historical moments, where the features at the historical moments include local neighbor features and global statistical features of the autonomous vehicle at the historical moments, and the features at the next moments of the historical moments include local neighbor features and global statistical features of the autonomous vehicle at the next moments of the historical moments.

The updating module 1702 is configured to perform step B of updating a current control policy based on four-tuple information at least at one first historical moment, extended four-tuple information at the at least one first historical moment, and four-tuple information at least at one second historical moment, to obtain a control policy at the next moment.

The execution of cyclically performing step A and step B ends until a quantity of execution times reaches a preset quantity of times, or the execution of cyclically performing step A and step B ends until a control policy obtained by cyclically performing step A and step B for a plurality of times satisfies a preset condition. The control policy that is finally obtained by cyclically performing step A and step B for the plurality of times is used to obtain a target action indication by an autonomous lane change apparatus when executing an autonomous lane change method.

The four-tuple information at the at least one first historical moment is four-tuple information at a historical moment at which a target action at the historical moment is lane change in the four-tuple information at the preset quantity of historical moments. The four-tuple information at the at least one second historical moment is four-tuple information at historical moments other than the four-tuple information at the at least one first historical moment in the four-tuple information at the preset quantity of historical moments. Extended four-tuple information at any first historical moment corresponds to an extended vehicle condition at the first historical moment, and the extended vehicle condition at the first historical moment is obtained by processing a vehicle condition at the first historical moment according to a symmetry rule and a monotone rule.

In a possible implementation, the updating module 1702 includes:
- a generation unit, configured to generate, based on $l^{th}$ four-tuple information in the four-tuple information at the at least one first historical moment, the extended four-tuple information at the at least one first historical moment, and the four-tuple information at the at least one second historical moment, a target value corresponding to the $l^{th}$ four-tuple information, where 1 is a positive integer not greater than q, and q is a total quantity of four-tuple information included in the four-tuple information at the at least one first historical moment, the extended four-tuple information at the at least one first historical moment, and the four-tuple information at the at least one second historical moment;
- an updating unit, configured to iteratively update, by using a gradient descent method, a parameter q in a preset function that includes the target value corresponding to the $l^{th}$ four-tuple information; and
- a replacing unit, configured to replace a parameter q in the current control policy with an iteratively updated parameter q, to obtain the control policy at the next moment.

In a possible implementation, the apparatus further includes:
- a first calculation module, configured to: for each historical moment, calculate a local neighbor feature and a global statistical feature of the autonomous vehicle at the historical moment based on travel information of the autonomous vehicle and motion information of obstacles in lanes within a sensing range of the autonomous vehicle;
- a second obtaining module, configured to obtain a target action indication at the historical moment based on the local neighbor feature and the global statistical feature at the historical moment, and a current control policy at the historical moment, where the target action indication is used to indicate the autonomous vehicle to execute a target action, and the target action includes at least two types: lane change or keeping straight; and
- a feedback module, configured to obtain feedback information by executing the target action, where the feedback information includes travel information generated after the autonomous vehicle executes the target action, travel information of the autonomous vehicle at a next moment, and motion information of the obstacles in the lanes within the sensing range of the autonomous vehicle at the next moment; and when the target action is lane change, the feedback information further includes a ratio of a period of time for executing the target action to a historical average period of time, and a denseness change between obstacles in a lane in which the autonomous vehicle is located before lane change and obstacles in a lane in which the autonomous vehicle is located after lane change, where the historical average period of time is an average period of time for which the autonomous vehicle executes a similar action within a preset historical period of time;
- a second calculation module, configured to calculate, based on the feedback information, the local neighbor feature and the global vehicle traffic statistical feature of the autonomous vehicle at the next moment of the historical moment, and the reward corresponding to the target action; and
- a storage module, configured to store the four-tuple information at the historical moment.

In a possible implementation, when the target action is keeping straight, the second calculation module is specifically configured to:
- calculate the reward based on travel information generated after the autonomous vehicle executes the target action.

In a possible implementation, when the target action is lane change, the second calculation module is specifically configured to:
- calculate the reward based on travel information generated after the autonomous vehicle executes the target action, a ratio of a period of time for executing the target action to a historical average period of time, and a denseness change between obstacles in a lane in which the autonomous vehicle is located before lane change and obstacles in a lane in which the autonomous vehicle is located after lane change.

The control policy training apparatus 170 provided in this embodiment of this application can be configured to perform the technical solutions in the foregoing control policy training method embodiments of this application. Implementation principles and technical effects thereof are similar, and details are not described herein again.

Figure 18:
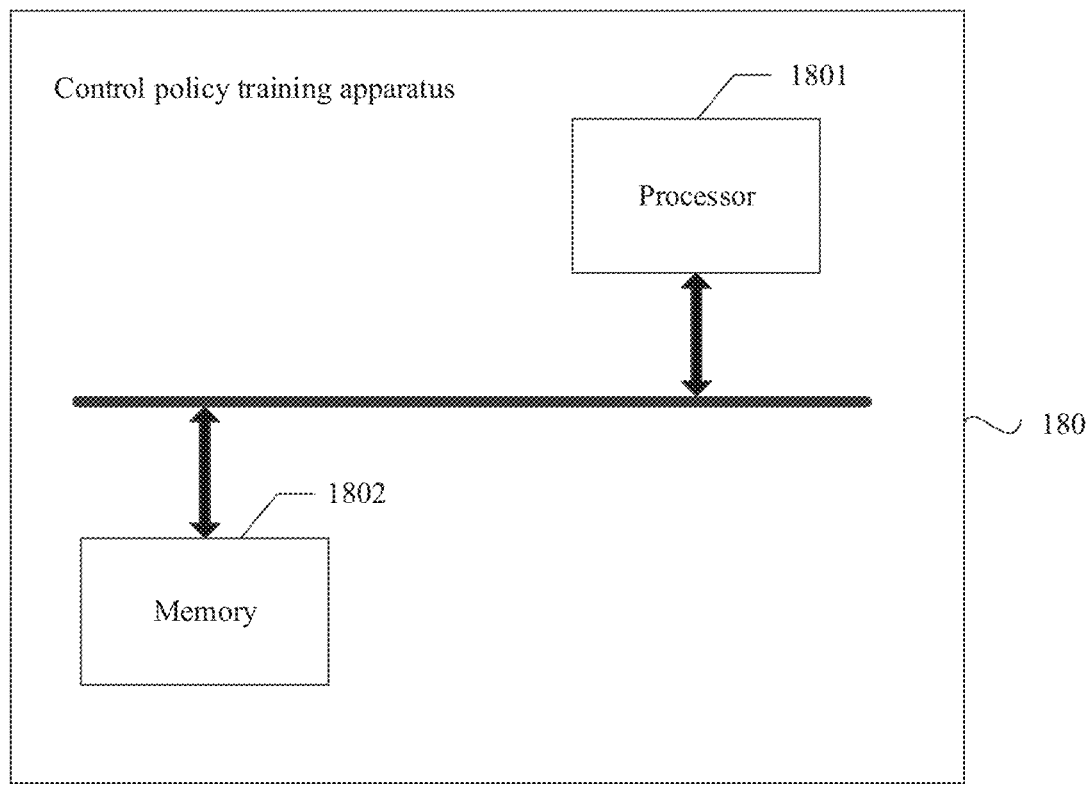
FIG. 18 is a schematic structural diagram of a control policy training apparatus according to another embodiment of this application.

FIG. 18 is a schematic structural diagram of a control policy training apparatus according to another embodiment of this application. As shown in FIG. 18, the control policy training apparatus 180 provided in this embodiment may include a processor 1801 and a memory 1802.

The memory 1802 is configured to store program instructions.

The processor 1801 is configured to invoke and execute the program instructions stored in the memory 1802. When the processor 1801 executes the program instructions stored in the memory 1802, the control policy training apparatus is configured to perform the technical solutions in the foregoing control policy training method embodiments of this application. Implementation principles and technical effects thereof are similar, and details are not described herein again.

It can be understood that FIG. 18 shows only a simplified design of the control policy training apparatus. In another implementation, the control policy training apparatus may further include processors, memories and/or communication units of any quantity, and the like. This is not limited in this embodiment of this application.

An embodiment of this application further provides a computer-readable storage medium. The computer-readable storage medium stores instructions. When the instructions are run on a computer, the computer is enabled to perform the foregoing technical solutions in the control policy training method embodiments of this application. Implementation principles and technical effects thereof are similar, and details are not described herein again.

An embodiment of this application further provides a program. When the program is executed by a processor, the program is used to perform the technical solutions in the control policy training method embodiments of this application. Implementation principles and technical effects thereof are similar, and details are not described herein again.

An embodiment of this application further provides a computer program product including instructions. When the computer program product runs on a computer, the computer is enabled to perform the technical solutions in the foregoing control policy training method embodiments of this application. Implementation principles and technical effects thereof are similar, and details are not described herein again.

For example, for a conceptual partial view of the computer program product provided in this embodiment of this application, refer to FIG. 16. Details are not described herein again.

An embodiment of this application further provides a chip. The chip includes a processor and a data interface. The processor reads, through the data interface, instructions stored in a memory, and executes the technical solutions in the foregoing control policy training method embodiment or the foregoing autonomous lane change method embodiment. Implementation principles and technical effects thereof are similar, and details are not described herein again.

Optionally, in an implementation, the chip may further include the memory. The memory stores instructions. The processor is configured to execute the instructions stored in the memory. When the instructions are executed, the processor is configured to execute the technical solutions in the foregoing control policy training method embodiments or the foregoing autonomous lane change method embodiments. Implementation principles and technical effects thereof are similar, and details are not described herein again.

An embodiment of this application further provides an electronic device. The electronic device includes the autonomous lane change apparatus provided in the foregoing autonomous lane change apparatus embodiments.

An embodiment of this application further provides an electronic device. The electronic device includes the control policy training apparatus provided in the foregoing control policy training apparatus embodiments.

In the embodiments of this application, the processor may be a general-purpose processor, a digital signal processor, an application-specific integrated circuit, a field-programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by a combination of hardware and software modules in the processor.

In the embodiments of this application, the memory may be a non-volatile memory, such as a hard disk drive (HDD) or a solid-state drive (SSD), or may be a volatile memory, such as a random access memory (RAM). The memory is any other medium that can be configured to carry or store expected program code in a form of instructions or a data structure and that can be accessed by a computer, but is not limited thereto.

In the several embodiments provided in this application, it should be understood that the disclosed apparatuses and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware plus a software functional unit.

A person of ordinary skill in the art may understand that sequence numbers of the foregoing processes do not mean execution sequences in various embodiments of this application. The execution sequences of the processes should be determined based on functions and internal logic of the processes, and should not constitute any limitation on the implementation processes of the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. An autonomous lane change method for an autonomous lane change apparatus that comprises a processor, the method comprising:
   calculating, by the processor, a local neighbor feature and a global statistical feature of an autonomous vehicle at a current moment based on travel information of the autonomous vehicle at the current moment and further based on motion information of obstacles in lanes within a sensing range of the autonomous vehicle, wherein the local neighbor feature represents motion status information of a neighboring obstacle of the autonomous vehicle relative to the autonomous vehicle, and the global statistical feature represents denseness of the obstacles in the lanes within the sensing range;

obtaining, by the processor, a target action indication based on the local neighbor feature, the global statistical feature, and a current control policy, wherein the target action indication indicates the autonomous vehicle to execute a target action, and the target action comprises at least one of a lane change type or a keeping straight type;

executing, by the processor, the target action according to the target action indication to cause the autonomous vehicle to execute the target action;

obtaining, by the processor, feedback information in response to executing the target action; and updating, by the processor, the current control policy based on the feedback information to obtain an updated control policy, wherein the feedback information is used to update the current control policy, wherein the feedback information comprises travel information generated after the autonomous vehicle executes the target action, future travel information of the autonomous vehicle, and future motion information of the obstacles in the lanes within the sensing range of the autonomous vehicle, and wherein when the target action is the lane change type, the feedback information further comprises a ratio of a period of time for executing the target action to a historical average period of time and a denseness change between obstacles in a lane in which the autonomous vehicle is located before the lane change type and obstacles in a lane in which the autonomous vehicle is located after the lane change type, wherein the historical average period of time is an average period of time for which the autonomous vehicle executes a similar action within a preset historical period of time.

2. The method according to claim 1, wherein the updating the current control policy based on the feedback information to obtain the updated control policy comprises:

calculating, by the processor based on the feedback information, a subsequent local neighbor feature and a subsequent global statistical feature of the autonomous vehicle, and a reward corresponding to the target action;

determining, by the processor, four-tuple information at the current moment, wherein the four-tuple information at the current moment corresponds to a vehicle condition at the current moment, and comprises: a feature at the current moment, the target action, the reward corresponding to the target action, and a subsequent feature, wherein the feature at the current moment comprises the local neighbor feature and the global statistical feature of the autonomous vehicle at the current moment, and the subsequent feature comprises the subsequent local neighbor feature and the subsequent global statistical feature of the autonomous vehicle; and updating, by the processor, the current control policy based on the four-tuple information at the current moment to obtain the updated control policy.

3. The method according to claim 2, wherein based on the target action being the keeping straight type, the updating the current control policy based on the four-tuple information at the current moment to obtain the updated control policy comprises:

generating, by the processor based on the four-tuple information at the current moment, a target value corresponding to the four-tuple information;

iteratively updating, by the processor, by using a gradient descent method, a parameter Q in a first preset function that comprises the target value; and replacing, by the processor, a parameter q in the current control policy with an iteratively updated parameter q, to obtain the updated control policy.

4. The method according to claim 2, wherein based on the target action being the lane change type, the updating the current control policy based on the four-tuple information at the current moment to obtain the updated control policy comprises:

obtaining, by the processor, extended four-tuple information at the current moment, wherein the extended four-tuple information at the current moment corresponds to an extended vehicle condition at the current moment, and the extended vehicle condition at the current moment is obtained by processing the vehicle condition at the current moment according to a symmetry rule and a monotone rule, wherein the symmetry rule indicates that locations of obstacles in all left lanes and obstacles in all right lanes of the lane in which the autonomous vehicle is located are symmetrically exchanged by using the lane in which the autonomous vehicle is located as an axis, and the monotone rule indicates that a distance increases between front and back neighboring obstacles of the autonomous vehicle in a target lane of the lane change type executed by the autonomous vehicle, and/or indicates that a change in a distance between front and back neighboring obstacles of the autonomous vehicle in a non-target lane is less than a preset distance range; and updating, by the processor, the current control policy based on the four-tuple information at the current moment and the extended four-tuple information at the current moment to obtain the updated control policy.

5. The method according to claim 4, wherein the updating the current control policy based on the four-tuple information at the current moment and the extended four-tuple information at the current moment to obtain the updated control policy comprises:

generating, by the processor based on $i^{th}$ four-tuple information in the four-tuple information at the current moment and the extended four-tuple information at the current moment, a target value corresponding to the $i^{th}$ four-tuple information, wherein i is a positive integer not greater than n, and n is a total quantity of four-tuple information comprised in the four-tuple information at the current moment and the extended four-tuple information comprised in the four-tuple information at the current moment;

iteratively updating, by the processor, by using a gradient descent method, a parameter q in a second preset function that comprises the target value corresponding to the $i^{th}$ four-tuple information; and replacing, by the processor, a parameter q in the current control policy with an iteratively updated parameter q, to obtain the updated control policy.

6. The method according to claim 2, wherein based on the target action being the keeping straight type, the updating the current control policy based on the four-tuple information at the current moment to obtain the updated control policy comprises:

updating, by the processor, the current control policy based on the four-tuple information at the current moment, four-tuple information at a historical moment, and extended four-tuple information at the historical moment, to obtain the updated control policy at, wherein the four-tuple information at the historical moment corresponds to a vehicle condition at the historical moment, and comprises: a feature at the historical moment, a target action at the historical moment, a reward corresponding to the target action at the historical moment, and a subsequent feature of the historical moment, wherein the feature at the historical moment comprises a local neighbor feature and a global statistical feature of the autonomous vehicle at the historical moment, and the subsequent feature of the historical moment comprises a subsequent local neighbor feature and a subsequent global statistical feature of the autonomous vehicle at the historical moment; and the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

7. The method according to claim 6, wherein the updating the current control policy based on the four-tuple information at the current moment, four-tuple information at the historical moment, and extended four-tuple information at the historical moment, to obtain the updated control policy comprises:

generating, by the processor based on $j^{th}$ four-tuple information in the four-tuple information at the current moment, the four-tuple information at the historical moment, and the extended four-tuple information at the historical moment, a target value corresponding to the $j^{th}$ four-tuple information, wherein j is a positive integer not greater than m, and m is a total quantity of four-tuple information comprised in the four-tuple information at the current moment, the four-tuple information at the historical moment, and the extended four-tuple information at the historical moment;

iteratively updating, by the processor, by using a gradient descent method, a parameter q in a third preset function that comprises the target value corresponding to the $j^{th}$ four-tuple information; and replacing, by the processor, a parameter q in the current control policy with an iteratively updated parameter q, to obtain the updated control policy.

8. The method according to claim 2, wherein based on the target action being the lane change type, the updating the current control policy based on the four-tuple information at the current moment to obtain the updated control policy comprises:

obtaining, by the processor, extended four-tuple information at the current moment, wherein the extended four-tuple information at the current moment corresponds to an extended vehicle condition at the current moment, and the extended vehicle condition at the current moment is obtained by processing the vehicle condition at the current moment according to a symmetry rule and a monotone rule; and updating, by the processor, the current control policy based on the four-tuple information at the current moment, the extended four-tuple information at the current moment, four-tuple information at a historical moment, and extended four-tuple information at the historical moment to obtain the updated control policy, wherein the four-tuple information at the historical moment corresponds to a vehicle condition at the historical moment, the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

9. An autonomous lane change apparatus, comprising:
a processor; and
a memory electronically coupled to the processor,
wherein the memory is configured to store computer-readable program instructions and
wherein the processor is configured to execute the computer-readable program instructions stored in the memory to perform an autonomous lane change method comprising:

calculating, by the processor, a local neighbor feature and a global statistical feature of an autonomous vehicle at a current moment based on travel information of the autonomous vehicle at the current moment and motion information of obstacles in lanes within a sensing range of the autonomous vehicle, wherein the local neighbor feature represents motion status information of a neighboring obstacle of the autonomous vehicle in relation to the autonomous vehicle, and the global statistical feature represents denseness of the obstacles in the lanes within the sensing range;

obtaining, by the processor, a target action indication based on the local neighbor feature, the global statistical feature, and a current control policy, wherein the target action indication indicates the autonomous vehicle to execute a target action, and the target action comprises at least one of a lane change type or a keeping straight type;

executing, by the processor, the target action according to the target action indication to cause the autonomous vehicle to execute the target action;

obtaining, by the processor, feedback information by executing the target action; and updating, by the processor, the current control policy based on the feedback information to obtain an updated control policy, wherein the feedback information is used to update the current control policy, wherein the feedback information comprises travel information generated after the autonomous vehicle executes the target action, future travel information of the autonomous vehicle, and future motion information of the obstacles in the lanes within the sensing range of the autonomous vehicle, and wherein when the target action is the lane change type, the feedback information further comprises a ratio of a period of time for executing the target action to a historical average period of time and a denseness change between obstacles in a lane in which the autonomous vehicle is located before the lane change type and obstacles in a lane in which the autonomous vehicle is located after the lane change type, wherein the historical average period of time is an average period of time for which the autonomous vehicle executes a similar action within a preset historical period of time.

10. The apparatus according to claim 9, wherein the updating the current control policy based on the feedback information to obtain the updated control policy comprises:

calculating, based on the feedback information, a subsequent local neighbor feature and a subsequent global statistical feature of the autonomous vehicle, and a reward corresponding to the target action;

determining four-tuple information at the current moment, wherein the four-tuple information at the current moment corresponds to a vehicle condition at the current moment, and comprises: a feature at the current moment, the target action, the reward corresponding to the target action, and a subsequent feature, wherein the feature at the current moment comprises the local neighbor feature and the global statistical feature of the autonomous vehicle at the current moment, and the subsequent feature comprises the subsequent local neighbor feature and the subsequent global statistical feature of the autonomous vehicle; and updating the current control policy based on the four-tuple information at the current moment to obtain the updated control policy.

11. The apparatus according to claim 10, wherein based on the target action being the keeping straight type, the updating the current control policy based on the four-tuple information at the current moment to obtain the updated control policy comprises:

generating, based on the four-tuple information at the current moment, a target value corresponding to the four-tuple information;

iteratively updating, by using a gradient descent method, a parameter q in a first preset function that comprises the target value; and replacing a parameter q in the current control policy with an iteratively updated parameter q, to obtain the updated control policy.

12. The apparatus according to claim 10, wherein based on the target action being the lane change type, the updating the current control policy based on the four-tuple information at the current moment to obtain the updated control policy comprises:

obtaining extended four-tuple information at the current moment, wherein the extended four-tuple information at the current moment corresponds to an extended vehicle condition at the current moment, and the extended vehicle condition at the current moment is obtained by processing the vehicle condition at the current moment according to a symmetry rule and a monotone rule, wherein the symmetry rule indicates that locations of obstacles in all left lanes and obstacles in all right lanes of the lane in which the autonomous vehicle is located are symmetrically exchanged by using the lane in which the autonomous vehicle is located as an axis, and the monotone rule indicates that a distance increases between front and back neighboring obstacles of the autonomous vehicle in a target lane of the lane change type executed by the autonomous vehicle, and/or indicates that a change in a distance between front and back neighboring obstacles of the autonomous vehicle in a non-target lane is less than a preset distance range; and updating the current control policy based on the four-tuple information at the current moment and the extended four-tuple information at the current moment to obtain the updated control policy.

13. The apparatus according to claim 12, wherein the updating the current control policy based on the four-tuple information at the current moment and the extended four-tuple information at the current moment to obtain the updated control policy comprises:

generating, based on $i^{th}$ four-tuple information in the four-tuple information at the current moment and the extended four-tuple information at the current moment, a target value corresponding to the $i^{th}$ four-tuple information, wherein i is a positive integer not greater than n, and n is a total quantity of four-tuple information comprised in the four-tuple information at the current moment and the extended four-tuple information comprised in the four-tuple information at the current moment;

iteratively updating, by using a gradient descent method, a parameter q in a second preset function that comprises the target value corresponding to the $i^{th}$ four-tuple information; and replacing a parameter q in the current control policy with an iteratively updated parameter q, to obtain the updated control policy.

14. The apparatus according to claim 10, wherein based on the target action being keeping straight type, the updating the current control policy based on the four-tuple information at the current moment to obtain the updated control policy comprises:

updating the current control policy based on the four-tuple information at the current moment, four-tuple information at a historical moment, and extended four-tuple information at the historical moment, to obtain the updated control policy, wherein the four-tuple information at the historical moment corresponds to a vehicle condition at the historical moment, and comprises: a feature at the historical moment, a target action at the historical moment, a reward corresponding to the target action at the historical moment, and a subsequent feature at the historical moment, wherein the feature at the historical moment comprises a local neighbor feature and a global statistical feature of the autonomous vehicle at the historical moment, and the subsequent feature of the historical moment comprises a subsequent local neighbor feature and a subsequent global statistical feature of the autonomous vehicle at the historical moment; and the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

15. The apparatus according to claim 14, wherein the updating the current control policy based on the four-tuple information at the current moment, four-tuple information at the historical moment, and extended four-tuple information at the historical moment, to obtain the updated control policy comprises:

generating, based on $j^{th}$ four-tuple information in the four-tuple information at the current moment, the four-tuple information at the historical moment, and the extended four-tuple information at the historical moment, a target value corresponding to the $j^{th}$ four-tuple information, wherein j is a positive integer not greater than m, and m is a total quantity of four-tuple information comprised in the four-tuple information at the current moment, the four-tuple information at the historical moment, and the extended four-tuple information at the historical moment;

iteratively updating, by using a gradient descent method, a parameter q in a third preset function that comprises the target value corresponding to the $j^{th}$ four-tuple information; and replacing a parameter q in the current control policy with an iteratively updated parameter q, to obtain the updated control policy.

16. The apparatus according to claim 10, wherein based on the target action being lane change, the updating the current control policy based on the four-tuple information at the current moment to obtain the updated control policy comprises:

obtaining extended four-tuple information at the current moment, wherein the extended four-tuple information at the current moment corresponds to an extended vehicle condition at the current moment, and the extended vehicle condition at the current moment is obtained by processing the vehicle condition at the current moment according to a symmetry rule and a monotone rule; and updating the current control policy based on the four-tuple information at the current moment, the extended four-tuple information at the current moment, four-tuple information at a historical moment, and extended four-tuple information at the historical moment to obtain the updated control policy, wherein the four-tuple information at the historical moment corresponds to a vehicle condition at the historical moment, the extended four-tuple information at the historical moment corresponds to an extended vehicle condition at the historical moment, and the extended vehicle condition at the historical moment is obtained by processing the vehicle condition at the historical moment according to a symmetry rule and a monotone rule.

17. A non-transitory computer-readable storage medium, wherein the non-transitory computer-readable storage medium stores computer-readable program instructions, that, when executed by a computer, cause the computer to perform an autonomous lane change method, the autonomous lane change method comprising:

calculating a local neighbor feature and a global statistical feature of an autonomous vehicle at a current moment based on travel information of the autonomous vehicle at the current moment and motion information of obstacles in lanes within a sensing range of the autonomous vehicle, wherein the local neighbor feature represents motion status information of a neighboring obstacle of the autonomous vehicle relative to the autonomous vehicle, and the global statistical feature represents denseness of the obstacles in the lanes within the sensing range;

obtaining a target action indication based on the local neighbor feature, the global statistical feature, and a current control policy, wherein the target action indication indicates the autonomous vehicle to execute a target action, and the target action comprises at least one of a lane change type or a keeping straight type;

executing the target action according to the target action indication to cause the autonomous vehicle to execute the target action;

obtaining, by the processor, feedback information in response to executing the target action; and updating, by the processor, the current control policy based on the feedback information to obtain an updated control policy, wherein the feedback information is used to update the current control policy, wherein the feedback information comprises travel information generated after the autonomous vehicle executes the target action, future travel information of the autonomous vehicle, and future motion information of the obstacles in the lanes within the sensing range of the autonomous vehicle, and wherein when the target action is the lane change type, the feedback information further comprises a ratio of a period of time for executing the target action to a historical average period of time and a denseness change between obstacles in a lane in which the autonomous vehicle is located before the lane change type and obstacles in a lane in which the autonomous vehicle is located after the lane change type, wherein the historical average period of time is an average period of time for which the autonomous vehicle executes a similar action within a preset historical period of time.

\* \* \* \* \*